United States Patent
Dick

(10) Patent No.: US 12,509,418 B2
(45) Date of Patent: Dec. 30, 2025

(54) CHROMOPHORIC COMPOUNDS AND UV-ABSORBING COMPOSITIONS

(71) Applicant: Lygg Corporation, Palo Alto, CA (US)

(72) Inventor: Graham Dick, Palo Alto, CA (US)

(73) Assignee: Lygg Corporation, Palo Alto, CA (US)

(*) Notice: Subject to any disclaimer, the term of this patent is extended or adjusted under 35 U.S.C. 154(b) by 0 days.

(21) Appl. No.: 19/208,234

(22) Filed: May 14, 2025

(65) Prior Publication Data

US 2025/0270164 A1  Aug. 28, 2025

Related U.S. Application Data

(63) Continuation of application No. PCT/US2023/086019, filed on Dec. 27, 2023.

(60) Provisional application No. 63/435,372, filed on Dec. 27, 2022.

(51) Int. Cl.
| | |
|---|---|
| C07C 255/41 | (2006.01) |
| A61K 8/36 | (2006.01) |
| A61Q 5/12 | (2006.01) |
| A61Q 17/04 | (2006.01) |
| C07C 255/34 | (2006.01) |
| C07D 295/145 | (2006.01) |
| C07D 319/06 | (2006.01) |

(52) U.S. Cl.
CPC ............ *C07C 255/41* (2013.01); *A61K 8/36* (2013.01); *A61Q 5/12* (2013.01); *A61Q 17/04* (2013.01); *C07C 255/34* (2013.01); *C07D 295/145* (2013.01); *C07D 319/06* (2013.01)

(58) Field of Classification Search
None
See application file for complete search history.

(56) References Cited

U.S. PATENT DOCUMENTS

| | | |
|---|---|---|
| 3,180,885 A | 4/1965 | Nentwig et al. |
| 4,847,073 A | 7/1989 | Cleary et al. |
| 4,891,212 A | 1/1990 | Gosciniak et al. |
| 7,264,891 B2 | 9/2007 | Lin et al. |
| 8,779,126 B2 | 7/2014 | Kobayashi et al. |
| 9,424,998 B2 | 8/2016 | Kobayashi et al. |
| 10,836,777 B2 | 11/2020 | Sun et al. |
| 11,344,487 B2 | 5/2022 | Batista et al. |
| 11,433,008 B2 | 9/2022 | Lucet-Levannier et al. |
| 11,458,083 B2 | 10/2022 | Richard et al. |
| 11,679,069 B2 | 6/2023 | Safouane et al. |
| 2022/0081535 A1 | 3/2022 | Tsuruta et al. |

FOREIGN PATENT DOCUMENTS

| | | |
|---|---|---|
| CS | 237750 B1 | 10/1985 |
| EP | 2945601 B1 | 8/2018 |
| JP | 2009114200 A * | 5/2009 |
| WO | WO 2014/011010 | 1/2014 |
| WO | WO 2022/187716 A1 | 9/2022 |

OTHER PUBLICATIONS

Curti, C. et al., "Exploring the Remote Reactivity of π-Extended Carbonyl Compounds: The Vinylogous Alkylidene Malononitrile Activation Strategy," Synlett, 29, vol. 3, 2018, pp. 266-281.
International Search Report and Written Opinion, PCT Application No. PCT/US2023/086019, Apr. 23, 2024, 4 pages.
National Center for Biotechnology Information," Substance Record 2-[(1E,4R)-2,5alpha-Dimethyl-3,4beta-diphenyl-2-cyclopentene-1-ylidene]acetic acid ethyl ester," 2025, 5 pages, [Online] [Retrieved on May 20, 2025] from the internet, URL <https://pubchem.ncbi.nlm.nih.gov/substance/273858561>.
Reich, H. et al., "Conversion of Allyl Alcohols to 1,3-Dienes by Sequential Sulfenate-Sulfoxide [2,3] Sigmatropic Rearrangement and Syn Elimination," Journal of the American Chemical Society, vol. 104, No. 25, Dec. 1, 1982, pp. 7051-7059.
Staub, K. et al., "Synthesis and Stability Studies of Conformationally Locked 4-(diarylamino)aryl- and 4-(dialkylamino)phenyl-substituted Second-Order Nonlinear Optical Polyene Chromophores," Journal of Materials Chemistry, Issue 4, Feb. 2003, pp. 825-833.

* cited by examiner

*Primary Examiner* — Nannette Holloman
(74) *Attorney, Agent, or Firm* — Fenwick & West LLP

(57) ABSTRACT

UV-absorbing chromophoric compounds and compositions including the compounds are provided. One or more compounds can be formulated into cosmetic compositions skincare products such as sunscreens, haircare products, and other personal care products. Also, the compounds can be formulated into compositions such as paints, resins, dyes, and others to protect surfaces from damage caused to UV exposure.

30 Claims, 5 Drawing Sheets

CHROMOPHORIC COMPOUNDS AND UV-ABSORBING COMPOSITIONS

CROSS-REFERENCE TO RELATED APPLICATIONS

This application is a continuation of the PCT/US2023/086019, filed Dec. 27, 2023, which claims the benefit of priority to U.S. Provisional Application No. 63/435,372, filed Dec. 27, 2022. The contents of these applications are incorporated by reference herein in their entirety.

FIELD

The field of the disclosure relates to chromophoric compounds that absorb ultra-violet (UV) light, compositions thereof, and methods of their use.

BACKGROUND

The prolonged exposure to UV radiation, such as from the sun, can lead to the formation of light dermatoses and erythemas, as well as increase the risk of skin cancers, such as melanoma, and accelerate skin aging, such as loss of skin elasticity and wrinkling. Light having wavelengths in both the UV-A range (from about 320 to 400 nm) and the UV-B range (from about 280 to about 320 nm) can cause such skin damage, and, thus, sunscreen compositions should comprise both UV-A and UV-B absorbers/reflectors. Sunscreen compositions often include one or more organic and/or inorganic compounds to absorb a broad spectrum of the sun UV radiation (UV-A and UV-B), and thereby provide protection from damage. To that end, several compounds and preparations have been developed and commercialized.

Damage caused by exposure to UV radiation is not limited to human skin and other animals. It causes changes to the texture of hair, both natural and synthetic fabrics, and wood products. Also, it bleaches the colors of cloth and painted objects. A common problem associated with many UV-absorbing compounds used in the protection against UV-radiation such as 1,3 diketones and cinnamic acid derivatives is that they are photodegraded over time by exposure resulting in a reduction of their UV absorbance, in particular UV-A absorbance.

Pentadienoates have absorption of UV/Vis spectra in the range 280-400 nm which would make them ideal to be used for protection from damages caused by exposure to sunlight. However, since they are photolabile and photo-isomerizable, light exposure leads to several products that include cyclization and dimerization which are accompanied by loss of the chromophore and the decrease in the efficacy of protection from UV-radiation. To overcome the problem, U.S. Pat. No. 4,847,073, incorporated herein by reference in its entirety, discloses compounds having the constrained structure of the pentadienoates chromophore for use in a composition to protect from UV radiation having the structure:

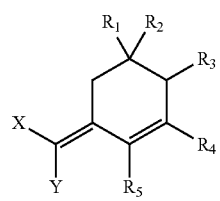

wherein X and Y are independently selected from the group CN, $COOR_6$, -$PhNH(R_6)$, $CON(R_6)_2$, -$Ph$-$COOR_6$, -$Ph$-$COR_6$, and wherein only X or Y may be substituted with H; wherein $R_1$, $R_2$, $R_3$, $R_4$, and $R_5$ are selected from the group of H, OH, $COOR_6$, alkyl, alkoxy or hydroxyalkyl groups having 1-5 carbon atoms, and $R_6$ is selected from H, alkyl, alkylaryl, or arylalkyl groups of 1-22 carbon atoms. The patent, however, does not disclose any compound with aromatic or heteroaromatic $R_4$.

U.S. Pat. No. 4,891,212, incorporated herein by reference in its entirety, discloses compounds having constrained structure comprising the pentadienoates chromophore:

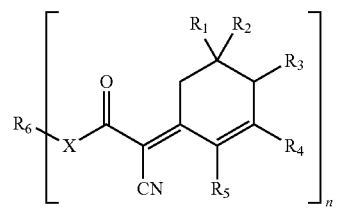

wherein $R_1$, $R_2$, $R_3$, $R_4$, and $R_5$ are selected from H or alkyl group of 1-5 carbon atoms, X is O or NH and $R_6$ is selected from divalent alkylene groups of 2-16 carbon atoms, cycloalkylene groups of 5-8 carbon atoms, arylene groups of 6-12 carbon atoms or alkylarylene groups of 7-13 carbon atoms, and sunscreen composition thereof.

U.S. Pat. No. 10,836,777, incorporated herein by reference in its entirety, is directed to synthetic methods for preparing herbicides including the synthesis of 2-(cyclohexenylidene)malonic acid derivatives by the acid or base catalyzed cyclization:

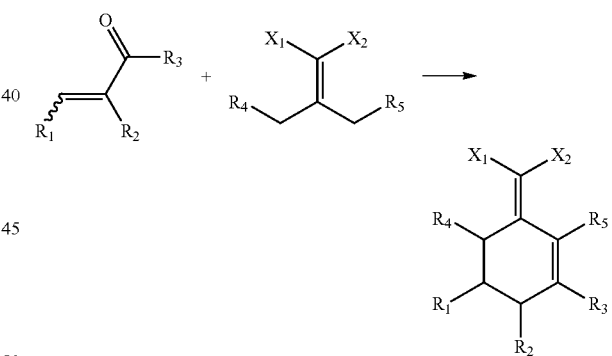

wherein $R_1$, $R_2$, $R_3$, $R_4$, and $R_5$ are independently selected from H, $C_1$-$C_{10}$ alkyl, $C_6$-$C_{12}$ aryl or heteroaryl containing one or two atoms selected from N, O, and sulfur; and $X_1$ and $X_2$ are independently nitrile or $COR_6$, where in $R_6$ is $C_1$-$C_{10}$ alkyl, $C_1$-$C_{10}$ alkoxy among others.

Curti et al. [Synlett (2018), 29, 266-281], incorporated herein by reference in its entirety, developed particular methods for synthesis of compounds including (3-phenyl-2-cyclohexen-1-ylidene) propanedinitrile.

Staub et al. [J. Mat. Chem. (2003) 13, 825-833, incorporated herein by reference in its entirety, studied nonlinear polyene chromophores prepared from particular compounds such as [3-(4-aminophenyl)-2-cyclohexen-1-ylidene]propanedinitrile.

Since the disclosed compounds in U.S. Pat. Nos. 4,847,073 and 4,891,212 patents have $\lambda_{max}$ of 305-306 which is not effective in absorbing the entire range of UV-A, the object of this disclosure is to provide compounds comprising constrained structures containing the pentadienoates chromophore.

SUMMARY

The instant disclosure provides chromophoric compounds that contain constrained pentadienoate structures to minimize or obviate their photochemical reactivity and have $\lambda_{max}$ of 300-370 nm for effective absorption of UV-A and UV-B.

A first aspect of the disclosure is compounds having the chemical structure of formula I and/or II, or salts thereof:

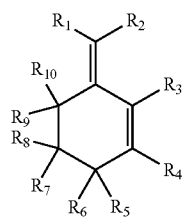

Formula I

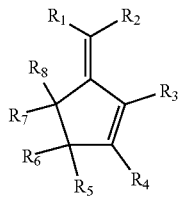

Formula II wherein:
$R_1$ and $R_2$ are independently selected from H, optionally substituted alkyl, optionally substituted alkynyl, optionally substituted aminoalkyl, optionally substituted hydroxyalkyl, optionally substituted alkoxyalkyl, —CN, —C(O)R', —C(O)OR', —C(O)NR'R", —C(O)SR', —C(S)NR'R", —NCO, —C(O)—X—$R_y$, C(O)—X—$R_z$, and —NO$_2$; or $R_1$ and $R_2$ together with the carbon atom to which they are attached form a cyclic moiety of Formula III or Formula IV:

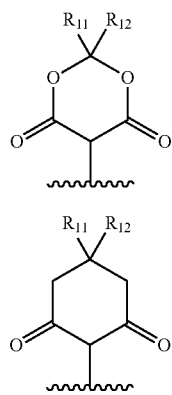

Formula III

Formula IV wherein:
X is O or NR';
$R_{11}$ and $R_{12}$ are independently selected from H, and optionally substituted alkyl;

$R_y$ and $R_z$ are independently selected from H, optionally substituted $C_{1-15}$ alkyl, optionally substituted hydroxyalkyl, optionally substituted alkoxyalkyl, a polyamide, and a polyether;

$R_4$ is selected from optionally substituted $C_6$-$C_{10}$ aryl, optionally substituted $C_2$-$C_9$ heteroaryl comprising 0-4 heteroatoms selected from O, N, and S;

each $R_3$, $R_5$, $R_6$, $R_7$, $R_8$, $R_9$, and $R_{10}$ is independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —R'R", —CN, —N=NR', cyanate, —OCN, —CNO, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR"), PR'$_3$, PR'$_2$, —P(OR')$_2$, —OP(OR')$_2$, —P(O)(OR')$_2$, —OP(O)(OR')$_2$, a polyamide, and a polyether; and each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether.

In some embodiments of Formula I and II, the compounds have a cis- and/or trans structure of Formula V or Formula VI:

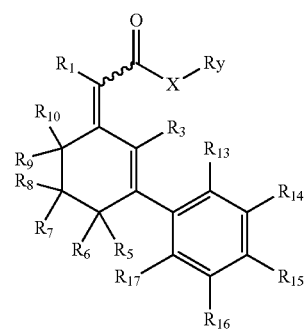

Formula V

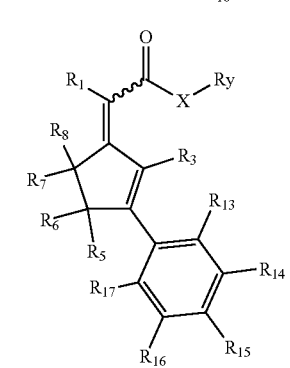

Formula VI or a salt thereof, wherein:

X is O or NR';

$R_1$ is selected from H, —CN, alkylisocyanate, alkylisothiocyanate, arylisocyanate, arylisothiocyanate, and C(O)—X—$R_z$;

$R_y$ and $R_z$ are independently selected from H, optionally substituted $C_{1-15}$ alkyl, optionally substituted hydroxyalkyl, optionally substituted alkoxyalkyl, a polyamide, and a polyether;

each $R_{13}$, $R_{14}$, $R_{15}$, $R_{16}$, and $R_{17}$ is independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR"), —PR'$_2$, —P(OR')$_2$, —OP(OR')$_2$, —P(O)(OR')$_2$, —OP(O)(OR')$_2$, polyamide, and polyether.

each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether.

A second aspect of this disclosure is multimeric compound of Formula VII or Formula VIII:

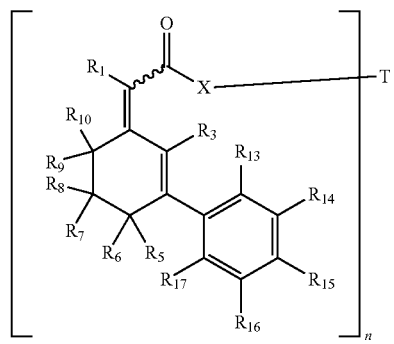

Formula VII

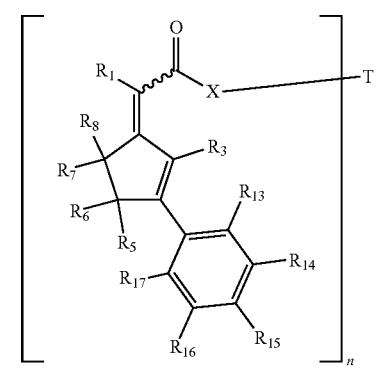

Formula VIII or a salt thereof, wherein:

each $R_1$ is independently selected from H, —CN, alkylisocyanate, alkylisothiocyanate, arylisocyanate, arylisothiocyanate, and C(O)—X—$R_z$;

X is O or NR';

T is a linking moiety selected from optionally substituted $C_1$-$C_{20}$ alkylene, optionally substituted $C_2$-$C_{20}$ alkenylene, optionally substituted $C_2$-$C_{20}$ alkynylene, optionally substituted $C_2$-$C_{20}$ alkoxyalkylene, optionally substituted $C_2$-$C_{20}$ cycloalkylene, optionally substituted $C_2$-$C_{20}$ cycloalkenylene, and optionally substituted $C_2$-$C_{20}$ heterocycloalkylene, wherein one or more carbon atoms of the backbone of the linking moiety T are optionally replaced by a divalent group each independently selected from oxygen (—O—), carbonyl (—CO—), optionally substituted alkylamino, optionally substituted cycloalkylene, optionally substituted heterocyclylene, optionally substituted heteroarylene, and optionally substituted arylene;

each $R_z$ is independently selected from H, optionally substituted $C_1$-15 alkyl, optionally substituted hydroxyalkyl, optionally substituted alkoxyalkyl, a polyamide, and a polyether;

each $R_3$, $R_5$, $R_6$, $R_7$, $R_8$, $R_9$, $R_{10}$, $R_{13}$, $R_{14}$, $R_{15}$, $R_{16}$, and $R_{17}$ is independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$a cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —CNO, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR"), PR'$_3$, PR'$_2$, —P(OR')$_2$, —OP(OR')$_2$, —P(O)(OR')$_2$, —OP(O)(OR')$_2$, a polyamide, and a polyether;

each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether; and n is selected from 2, 3, 4, 5, and 6.

A third aspect of this disclosure is oligomer or polymer compounds of Formula IX or X:

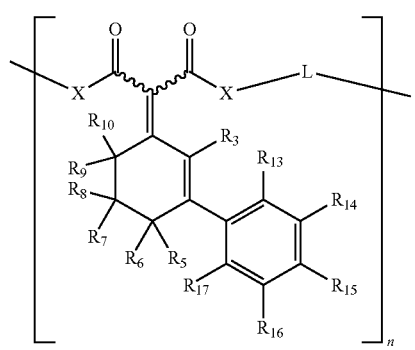

Formula IX

-continued

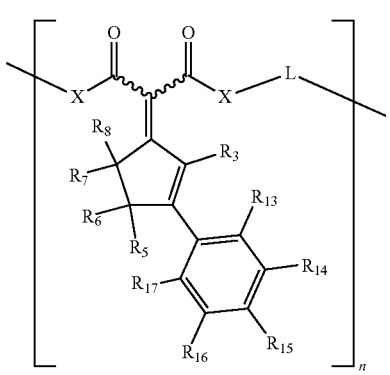

Formula X or is a salt thereof,
wherein:
each X is independently O or NR';
L is a divalent linking moiety selected from optionally substituted $C_1$-$C_{20}$ alkylene, optionally substituted $C_1$-$C_{20}$ alkenylene, optionally substituted $C_2$-$C_{20}$ alkynylene, optionally substituted $C_2$-$C_{20}$ alkoxyalkylene, optionally substituted $C_2$-$C_{20}$ cycloalkylene, optionally substituted $C_2$-$C_{20}$ cycloalkenylene, optionally substituted $C_2$-$C_{20}$ heterocycloalkylene, wherein one or more carbon atoms of the backbone of L are optionally replaced by a divalent group each independently selected from oxygen (—O—), carbonyl (—CO—), optionally substituted alkylamino, optionally substituted cycloalkylene, optionally substituted heterocyclylene, optionally substituted heteroarylene, optionally substituted arylene, a polyamide, and a polyether;
each $R_3$, $R_5$, $R_6$, $R_7$, $R_8$, $R_9$, $R_{10}$, $R_{13}$, $R_{14}$, $R_{15}$, $R_{16}$, and $R_{17}$ is independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_z$-$C_9$ heteroaryl, —OR', C(O)R', —C(O)OR', —C(O)NR'R", —C═NR') NR'R", —C(═NR")R', —NR'R", —CN, —N═NR', cyanate, —OCN, —NCO, —NO₂, —OC(O)NR'R", —SR', —S—SR', —S(O)R', —S(O)₂R', —S(O)₂OR', —S(O)NR', —C(O)SR', —C(S)SR', —C(S)NR', —B(OH)₂, —B(OR')(OR"), PR'₃, —PR'₂, —P(OR')₂, —OP(OR')₂, —P(O)(OR')₂, —OP(O)(OR')₂, a polyamide, and a polyether;
each R' and R" is independently selected from H, optionally substituted $C_1$-$C_{20}$ alkyl, optionally substituted $C_1$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether;
n is at least 2, 3, 4, 5, 10, 20, 100, 150, 300, 500, or 1000 (e.g., n is an average degree of polymerization of 5-1000 or 10-100).

Also provided are UV-absorbing compositions including one or more compounds of Formula I, II, and/or V-X.

A fourth aspect of the disclosure is directed to a method of providing UV light protection to the skin or hair of a subject, the method comprises applying to the skin or hair of the subject, such as but not limited to human and other mammals, a composition comprising one or more of the compounds of formula I, II and/or V-X, such as but not limited to compounds E1-E64 of Table 6.

A fifth aspect of the disclosure is directed to a composition stabilized against light-induced degradation, the composition comprises, an organic material subject to light-induced degradation, and one or more compounds selected from the compounds having the chemical structure of formula I and/or II, such as but not limited to compounds E1-E64 of Table 6.

In some embodiments of the composition, the organic material is a coating, wax, resin, varnish, lacquer, enamel, paint thermoplastic polymer, thermoset polymer, polyester, protein, polysaccharide, adhesive, or blond thereof.

In a preferred embodiment, the composition comprises one or more compounds of Formula I, II and/or V-X in an amount in the range of 0.01% to 50% by weight of the organic material.

A sixth aspect of the disclosure is directed to a method of providing UV light protection to a UV light sensitive material, the method comprises applying to the UV light sensitive material a composition containing one or more compound of formula I, II and/or V-X such as but not limited to compounds E1-E64 of Table 6.

A seventh aspect of the disclosure directed to a composition for protecting fabrics from sun-fading comprising one or more compounds selected from the compounds having the chemical structure of formula I, II and/or V-X and salts hereof such as but not limited to compounds E1-E64 of Table 6.

DETAILED DESCRIPTION

Definitions

Figure 1:
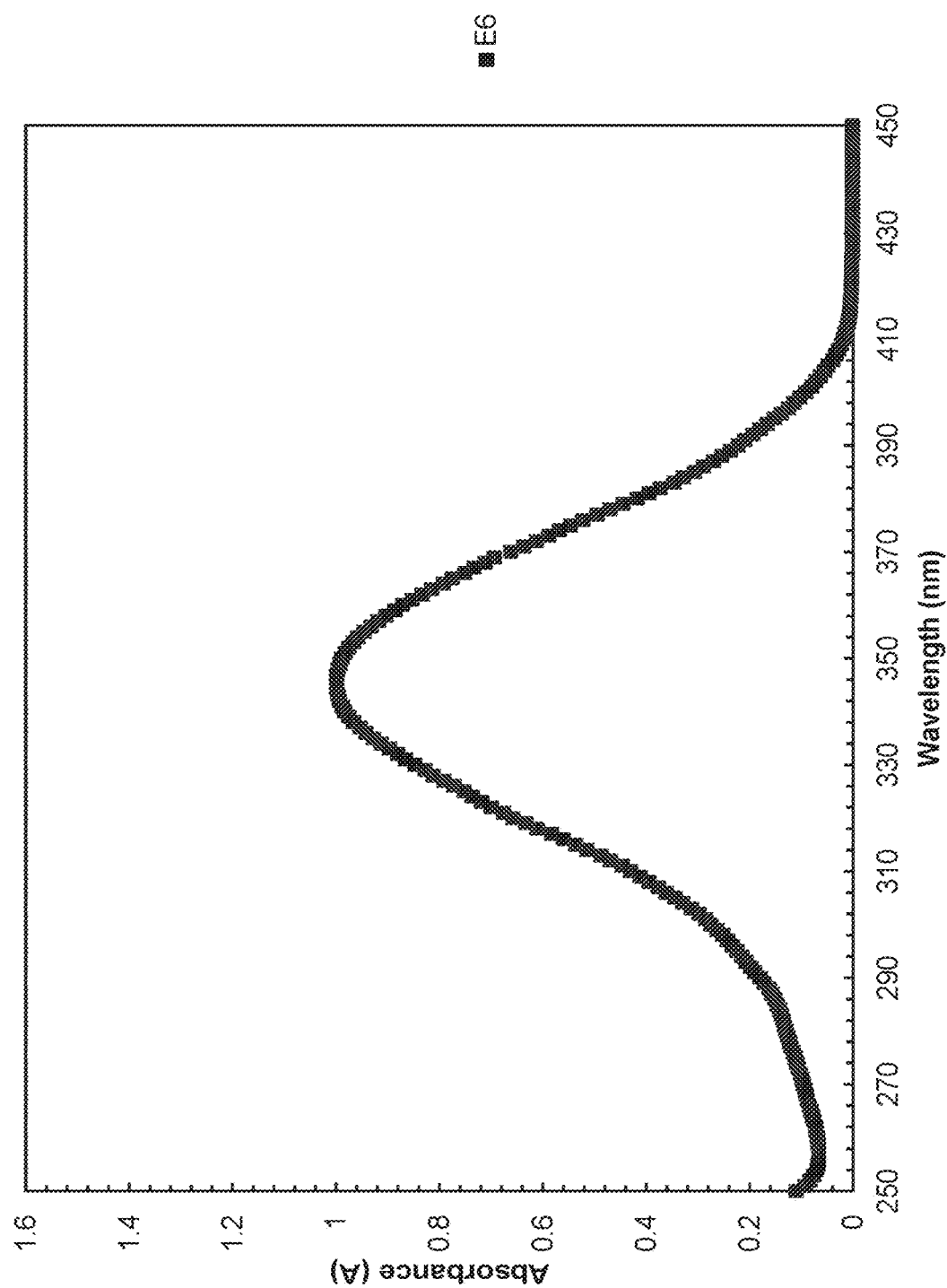
FIG. 1 shows the UV absorbance spectrum of a mixture of cis- and trans-2-thylhexyl (3-phenyl-2-cyclopenten-1-ylidene)cyanoacetate (E6).

In this specification, reference is made in detail to specific embodiments of the disclosure. Some of the embodiments or their aspects are illustrated in the drawings. Several aspects of the disclosure are described herein with reference to example applications for illustration. It should be understood that numerous specific details, relationships, and methods are set forth to provide a full understanding of the features described herein. One having ordinary skill in the relevant art, however, will readily recognize that the features described herein can be practiced without one or more of the specific details or with other methods. The features described herein are not limited by the illustrated ordering of acts or events, as some acts can occur in different orders and/or concurrently with other acts or events, unless otherwise specifically indicated. Furthermore, not all illustrated acts or events are required to implement a methodology in accordance with the features described herein.

Compounds of this disclosure include those described generally above, and are further illustrated by the classes, subclasses, and species disclosed herein. As used herein, the following definitions shall apply unless otherwise indicated. For purposes of this disclosure, the chemical elements are identified in accordance with the Periodic Table of the Elements, CAS version, Handbook of Chemistry and Physics, 75$^{th}$ Ed. Additionally, general principles of organic chemistry are described in "Organic Chemistry", Thomas Sorrell, University Science Books, Sausalito: 1999, and "March's Advanced Organic Chemistry", 5$^{th}$ Ed., Ed.: Smith, M. B. and March, J., John Wiley & Sons, New York: 2001, the entire contents of which are hereby incorporated by reference.

The abbreviations used herein have their conventional meaning without the chemical and biological arts. The chemical structures and formulae set forth herein are constructed according to the standard rules of chemical valency known in the chemical arts.

The term "aliphatic" or "aliphatic group", as used herein, means a straight-chain (i.e., unbranched) or branched, substituted or unsubstituted hydrocarbon chain that is completely saturated or that contains one or more units of unsaturation, or a monocyclic hydrocarbon or bicyclic hydrocarbon that is completely saturated or that contains one or more units of unsaturation, but which is not aromatic (also referred to herein as "carbocyclyl", "cycloaliphatic", or "cycloalkyl"), that has a single point of attachment to the rest of the molecule. Unless otherwise specified, aliphatic groups contain 1-6 aliphatic carbon atoms. In some embodiments, aliphatic groups contain 1-5 aliphatic carbon atoms. In some embodiments, aliphatic groups contain 1-4 aliphatic carbon atoms. In some embodiments, aliphatic groups contain 1-3 aliphatic carbon atoms. In some embodiments, aliphatic groups contain 1-2 aliphatic carbon atoms. In some embodiments, "cycloaliphatic" (or "carbocyclyl" or "cycloalkyl") refers to a monocyclic $C_3$-$C_7$ hydrocarbon that is completely saturated or that contains one or more units of unsaturation, but which is not aromatic, that has a single point of attachment to the rest of the molecule. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl.

The term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substituted nitrogen of a heterocyclic ring, for example N (as in 3,4-dihydro-2H-pyrrolyl), NH (as in pyrrolidinyl) or NR$^+$ (as in N-substituted pyrrolidinyl)).

The term "unsaturated", as used herein, means that a moiety has one or more units of unsaturation.

The term "alkylene" refers to a bivalent alkyl group. An "alkylene chain" is a polymethylene group, i.e., —(CH$_2$)$_n$—, wherein n is a positive integer, preferably from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described below for a substituted aliphatic group.

The terminology used herein is for the purpose of describing exemplary embodiments only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising". Unless otherwise indicated, all technical and scientific terms used herein have the same meaning as commonly understood to one of ordinary skill in the art. The materials, methods, and examples are illustrative only and not intended to be limiting.

As used herein, the term "about" or "approximately" means a range of up to 10%, preferably 5%, and more preferably 3% of a given value.

As used herein, the term "substantially" refers to something that can be done to a great extent or degree.

As used herein, the term "in the amount in the range of X % to Y %" include all the ranges within the range. For example, a compound in an amount in the range of 0.1% to 50% (w/w) include the ranges of 0.2% to 49% (w/w), 1.0% to 45% (w/w), 5% to 10% (w/w), 3% to 30% (w/w), 15% to 20% (w/w) and 20% to 45% (w/w) . . . etc.

The terms "heteroaryl" and "heteroar-" refer to groups having 5 to 10 ring atoms, preferably 5, 6, or 9 ring atoms; having 6, 10, or 14π electrons shared in a cyclic array; and having, in addition to carbon atoms, from one to five heteroatoms. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl.

The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring (or in the case of a bivalent fused heteroarylene ring system, at least one radical or point of attachment is on a heteroaromatic ring). Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbozolyl, acridinyl, phenazinyl, phenothiazinyl, phenoxazinyl, tetrahydrquinolinyl, tetrahydroisoquinolinyl, and pyrido [2,3-b]-1,4-oxazin-3 (4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted.

As used herein, the terms "heterocyclyl", "heterocyclic radical", and "heterocyclic ring" are used interchangeably and refer to a stable 5- to 7-membered monocyclic or 7- to 10-membered bicyclic heterocyclic moiety that is either saturated or partially unsaturated, and having, in addition to carbon atoms, one or more, preferably one to four, heteroatoms, as defined above When used in this context in reference to a ring atom, the term "nitrogen" includes a substituted nitrogen. As an example, in a saturated or partially unsaturated ring having 0-3 heteroatoms selected from oxygen, sulfur, or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothiophenyl pyrrolidinyl, piperidinyl, pyrrolidinyl, tetrahydroquinolinyl, tetrahydroisoquinolinyl, decahydroquinolinyl, oxazolidinyl, piperizinyl, dioxanyl, dioxolanyl, diazepinyl, oxazepinyl, thiazepinyl, morpholinyl, and quinuclidinyl. The terms "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As used herein and unless otherwise specified, the suffix "-ene" is used to describe a bivalent group. Thus, any of the terms above can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkylene", a bivalent alkynyl chain is "alkynylene", and so forth.

As used herein, the terms "may," "optional," "optionally," or "may optionally" mean that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

When the term "substituted" appears prior or after a list of possible substituted groups, it is intended that the term apply to every member of that group. For example, the phrase "substituted alkyl and aryl" is to be interpreted as "substituted alkyl and substituted aryl."

In addition to the disclosure herein, the term "substituted," when used to modify a specified group or radical, can also mean that one or more hydrogen atoms of the specified group or radical are each, independently of one another, replaced with the same or different substituent groups as defined herein.

In addition to the disclosure herein, in a certain embodiment, a group that is substituted has 1, 2, 3, or 4 substituents, 1, 2, or 3 substituents, 1 or 2 substituents, or 1 substituent.

Unless indicated otherwise, the nomenclature of substituents that are not explicitly defined herein are arrived at by naming the terminal portion of the functionality followed by the adjacent functionality toward the point of attachment. For example, the substituent "hydroxyalkyl" refers to the group HO-(alkyl)-.

"Halo" and "halogen" refers to fluorine, chlorine, bromine, and iodine.

As to any of the groups disclosed herein which contain one or more substituents, it is understood, of course, that such groups do not contain any substitution or substitution patterns which are sterically impractical and/or synthetically non-feasible. In addition, the subject compounds include all stereochemical isomers arising from the substitution of these compounds.

As described herein, compounds of the disclosure may, when specified, contain "optionally substituted" moieties. In general, the term "substituted", whether preceded by the term "optionally" or not, means that one or more hydrogens of the designated moiety are replaced with a suitable substituent. "Substituted" applies to one or more hydrogens that are either explicit or implicit from the structure (e.g., 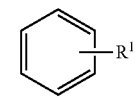)

refers to at least

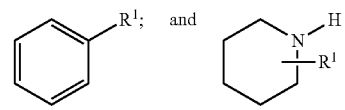

refers to at least

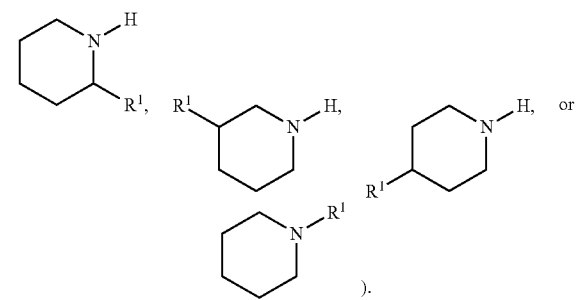).

In addition, in a polycyclic ring system, substituents may, unless otherwise indicated, replace a hydrogen on any individual ring (e.g., 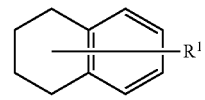)

refers to at least

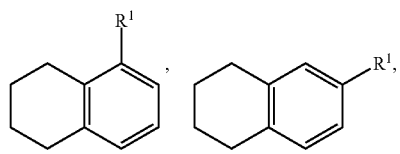

-continued

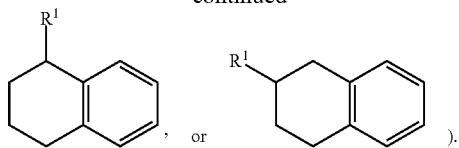

Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this disclosure are preferably those that result in the formation of stable or chemically feasible compounds. The term "stable", as used herein, refers to compounds that are not substantially altered when subjected to conditions to allow for their purification, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R^\circ$; —$(CH_2)_{0-4}OR^\circ$; —$O(CH_2)_{0-4}R^\circ$; —$O(CH_2)_{0-4}C(O)OR^\circ$; —$O(CH_2)_{0-4}OR^\circ$; —$(CH_2)_{0-4}CH(OR^\circ)_2$; —$(CH_2)_{0-4}SR^\circ$; —$(CH_2)_{0-4}Ph$, which may be substituted with $R^\circ$; —$(CH_2)_{0-4}O(CH_2)_{0-1}Ph$, which may be substituted with $R^\circ$, —CH=CHPh, which may be substituted with $R^\circ$; —$(CH_2)_{0-4}O(CH_2)_{0-1}$-pyridyl which may be substituted with $R^\circ$; —$NO_2$; —CN; —$N_3$; —$(CH_2)_{0-4}N(R^\circ)_2$; —$(CH_2)_{0-4}N(R^\circ)C(O)R^\circ$; —$N(R^\circ)C(S)R^\circ$; —$(CH_2)_{0-4}N(R^\circ)C(O)N(R^\circ)_2$; —$N(R^\circ)C(S)N(R^\circ)_2$; —$(CH_2)_{0-4}N(R^\circ)C(S)N(R^\circ)_2$; —$(CH_2)_{0-4}N(R^\circ)C(O)OR^\circ$; —$N(R^\circ)N(R^\circ)C(O)R^\circ$; —$N(R^\circ)N(R^\circ)C(O)N(R^\circ)_2$; —$N(R^\circ)N(R^\circ)(O)OR^\circ$; —$(CH_2)_{0-4}C(O)R^\circ$; —$C(S)R^\circ$; —$(CH_2)_{0-4}C(O)OR^\circ$; —$(CH_2)_{0-4}C(O)SR^\circ$; —$(CH_2)_{0-4}C(O)OSi(R^\circ)_3$; —$(CH_2)_{0-4}OC(O)R^\circ$; —OC(O)$(CH_2)_{0-4}SR^\circ$; —SC(S)SR$^\circ$; —$(CH_2)_{0-4}SC(O)R^\circ$; —$(CH_2)_{0-4}C(O)N(R^\circ)_2$; —C(S)N(R$^\circ)_2$; —C(S)SR$^\circ$; —SC(S)SR$^\circ$; —$(CH_2)_{0-4}OC(O)N(R^\circ)_2$; —C(O)N(OR$^\circ)R^\circ$; —C(O)C(O)R$^\circ$; —C(O)CH$_2$C(O)R$^\circ$; —C(NOR$^\circ)R^\circ$; —$(CH_2)_{0-4}SSR^\circ$; —$(CH_2)_{0-4}S(O)_2R^\circ$; —$(CH_2)_{0-4}S(O)_2OR^\circ$; —$(CH_2)_{0-4}OS(O)_2R^\circ$; —S(O)$_2NR^\circ$; —$(CH_2)_{0-4}S(O)R^\circ$; —N(R$^\circ)S(O)_2N(R^\circ)_2$; —N(R$^\circ)S(O)_2R^\circ$; —N(OR$^\circ)R^\circ$; —C(NH)N(R$^\circ)_2$; —P(OR$^\circ)_2$; —P(O)(R$^\circ)_2$; —OP(O)(R$^\circ)_2$; —OP(O)(OR$^\circ)_2$; —SiR$^\circ_3$; —$(C_{1-4}$ straight or branched alkylene)O—N(R$^\circ)_2$; or —$(C_{1-4}$ straight or branched alkylene)C(O)O—(NR$^\circ)_2$, wherein each $R^\circ$ may be substituted as defined below and is independently hydrogen, $C_{1-6}$ aliphatic, —CH$_2$Ph, —O(CH$_2)_{0-1}$Ph, —CH$_2$-(5- to 6-membered heteroaryl ring), or a 5- to 6-membered saturated, partially unsaturated, or aryl ring having 0-4 heteroatoms independently selected from nitrogen, oxygen, and sulfur, or, notwithstanding the definition above, two independent occurrences of $R^\circ$, taken together with their intervening atoms(s), form a 3- to 12-membered saturated, partially unsaturated, or aryl mono- or bicyclic ring having 0-4 heteroatoms independently selected from nitrogen, oxygen, and sulfur, which may be substituted as defined below.

Suitable monovalent substituents on $R^\circ$ (or the ring formed by taking two independent occurrences of $R^\circ$ together with their intervening atoms), are independently halogen; —$(CH_2)_{0-2}R^\bullet$; (haloR$^\bullet$), —$(CH_2)_{0-2}OH$; —$(CH_2)_{0-2}OR^\bullet$; —$(CH_2)_{0-2}CH(OR^\bullet)_2$; —O(haloR$^\bullet$); —CN; —$N_3$; —$(CH_2)_{0-2}C(O)R^\bullet$; —$(CH_2)_{0-2}C(O)OH$; —$(CH_2)_{0-2}C(O)OR^\bullet$; —$(CH_2)_{0-2}SR^\bullet$; —$(CH_2)_{0-2}SH$; —$(CH_2)_{0-2}NH_2$; —$(CH_2)_{0-2}NHR^\bullet$; —$(CH_2)_{0-2}NR^\bullet_2$; —NO$_2$, —SiR$^\bullet_3$; —OSiR$^\bullet_3$; —C(O)SR$^\bullet$; —$(C_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from $C_{1-4}$ aliphatic, —CH$_2$Ph, —O(CH$_2)_{0-1}$Ph, or a 5- to 6-memebered saturated, partially unsaturated, or aryl ring having 0-4 heteroatoms independently selected from nitrogen, oxygen, and sulfur. Suitable divalent substituents on a saturated carbon atom of R$^\bullet$ include =O and =S.

Suitable divalent substituents on a saturated carbon atom of an "optionally substituted" group include the following: =O; =S; =NNR$^\#_2$; =NNHCO)R$^\#_2$; =NNHC(O)OR$^\#_2$; =NNHS(O)$_2R^\#_2$; =NR$^\#$; =NOR$^\#$; —O(C(R$^\#_2))_{2-3}$O—; or —S(C(R$^\#_2))_{2-3}$S—; wherein each independent occurrence of R$^\#$ is selected from hydrogen, $C_{1-6}$ aliphatic which may be substituted as defined below, or an unsubstituted 5- to 6-membered saturated, partially unsaturated, or aryl ring having 0-4 heteroatoms independently selected from nitrogen, oxygen, and sulfur. Suitable divalent substituents that are bound to vicinal substitutable carbons of an "optionally substituted" group include: —O(CR$^\#_2)_{2-3}$O—, wherein each independent occurrence of R$^\#$ is selected from hydrogen, $C_{1-6}$ aliphatic which may be substituted as defined below, or an unsubstituted 5- to 6-membered saturated, partially unsaturated, or aryl ring having 0-4 heteroatoms independently selected from nitrogen, oxygen, and sulfur.

Suitable substituents on the aliphatic group of R$^\#$ include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently $C_{1-4}$ aliphatic, —CH$_2$Ph, —O(CH$_2)_{0-1}$Ph, or a 5- to 6-membered saturated, partially unsaturated, or aryl ring having 0-4 heteroatoms independently selected from nitrogen, oxygen, and sulfur.

Suitable substituents on a substitutable nitrogen of an "optionally substituted" group include —R$^\dagger$, —NR$^\dagger_2$, —C(O)R$^\dagger$, —C(O)OR$^\dagger$, —C(O)C(O)R$^\dagger$, —C(O)CH$_2$C(O)R$^\dagger$, —S(O)$_2R^\dagger$, —S(O)$_2NR^\dagger_2$, —C(S)NR$^\dagger_2$, —C(NH)NR$^\dagger_2$, or —N(R$^\dagger$)S(O)$_2R^{\dagger 2}$; wherein each R$^\dagger$ is independently hydrogen, C1-6 aliphatic which may be substituted as defined below, unsubstituted-OPh, or an unsubstituted 5- to 6-membered saturated, partially unsaturated, or aryl ring having 0-4 heteroatoms independently selected from nitrogen, oxygen, and sulfur, or, notwithstanding the definition above, two independent occurrences or R$^\dagger$, taken together with their intervening atom(s) form an unsubstituted 3- to 12-membered saturated, partially unsaturated, or aryl mono- or bicyclic ring having 0-4 heteroatoms independently selected from nitrogen, oxygen, and sulfur.

Suitable substituents on the aliphatic group of R$^\dagger$ are independently halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently $C_{1-4}$ aliphatic, —CH$_2$Ph, —O(CH$_2)_{0-1}$Ph, or a 5- to 6-membered saturated, partially unsaturated, or aryl ring having 0-4 heteroatoms independently selected from nitrogen, oxygen, and sulfur.

As used herein, the term compound refers to either cis-, trans-isomer or mixture thereof unless otherwise indicated. The reference to a compound containing ionizable groups such as but not limited to carboxyl, sulfonic, or amino groups include both the acidic and basic form of the compound, i.e., with any counter ion unless otherwise indicated.

For. Example, the counter ion for negatively charged acidic groups may be any positively charged ion such as, but not limited to, alkali metal ion or alkaline earth, e.g., lithium, sodium, potassium, zinc, calcium and the like; ammonium ion or alkylammonium ions, e.g., methylammonium, dimethylammonium, trimethylammonium, tetramethylammonium and the like, or arylammonium ions such as but not limited to phenylammonium, N-methyl-N-phenylammonium, and the like. Similarly, for basic group the counter may be any negatively charged ion such as but not limited to acetate, oxalate, tartrate, propionate, hexanoate, fluoride, chloride, bromide, iodide, sulfate, nitrate, and the like.

As used herein, the term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known in the art. For example, S. M. Berge et al., describe pharmaceutically acceptable salts in detail in J. Pharmaceutical Sciences, 1977, 66, 1-19, incorporated herein by reference.

In certain embodiments, the neutral forms of the compounds are regenerated by contacting the salt with a base or acid and isolating the parent compound in the conventional manner. In some embodiments, the parent form of the compound differs from the various salt forms in certain physical properties, such as solubility in polar solvents.

Unless otherwise stated, structures depicted herein are also meant to include all isomeric (e.g., enantiomeric, diastereomeric, and geometric (or conformational)) forms of the structure; for example, the R and S configurations for each asymmetric center, Z and E double bond isomers, and Z and E conformational isomers. Therefore, single stereochemical isomers as well as enantiomeric, diastereomeric, and geometric (or conformational) mixtures of the present compounds of the disclosure. For example, a squiggly bond within a bonded chemical structure is used to represent unknown stereochemistry and intended to encompass all possible stereochemical and geometric isomers, such as

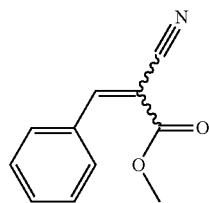

represents

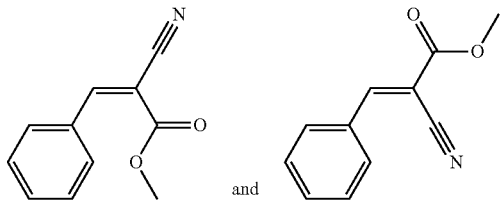

Unless otherwise stated, all tautomeric forms of the compounds of the disclosure are within the scope of the disclosure. Additionally, unless otherwise stated, structures depicted herein are also meant to include compounds that differ only in the presence of one or more isotopically enriched atoms. For example, compounds having the present structures including the replacement of hydrogen by deuterium or tritium, or the replacement of a carbon by a $^{13}C$- or $^{14}C$-enriched carbon are with the scope of this disclosure. Such compounds are useful, for example, as analytical tools, as probes in biological assays, or as therapeutic agents in accordance with the present disclosure. In some embodiments, compounds of the present disclosure are provided as a single enantiomer or single diastereomer. Single enantiomer refers to an enantiomeric excess 80% or more, such as 81, 82, 83, 84, 85, 86, 87, 88, 89, 90, 91, 92, 93, 94, 95, 96, 97, 98, or 99%.

The term "oxo", as used herein, means an oxygen that is double bonded to a carbon atom thereby forming a carbonyl.

The articles "a" and "an" are used herein to refer to one or to more than one (i.e., to at least one) of the grammatical object of the article. By way of example, "an element" means one element or more than one element.

A "dosing regimen" (or "therapeutic regimen"), as that term is used herein, is a set of unit doses (typically more than one) that are administered individually to a subject, typically separated by periods of time. In some embodiments, a given therapeutic agent has a recommended dosing regimen, which may involve one or more doses. In some embodiments, a dosing regimen comprises a plurality of doses each of which are separated from one another by a time period of the same length; in some embodiments, a dosing regimen comprises a plurality of doses and at least two different time periods separating individual doses.

As will be understood from context, a "reference" compound is one that is sufficiently similar to a particular compound of interest to permit a relevant comparison. In some embodiments, information about a reference compound is obtained simultaneously with information about a particular compound. In some embodiments, comparison of a particular compound of interest with a reference compound establishes identity with, similarity to, or difference of the particular compound of interest relative to the compound.

As used herein, the phrase "therapeutic agent" refers to any agent that has a therapeutic effect and/or elicits a desired biological and/or pharmacological effect, when administered to a subject.

As used herein, the term "therapeutically effective amount" refers to an amount of a therapeutic agent that confers a therapeutic effect on the treated subject, at a reasonable benefit/risk ratio applicable to any medical treatment. The therapeutic effect may be objective (i.e., measurable by some test or marker) or subjective (i.e., subject gives an indication of or feels an effect). In particular, the "therapeutically effective amount" refers to an amount of a therapeutic agent effective to treat, ameliorate, or prevent a desired disease or condition, or to exhibit a detectable therapeutic or preventive effect, such as by ameliorating symptoms associated with the disease, preventing or delaying the onset of the disease or condition, and/or also lessening the severity or frequency of symptoms of the disease or condition. A therapeutically effective amount is commonly administered in a dosing regimen that may comprise multiple doses. For any particular therapeutic agent, a therapeutically effective amount (and/or an appropriate unit dose within an effective dosing regimen) may vary, for example, depending on route of administration, on combination with other pharmaceutical agents. Also, the specific therapeutically effective amount (and/or unit dose) for any particular subject may depend upon a variety of factors including the disorder being treated and the severity of the disorder, the activity of the specific therapeutic agent employed; the specific composition employed; the age, body weight, general health, sex and diet of the subject; the time of administration, route of administration, and/or rate of excretion or metabolism of the specific therapeutic agent employed; the duration of the treatment; and like factors as is well known in the medical arts.

As used herein, the term "treatment" (also "treat" or "treating") refers to any administration of a substance (e.g., provided compositions) that partially or completely alleviates, ameliorates, relives, inhibits, delays onset of, reduces severity of, and/or reduces incidence of one or more symptoms, features, and/or causes of a particular disease, disorder, and/or condition. Such treatment may be of a subject who does not exhibit signs of the relevant disease, disorder, and/or condition. Alternatively or additionally, such treatment may be of a subject who exhibits one or more established signs of the relevant disease, disorder, and/or condition. In some embodiments, treatments may be of a subject who has been diagnosed as suffering from the relevant disease, disorder, and/or condition.

In some embodiments, treatment may be of a subject known to have one or more susceptibility factors that are statistically correlated with increased risk of development of the relevant disease, disorder, and/or condition.

All references disclosed herein are incorporated by reference in their entirety.

Compounds

An aspect of the disclosure is directed to compounds and compositions comprising one or more of such compounds or a salt thereof capable of the absorption of UV-A and/or UV-B radiation.

The compounds can have the chemical structure of formula I and/or II, or salts thereof:

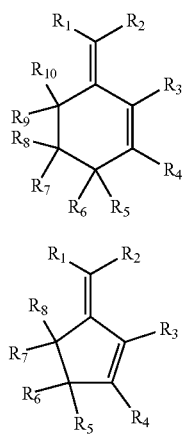

wherein:
$R_1$ and $R_2$ are independently selected from H, optionally substituted alkyl, optionally substituted alkynyl, optionally substituted aminoalkyl, optionally substituted hydroxyalkyl, optionally substituted alkoxyalkyl, —CN, —C(O)R', —C(O)OR', —C(O)NR'R", —C(O)SR', —C(S)NR'R", —NCO, —C(O)—X—$R_y$, C(O)—X—$R_z$, and —NO$_2$; or $R_1$ and $R_2$ together with the carbon atom to which they are attached form a cyclic moiety of Formula III or Formula IV:

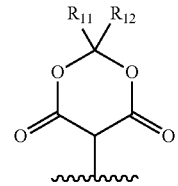

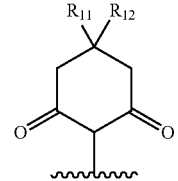

wherein:
X is O or NR';
$R_{11}$ and $R_{12}$ are independently selected from H, and optionally substituted alkyl;
$R_y$ and $R_z$ are independently selected from H, optionally substituted $C_{1-15}$ alkyl, optionally substituted hydroxyalkyl, optionally substituted alkoxyalkyl, a polyamide, and a polyether;
$R_4$ is selected from optionally substituted $C_6$-$C_{10}$ aryl, optionally substituted $C_2$-$C_9$ heteroaryl comprising 0-4 heteroatoms selected from O, N, and S;
each $R_3$, $R_5$, $R_6$, $R_7$, $R_8$, $R_9$, and $R_{10}$ is independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —CNO, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR"), PR'$_3$, PR'$_2$, —P(OR')$_2$, —OP(OR')$_2$, —P(O)(OR')$_2$, —OP(O)(OR')$_2$, a polyamide, and a polyether; and
each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_{20}$ heteroaryl, a polyamide, and a polyether.

In some embodiments, the compound has the structure of formula I.

In some other embodiments, the compound has the structure of formula II.

In preferred embodiments of the composition, the compound is selected from compounds E1-E64 of Table 6.

In some embodiments, $R_4$ is optionally substituted phenyl.

In some embodiments, at least one of $R_1$ and $R_2$ is —C(O)—X—$R_y$.

In some embodiments, the compounds of the present disclosure have the structure of the general Formula I and/or II:

Formula I

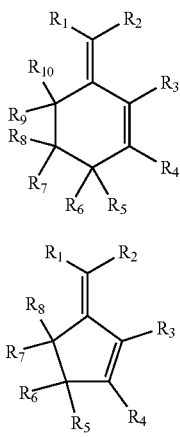

Formula II

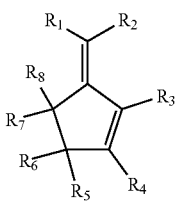

or salts thereof;
wherein:
$R_1$ and $R_2$ are independently H, substituted or unsubstituted $C_1$-$C_8$ alkyl, $C_1$-$C_8$ alkenyl, $C_1$-$C_8$ alkynyl, $C_1$-$C_8$ aminoalkyl, $C_1$-$C_8$ hydroxyalkyl, $C_1$-$C_8$ alkyisocyanate, $C_1$-$C_8$ alkylisothiocyanate, CN, C(O)R', C(O)OR', C(O)NR'R", C(O)SR', C(S)NR'R", or $NO_2$; or
$R_1$ and $R_2$ form cyclic moiety wherein the cyclic moiety is Formula III or Formula IV:

Formula III

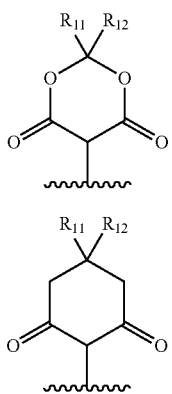

Formula IV

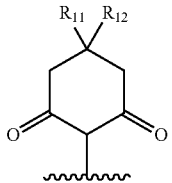

wherein:
$R_{11}$ and $R_{12}$ are H or $C_1$-$C_{15}$ alkyl such as but not limited to methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl and isomers and variants thereof.
$R_4$ is substituted or unsubstituted $C_6$-$C_{10}$ aryl such as but not limited to phenyl, biphenyl, naphthyl, benzyl, benzoyl, 2-, 3-, and/or 4-hydoxyphenyl, 2-, 3-, and/or 4-mercaptophenyl, 2-, 3-, and/or 4-aminophenyl, 2-, 3-, or 4-phenylsulfonic acid and salts thereof, 2-, 3-, and/or 4-nitrophenyl, 2-, 3-, and/or 4-halophenyl such as fluorophenyl, chlorophenyl, bromophenyl, and iodophenyl, alkoxyphenyl such as but not limited to methoxy, ethoxy and the like, phenylalkyl such as 2-, 3-, and/or 4-methyl, -ethyl, -propyl, -butyl, -isobutyl, t-butyl and like, mono-, di-, and trihalomethylphenyl such as trifluoromethyl, trichloromethyl, and tribromomethyl; or substituted or unsubstituted $C_2$-$C_9$ heteroaryl comprising one or more atoms selected from O, N, and S such as but not limited to pyrrolyl, pyridyl, pyrrolidinyl, pyrrolidonyl, thiophenyl; indolyl, isoindolyl, imidazolyl, thiazolyl, pyrimidyl, triazolyl, triazinyl and the like. Also, the aryl or heteroaryl group, may be mono-, di-, or trisubstituted such as but not limited to di- or trifluorophenyl, di- or triisocyanate, di- or triisothiocyanate, di- or trimethyl and the like.
$R_3$, $R_5$, $R_6$, $R_7$, $R_8$, $R_9$, and $R_{10}$ are independently H, halogen, or substituted or unsubstituted $C_1$-$C_{20}$ alkyl such as but not limited to methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl or isomers and variants thereof, $C_2$-$C_{20}$ alkenyl such as but not limited to vinyl, 2-methylvinyl, butadienyl, isoprenyl, and the like, $C_2$-$C_{20}$ alkynyl such as but not limited to acetenyl, 2-methylacetenyl, and the like; $C_3$-$C_8$ cycloalkyl such as but not limited to cyclopropyl, cyclobutyl, cyclopentyl, cyclohexyl and the like; $C_2$-$C_7$ heterocycloalkyl such as but not limited to aziridinyl, azetidinyl, pyrrolidinyl, tetrahydrofuranyl, sulfolanyl, tetrahydrothiopheneyl and the like, aryl as defined for $R_4$, heteroaryl as defined for $R_4$, OR', C(O)R', C(O)OR', C(O)R'R", R'R"NC=NR', R'C=NR", NR'R", CN, N=NR', cyanate, $NO_2$, OC(O)NR'R", SR', S—SR', S(O)R', S(O)$_2$R', S(O)$_2$OR', S(O)$_2$NR', C(O)SR', C(S)SR', C(S)NR', B(OH)$_2$, B(OR')(OR"), PR'$_3$, PR'$_2$, P(OR')$_2$, OP(OR')$_2$, P(O)(OR')$_2$, OP(O)(OR')$_2$, polyamide, or polyether, and
each R' and R" is independently H, substituted or unsubstituted $C_1$-$C_{20}$ alkyl, $C_1$-$C_{20}$ alkenyl, $C_2$-$C_{20}$ alkynyl, $C_2$-$C_{20}$ cycloalkyl, $C_2$-$C_{20}$ cycloalkenyl, $C_2$-$C_{20}$ heterocycloalkyl, $C_6$-$C_{10}$ aryl, $C_2$-$C_9$ heteroaryl, a polyamide, or a polyether, as defined above.
In some embodiments, each $R_1$ and $R_2$ is independently selected from optionally substituted $C_1$-$C_8$ aminoalkyl, optionally substituted $C_1$-$C_{20}$ hydroxyalkyl, optionally substituted $C_1$-$C_{20}$ alkylisocyanate, and optionally substituted $C_1$-$C_{20}$ alkylisothiocyanate.
In some embodiments, the one or more compound has the cis-, trans- or mixture thereof of formula V or salts thereof:

Formula V

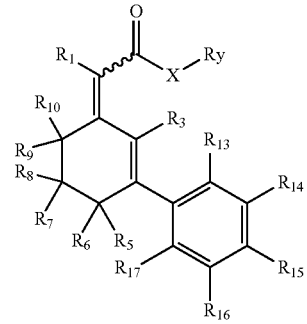

wherein:
$R_1$ is H, CN, alkylisocyanate, alkylisothiocyanate, arylisocyanate, arylisothiocyanate, or C(O)—X—$R_z$;
X is O or NR';
$R_y$ and $R_z$ are independently H, substituted or unsubstituted $C_1$-$C_{15}$ alkyl groups such as but not limited to methyl, ethyl, propyl, isopropyl, butyl, isobutyl, sec-butyl, tert-butyl, pentyl, sec-isoamyl, tert-amyl, 2-methylbutyl, 3-methylbutyl, neopentyl, 2-methylpentyl 3-methylpentyl, 4-methylpentyl, hexyl, 2-ethylhexyl, 2-butyloctyl and the like; hydroxyalkyl such as but not limited to 2-hydroxyethyl, 3-hydroxypropyl and the like; alkoxyalkyl such as but not limited 3-methoxypropyl or 2-ethoxyethyl and the like, polyamide including peptides, or polyether;

$R_3$, $R_5$, $R_6$, $R_7$, $R_8$, $R_9$, and $R_{10}$ are as described herein above for formula I;

$R_{13}$, $R_{14}$, $R_{15}$, $R_{16}$, and $R_{17}$ are independently H, halogen, substituted or unsubstituted $C_1$-$C_{20}$ alkyl, $C_2$-$C_{20}$ alkenyl, $C_2$-$C_{20}$ alkynyl, $C_3$-$C_8$ cycloalkyl, $C_2$-$C_{20}$ cycloalkenyl, $C_2$-$C_7$ heterocycloalkyl, $C_6$-$C_{10}$ aryl, $C_2$-$C_9$ heteroaryl, OR', C(O)R', C(O)OR', C(O)NR'R'', R'R''NC=NR', R'C=NR'', NR'R'', CN, N=NR', cyanate, $NO_2$, OC(O)NR'R'', SR', S—SR', S(O)R', S(O)$_2$R', S(O)$_2$OR', S(O)$_2$NR', C(O)SR', C(S)SR', C(S)NR', B(OH)$_2$, B(OR')(OR''), PR'$_3$, PR'$_2$, P(OR')$_2$, OP(OR')$_2$, P(O)(OR')$_2$, OP(O)(OR')$_2$, a polyamide, or a polyether; and R' and R'' are independently H, substituted or unsubstituted $C_1$-$C_{20}$ alkyl, $C_1$-$C_{20}$ alkenyl, $C_2$-$C_{20}$ alkynyl, $C_2$-$C_{20}$ cycloalkyl, $C_2$-$C_{20}$ cycloalkenyl, $C_2$-$C_{20}$ heterocycloalkyl, $C_6$-$C_{10}$ aryl, $C_2$-$C_9$ heteroaryl, a polyamide, or a polyether.

In some other embodiments, the one or more compound has the structure of formula VI or salt thereof:

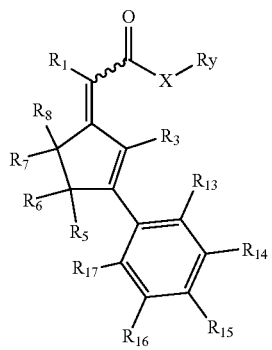

Formula VI wherein:
$R_1$ is H, CN, alkylisocyanate, alkylisothiocyanate, arylisocyanate, arylisothiocyanate, or C(O)—X—$R_z$,
X is O or NR';
$R_y$ and $R_z$ are independently H, substituted or unsubstituted $C_1$-$C_{15}$ alkyl such as but not limited to methyl, ethyl, propyl, isopropyl, butyl, isobutyl, sec-butyl, tert-butyl, 2-methylbutyl, 3-methylbutyl, pentyl, neopentyl, 2-methylpentyl 3-methylpentyl, 4-methylpentyl, hexyl, 2-ethylhexyl, 2-butyloctyl and the like; hydroxyalkyl such as but not limited to 2-hydroxyethyl, 3-hydroxypropyl and the like; alkoxyalkyl such as but not limited 3-methoxypropyl or 2-ethoxyethyl and the like, polyamide including peptides, or polyether;

$R_3$, $R_5$, $R_6$, $R_7$, and $R_8$ are as described herein above for formula II;

each $R_{13}$, $R_{14}$, $R_{15}$, $R_{16}$, and $R_{17}$ is independently selected from H, halogen, substituted or unsubstituted $C_1$-$C_{20}$ alkyl, $C_2$-$C_{20}$ alkenyl, $C_2$-$C_{20}$ alkynyl, $C_3$-$C_8$ cycloalkyl, $C_2$-$C_{20}$ cycloalkenyl, $C_2$-$C_7$ heterocycloalkyl, $C_6$-$C_{10}$ aryl, $C_2$-$C_9$ heteroaryl, OR', R'OR'', C(O)R', C(O)OR', C(O)NR'R'', R'R''NC=NR', R'C=NR'', NR'R'', CN, N=NR', cyanate, $NO_2$, OC(O)NR'R'', SR', S—SR', S(O)R', S(O)$_2$R', S(O)$_2$OR', S(O)$_2$NR', C(O)SR', C(S)SR', C(S)NR', B(OH)$_2$, B(OR')(OR''), PR'$_3$, PR'$_2$, P(OR')$_2$, OP(OR')$_2$, P(O)(OR')$_2$, OP(O)(OR')$_2$, polyamide, or polyether; R' and R'' are independently selected from H, substituted or unsubstituted $C_1$-$C_{20}$ alkyl, $C_1$-$C_{20}$ alkenyl, $C_2$-$C_{20}$ alkynyl, $C_2$-$C_{20}$ cycloalkyl, $C_2$-$C_{20}$ cycloalkenyl, $C_2$-$C_{220}$ heterocycloalkyl, $C_6$-$C_{10}$ aryl, $C_2$-$C_9$ heteroaryl, a polyamide, and a polyether.

In some embodiments, $R_1$ and $R_2$ of compounds of formula I and II are independently selected from H, substituted or unsubstituted $C_1$-$C_8$ aminoalkyl, $C_1$-$C_8$ hydroxyalkyl, $C_1$-$C_8$ alkylisocyanate, $C_1$-$C_8$ alkylisothiocyanate, COOR', or COSR'; and salts thereof; or $R_1$ and $R_2$ form cyclic moiety wherein the cyclic moiety is formula III or

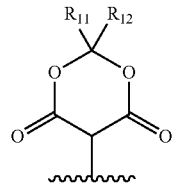

Formula III

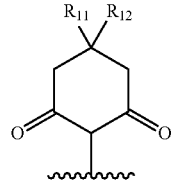

Formula IV wherein:
$R_{11}$ and $R_{12}$ are independently H or alkyl; and
R' and R'' are independently H, substituted or unsubstituted $C_1$-$C_{20}$ alkyl, $C_1$-$C_{20}$ alkenyl, $C_2$-$C_{20}$ alkynyl, $C_2$-$C_{20}$ cycloalkyl, $C_2$-$C_{20}$ cycloalkenyl, $C_2$-$C_{20}$ heterocycloalkyl, $C_6$-$C_{10}$ aryl, $C_2$-$C_9$ heteroaryl, a polyamide, or a polyether.

In some embodiments, the compounds of formula I and II or salts thereof are multimeric, e.g., dimeric, or trimeric.

An aspect of the disclosure is directed to cis- and/or trans-chemical compound having the structure of formula V and/or VI, or salts thereof:

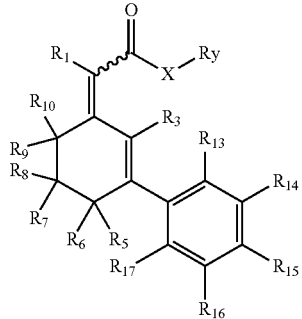

Formula V

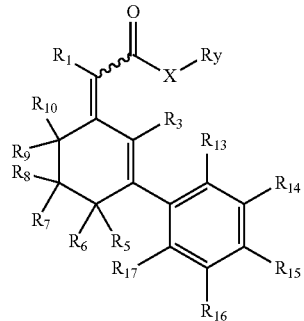

Formula V

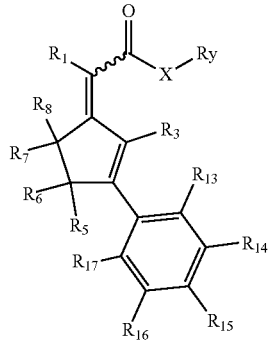

Formula VI

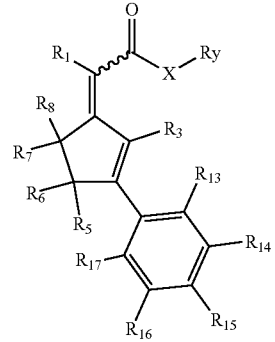

Formula VI wherein:

R₁ is H, CN, alkylisocyanate, alkylisothiocyanate, arylisocyanate, arylisothiocyanate, or C(O)—X—R_z, X is O or NR';

R_y and R_z are independently H, substituted or unsubstituted C₁-C₁₅ alkyl, C₁-C₁₅ hydroxyalkyl, C₁-C₁₅ is alkoxyalkyl, apolyamide, or a polyether;

R₁₃, R₁₄, R₁₅, R₁₆, and R₁₇ are independently H, halogen, substituted or unsubstituted C₁-C₂₀ alkyl, C₂-C₂₀ alkenyl, C₂-C₂₀ alkynyl, C₃-C₈ cycloalkyl, C₂-C₂₀ cycloalkenyl, C₂-C₇ heterocycloalkyl, C₆-C₁₀ aryl, C₂-C₉ heteroaryl, OR', C(O)R', C(O)OR', C(O)NR'R", R'R"NC=NR', R'C=NR", NR'R", CN, N=NR', cyanate, NO₂, OC(O)NR'R", SR', S—SR', S(O)R', S(O)₂R', S(O)₂OR', S(O)₂NR', C(O)SR', C(S)SR', C(S)NR', B(OH)₂, B(OR')(OR"), PR'₃, PR'₂, P(OR')₂, OP(OR')₂, P(O)(OR')₂, OP(O)(OR')₂, a polyamide, or a polyether;

R' and R" are independently H, substituted or unsubstituted C₁-C₂₀ alkyl, C₁-C₂₀ alkenyl, C₂-C₂₀ alkynyl, C₂-C₂₀ cycloalkyl, C₂-C₂₀ cycloalkenyl, C₂-C₂₀ heterocycloalkyl, C₆-C₁₀ aryl, C₂-C₉ heteroaryl, a polyamide, or a polyether, R₃, R₅, R₆, R₇, R₈, R₉ and R₁₀ are as defined for formula I.

R_y and R_z are independently H, methyl, ethyl, propyl, isopropyl, butyl, isobutyl, sec-butyl, tert-butyl, pentyl, sec-isoamyl, fert-amyl, 2-methylbutyl, 3-methylbutyl, neopentyl, hexyl, 2-ethylhexyl, 2-butyloctyl, 2-ethoxyethyl, 3-methoxypropyl, polyamide, or polyether; and R₁₃, R₁₄, R₁₅, R₁₆, and R₁₇ are independently H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, amino, methylamino, dimethylamino, trimethylammonium, trifluoromethyl, or NO₂.

In some embodiments of Formula I and II, the compounds having cis- and/or trans structure are of Formula V or Formula VI:

or a salt thereof, wherein:

R₁ is selected from H, —CN, alkylisocyanate, alkylisothiocyanate, arylisocyanate, arylisothiocyanate, and C(O)—X—R_z;

each R₁₃, R₁₄, R₁₅, R₁₆, and R₁₇ is independently selected from H, halogen, optionally substituted C₁-C₂₀ alkyl, optionally substituted C₂-C₂₀ alkenyl, optionally substituted C₂-C₂₀ alkynyl, optionally substituted C₃-C₈ cycloalkyl, optionally substituted C₂-C₂₀ cycloalkenyl, optionally substituted C₂-C₇ heterocycloalkyl, optionally substituted C₆-C₁₀ aryl, optionally substituted C₂-C₉ heteroaryl, —OR', —C(O)R', —C(O)OR', C(O)NR'cR", —C(=NR')NR'R", —C(=NR")R', —NR'R", —CN, —N=NR', cyanate, —OCN, —NO₂, —OC(O)NR'R", —SR', —S—SR', —S(O)R', —S(O)₂R', —S(O)₂OR', —S(O)₂NR', —C(O)SR', —C(S)SR', —C(S)NR', —B(OH)₂, —B(OR')(OR"), —PR'₂, —P(OR')₂, —OP(OR')₂, —P(O)(OR')_z, —OP(O)(OR')₂, a polyamide, and a polyether.

In some embodiments of Formula V and VI, R₁ is —CN.

In some embodiments of Formula V and VI, R₁ is —C(O)—X—R_z.

In some embodiments of Formula V and VI, R_y and R_z are optionally substituted C₁₋₁₅ alkyl.

In some embodiments of Formula V and VI, X is O.

In some embodiments of Formula V and VI, X is NH.

In some embodiments of Formula I, II, V and VI:

each R_y and R_z is independently selected from H, methyl, ethyl, propyl, isopropyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, 2-ethoxyethyl, and 3-methoxypropyl; and each R₃, R₅, R₆, R₇, R₈, R₉, R₁₀, R₁₃, R₁₄, R₁₅, R₁₆, and R₁₇ is independently selected from H, halogen, methyl, ethyl, propyl, isopropyl, isobutyl, sec-butyl, fert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, amino, methylamino, dimethylamino, trimethylammonium, trifluoromethyl, and —NO$_2$ In some embodiments of Formula I, II, V and VI, R$_y$ and R$_z$ are independently selected from

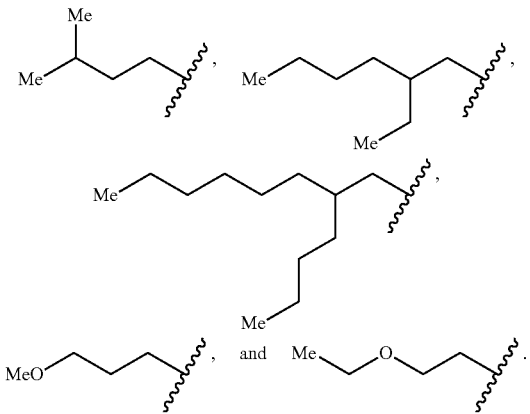

In some embodiments of Formula I, II, V and VI, R$_4$ is selected from

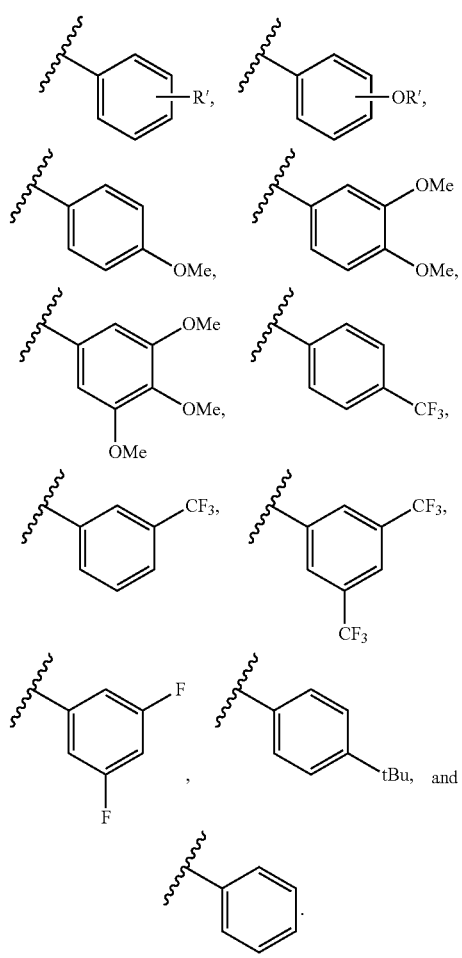

In some embodiments, the compounds of formula I and II or salts thereof, are in a multimeric form.

Aspects of the disclosure include multimeric compounds of Formula VII or Formula VIII:

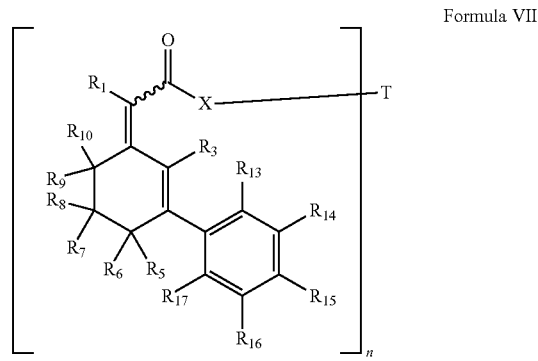

Formula VII

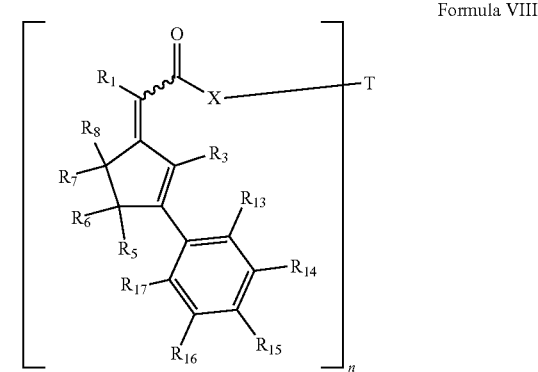

Formula VIII or a salt thereof,
wherein:
each R$_1$ is independently selected from H, —CN, alkylisocyanate, alkylisothiocyanate, arylisocyanate, arylisothiocyanate, and C(O)—X—R$_z$;
X is O or NR';
T is a linking moiety selected from optionally substituted C$_1$-C$_{20}$ alkylene, optionally substituted C$_2$-C$_{20}$ alkenylene, optionally substituted C$_2$-C$_{20}$ alkynylene, optionally substituted C$_2$-C$_{20}$ alkoxyalkylene, optionally substituted C$_2$-C$_{20}$ cycloalkylene, optionally substituted C$_2$-C$_{20}$ cycloalkenylene, and optionally substituted C$_2$-C$_{20}$ heterocycloalkylene, wherein one or more carbon atoms of the backbone of the linking moiety T are optionally replaced by a divalent group each independently selected from oxygen (—O—), carbonyl (—CO—), optionally substituted alkylamino, optionally substituted cycloalkylene, optionally substituted heterocyclylene, optionally substituted heteroarylene, and optionally substituted arylene;
each R$_2$ is independently selected from H, optionally substituted C$_{1-15}$ alkyl, optionally substituted hydroxyalkyl, optionally substituted alkoxyalkyl, a polyamide, and a polyether;
each R$_3$, R$_5$, R$_6$, R$_7$, R$_8$, R$_9$, R$_{10}$, R$_{13}$, R$_{14}$, R$_{15}$, R$_{16}$, and R$_{17}$ is independently selected from H, halogen, optionally substituted C$_1$-C$_{20}$ alkyl, optionally substituted C$_2$-C$_{20}$ alkenyl, optionally substituted C$_2$-C$_{20}$ alkynyl, optionally substituted C$_3$-C$_8$ cycloalkyl, optionally substituted C$_2$-C$_{20}$ cycloalkenyl, optionally substituted C$_2$-C$_7$ heterocycloalkyl, optionally substituted C$_6$-C$_{10}$ aryl, optionally substituted $C_2$-$C_9$ heteroaryl, —OR', —C(O)R', —C(O)OR', —C(O)NR'R", —C(=NR') NR'R", —C(=NR")R', —NR'R", —CN, —N=NR', cyanate, —OCN, —CNO, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR"), PR'$_3$, PR'$_2$, —P(OR')$_2$, —OP(OR')$_2$, —P(O)(OR')$_2$, —OP(O)(OR')$_2$, a polyamide, and a polyether;

each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether; and n is selected from 2, 3, 4, 5, and 6.

In some embodiments, $R_1$ is —CN.

In some embodiments, $R_1$ is —C(O)—X—$R_z$.

In some embodiments, $R_z$ is independently optionally substituted $C_{1-15}$ alkyl.

In some embodiments, X is O.

In some embodiments, X is NH.

In some embodiments, the compound is of Formula VII.

In some embodiments, the compound is of Formula VIII.

It is understood that any of the embodiments of compound chromophores of Formula I and II can also be applied to the multimeric and polymeric forms of the compounds.

In some embodiments, the compounds of formula I and II or salts thereof, are conjugated to an oligomer such as but not limited to oligopeptide, polypeptide, protein, polyethylene glycol (PEG), polypropylene glycol (PPG), polyamide, polycarbonate, polyurethane, polyurea, polyester, oligo- or polysaccharides, and the like. Examples of polysaccharides include but are not limited to chitin, chitosan, cotton, cellulose, hemicellulose, pectin, and the like. In some other embodiments, the compounds or salts thereof are copolymerized with ethylene oxide, propylene oxide, hydroxy acids, carboxylic acid, amines, isocyanate-alcohols/amines, isothiocyanate-alcohols/amines, and the like. For example, when $R_1$ and $R_2$ are selected from polymerizable functional groups such as but not limited to carboxyl, $C_1$-$C_8$ aminoalkyl such as aminomethyl, 2-aminoethyl, 3-aminopropyl, 4-aminopentyl, 6-aminohexyl, and isomers and the like thereof; $C_1$-$C_8$ hydroxyalkyl such as hydroxymethyl, 2-hydroxyethyl, 3-hydroxypropyl, 4-hydroxypentyl, 6-hydroxyhexyl, and isomers and the like thereof; $C_1$-$C_8$ alkyisocyanate such as methylisocyanate, 2-ethylisocyanate, 3-propylisocyanate, 4-pentylisocyanate, 6-hexylisocynate, and isomers and the like thereof, and $C_1$-$C_8$ alkyisothiocyanates such as methylthioisocyanate, 2-ethylthioisocyanate, 3-propylthioisocyanate, 4-pentylthioisocyanate, 6-hexylthioisocyanate, and isomers and the like thereof, they can be copolymerizes with compounds such as, but not limited to, ethylene glycol, ethylene oxide, propylene glycol, propylene oxide, glycerol, $C_4$-$C_6$ polyol, ethylenediamine, propylenediamine, 1,4-butanediamine (putrescine), 1,5-diaminopentane (cadaverine), 1,6-hexanediamine, dithiocyanate, and diisocyanate derives by well-known method in the art.

In some embodiments, oligomer or polymer comprises the chromophore of formula XI or XII:

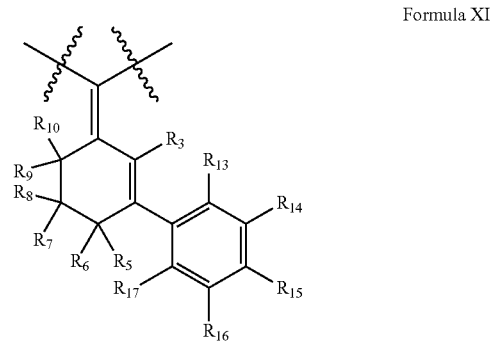

Formula XI

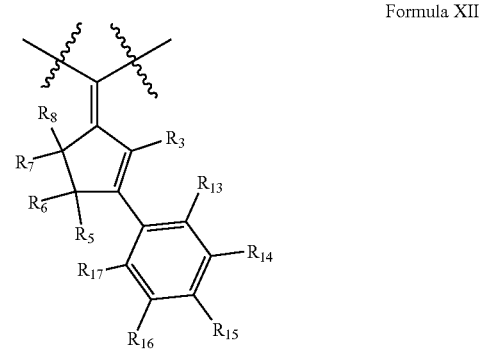

Formula XII wherein:
each $R_3$, $R_5$, $R_6$, $R_7$, $R_8$, $R_9$, $R_{10}$, $R_{13}$, $R_{14}$, $R_{15}$, $R_{16}$, and $R_{17}$ is independently selected from H, halogen, substituted or unsubstituted $C_1$-$C_{20}$ alkyl, $C_2$-$C_{20}$ alkenyl, $C_2$-$C_{20}$ alkynyl, $C_3$-$C_8$ cycloalkyl, $C_2$-$C_{20}$ cycloalkenyl, $C_2$-$C_7$ heterocycloalkyl, $C_6$-$C_{10}$ aryl, $C_2$-$C_9$ heteroaryl, OR', C(O)R', C(O)OR', C(O)NR'R", R'R"NC=NR', R'C=NR", NR'R", CN, N=NR', cyanate, NO$_2$, OC(O) NR'R", SR', S—SR', S(O)R', S(O)$_2$R', S(O)$_2$OR', S(O)$_2$NR', C(O)SR', C(S)SR', C(S)NR', B(OH)$_2$, B(OR')(OR"), PR'$_3$, PR'$_2$, P(OR')$_2$, OP(OR')$_2$, P(O) (OR')$_2$, OP(O)(OR')$_2$, a polyamide, and a polyether; and R' and R" are independently H, substituted or unsubstituted $C_1$-$C_{20}$ alkyl, $C_1$-$C_{20}$ alkenyl, $C_2$-$C_{20}$ alkynyl, $C_2$-$C_{20}$ cycloalkyl, $C_2$-$C_{20}$ cycloalkenyl, $C_2$-$C_{20}$ heterocycloalkyl, $C_6$-$C_{10}$ aryl, $C_2$-$C_9$ heteroaryl, a polyamide, or a polyether.

This disclosure provides oligomers and polymers including monomer repeat units of Formula XI and/or XII that are linked together using a suitable linking chemistry or linking moiety. Exemplary linking moieties are described herein. In some embodiments, the oligomers and polymers are characterized as a polyether, polyester, polyamide, polycarbonate, polyurethane, polyurea, or polysaccharide. In some embodiments, a monomer precursor of the oligomers and polymers of this disclosure is a compound of Formula I and/or II.

This disclosure provides co-polymers including monomer repeat units of Formula XI and/or XII, and one or more additional co-monomers of interest, and/or terminal groups or conjugated moieties of interest. The co-polymers can be random co-polymers or block co-polymers.

In some embodiments, the oligomer or polymer has an average length or degree of polymerization in the range of 5-5000 repeat units, such as 5-1000, 5-500, 5-100, or 10-100. In some embodiments, the length is 5-100, such as 5-50, 10-50, 10-40, 10-30, or 10-20 repeat units.

The amount of the chromophore (e.g., number of repeat units of Formula) in the oligomer or polymer would vary depending on the desired application. In some embodiments, the oligomer or polymer may be homo-oligomer or homopolymer of the compounds of formula I or II. The oligomer or polymer is obtained by copolymerizing the compound of formula I or II, or salt thereof with other monomer(s) in different molar ratios such as but not limited to 1:1, 1:10, 1:20, 1:30, 1:50, 1:100, 1:150, 1:200, 1:300, 1:400, 1:500, 1:700, 1:1000, 1:1500, or 1:200.

One preferred embodiment, the one or more compound has the structure formula IX:

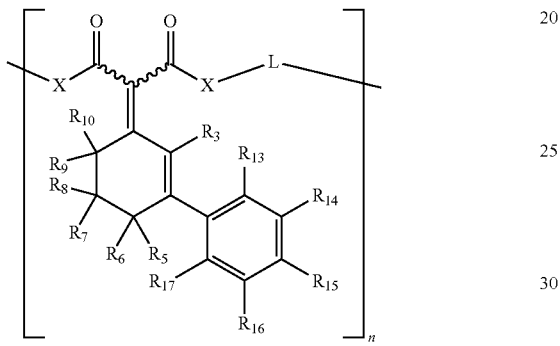

Formula IX wherein:

X is O or NR';

L is $C_1$-$C_{20}$ alkyl, alkenyl, alkyne, alkoxyalkyl, cycloalkyl, cycloalkenyl, heterocycloalkyl, aryl, heteroaryl, polyamide, or polyether;

$R_3$, $R_5$, $R_6$, $R_7$, $R_8$, $R_9$, $R_{10}$, $R_{13}$, $R_{14}$, $R_{15}$, $R_{16}$, and $R_{17}$ are as defined herein for formula V; and n is any number of repeating units of at least 2, 3, 4, 5, 10, 20, 100, 150, 300, 500, 1000 or more.

A second preferred embodiment, the one or more compound has the structure of Formula X:

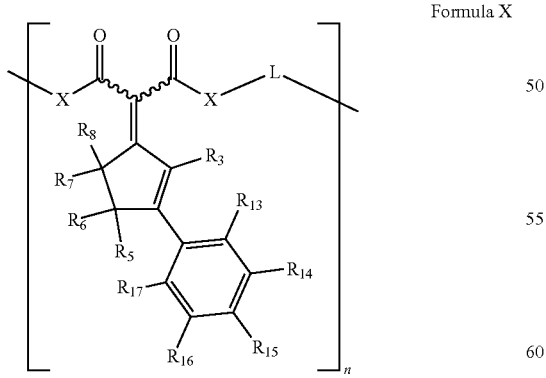

Formula X wherein:

X is O or NR';

L is substituted or unsubstituted $C_1$-$C_{20}$ alkyl, alkenyl, alkyne, alkoxyalkyl, cycloalkyl, cycloalkenyl, heterocycloalkyl, aryl, heteroaryl, polyamide, or polyether;

$R_3$, $R_5$, $R_6$, $R_7$, $R_8$, $R_{13}$, $R_{14}$, $R_{15}$, $R_{16}$, and $R_{17}$ are as defined herein for formula VI, and n is any number of repeating units of at least 2, 3, 4, 5, 10, 20, 100, 150, 300, 500, 1000 or more.

In some embodiments, the oligomer or polymer compound is of Formula IX or X:

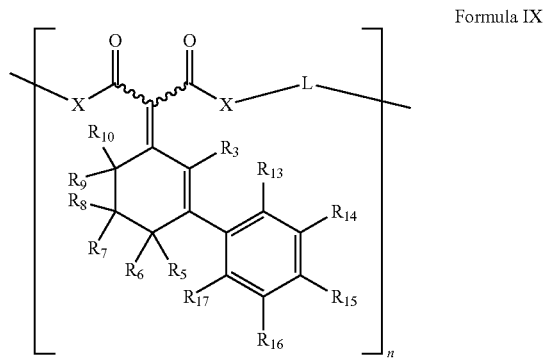

Formula IX

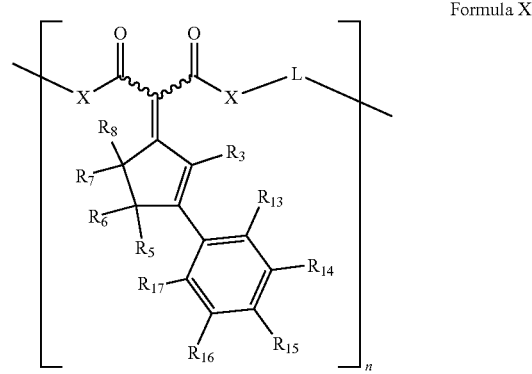

Formula X or is a salt thereof, wherein:

each X is independently O or NR';

L is a divalent linking moiety selected from optionally substituted $C_1$-$C_{20}$ alkylene, optionally substituted $C_1$-$C_{20}$ alkenylene, optionally substituted $C_2$-$C_{20}$ alkynylene, optionally substituted $C_2$-$C_{20}$ alkoxyalkylene, optionally substituted $C_2$-$C_{20}$ cycloalkylene, optionally substituted $C_2$-$C_{20}$ cycloalkenylene, optionally substituted $C_2$-$C_{20}$ heterocycloalkylene, wherein one or more carbon atoms of the backbone of L are optionally replaced by a divalent group each independently selected from oxygen (—O—), carbonyl (—CO—), optionally substituted alkylamino, optionally substituted cycloalkylene, optionally substituted heterocyclylene, optionally substituted heteroarylene, optionally substituted arylene, a polyamide, and a polyether;

each $R_3$, $R_5$, $R_6$, $R_7$, $R_8$, $R_9$, $R_{10}$, $R_{13}$, $R_{14}$, $R_{15}$, $R_{16}$, and $R_{17}$ is independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR') NR'R", —C(=NR")R', —NR'R", —CN, —N=NR', cyanate, —OCN, —NCO, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR''), PR'$_3$, —PR'$_2$, —P(OR')$_2$, —OP(OR')$_2$, —P(O)(OR')$_2$, —OP(O)(OR')$_2$, a polyamide, and a polyether, each R' and R'' is independently selected from H, optionally substituted C$_1$-C$_{20}$ alkyl, optionally substituted C$_1$-C$_{20}$ alkenyl, optionally substituted C$_2$-C$_{20}$ alkynyl, optionally substituted C$_2$-C$_{20}$ cycloalkyl, optionally substituted C$_2$-C$_{20}$ cycloalkenyl, optionally substituted C$_2$-C$_{20}$ heterocycloalkyl, optionally substituted C$_6$-C$_{10}$ aryl, optionally substituted C$_2$-C$_9$ heteroaryl, a polyamide, and a polyether;

n is at least 2, 3, 4, 5, 10, 20, 100, 150, 300, 500, or 1000.

In some embodiments, the oligomer or polymer has an n value that represents an average degree of polymerization. In some embodiments, n is in the range of 5-5000, such as 5-1000, 5-500, 5-100, or 10-100. In some embodiments, n is 5-50, such as 10-50, 10-40, 10-30, or 10-20.

In some embodiments, the compound is a homo-oligomer or homopolymer. In some embodiments, the compound is an oligomer or polymer that is a polyether, polyester, polyamide, polycarbonate, polyurethane, polyurea, or polysaccharide.

In some embodiments, the one or more compounds capable of the absorption of UV-A and/or UV-B is selected from the compounds listed in Table 6.

Generally, the compound of the disclosure has a maximum absorption ($\lambda_{max}$) in the range of 270-400 nm, preferably 280-390 nm, preferably 290-380 nm, more preferably 295-375, even more preferably 300-375 nm, and most preferably 315-375 nm and having a molar absorption coefficient(s) of at least 10,000, preferably at least 12,000, preferably at least 14,000, preferably at least 16,000, more preferably at least 18,000, and most preferably at least 20,000 M$^{-1}$ cm$^{-1}$ at $\lambda_{max}$. In some formulation of the composition, it may be more convenient to express the ability of the UV-absorbing compound as a mass absorption coefficient (i.e., the absorption of a concentration of 1 gram per deciliter at $\lambda_{max}$ over a one-centimeter light path length), herein and thereafter designated E$_1$%. Thus, a suitable compound for use in the compositions has E1% of at least 400, preferably at least 500, more preferably at least 600, more preferably at least 700, even more preferably at least 800, and most preferably at least 900 dL·g$^{-1}$·cm$^{-1}$.

Cosmetic Compositions:

Compositions

This disclosure provides UV-absorbing compositions including one or more compounds of Formula I, II and/or V-X (e.g., as described above).

In some embodiments of the composition, the one or more compounds has the structure of formula I.

In some other embodiments of the composition, the one or more compounds has the structure of formula II.

In yet another embodiment of the composition, the two or more compounds have the structure of formula I and formula II.

In preferred embodiments of the composition, the one or more compound is selected from compounds E1-E64 of Table 6.

In another preferred embodiment, the one or more compound has the cis- and/or trans structure of formula V or salt thereof:

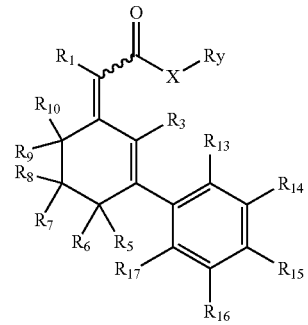

Formula V wherein:

R$_1$ is H, CN, alkylisocyanate, alkylisothiocyanate, arylisocyanate, arylisothiocyanate, or C(O)—X—R$_2$;

X is O or NR';

each R$_y$ and R$_z$ independently selected from H, substituted or unsubstituted C$_1$-C$_{15}$ alkyl, C$_1$-C$_{15}$ hydroxyalkyl, C$_1$-C$_{15}$ alkoxyalkyl, a polyamide, and a polyether;

each R$_{13}$, R$_{14}$, R$_{15}$, R$_{16}$, and R$_{17}$ is independently selected from H, halogen, substituted or unsubstituted C$_1$-C$_{20}$ alkyl, C$_2$-C$_{20}$ alkenyl, C$_2$-C$_{20}$ alkynyl, C$_3$-C$_8$ cycloalkyl, C$_2$-C$_{20}$ cycloalkenyl, C$_2$-C$_7$ heterocycloalkyl, C$_6$-C$_{10}$ aryl, C$_2$-C$_9$ heteroaryl, OR', C(O)R', C(O)OR', C(O)NR'R'', R'R''NC=NR', R'C=NR'', NR'R'', CN, N=NR', cyanate, NO$_2$, OC(O)NR'R'', SR', S—SR', S(O)R', S(O)$_2$R', S(O)$_2$OR', S(O)$_2$NR', C(O)SR', C(S)SR', C(S)NR', B(OH)$_2$, B(OR')(OR''), PR'$_3$, PR'$_2$, P(OR')$_2$, OP(OR')$_2$, P(O)(OR')$_2$, OP(O)(OR')$_2$, a polyamide, and a polyether;

each R' and R'' is independently selected from H, substituted or unsubstituted C$_1$-C$_{20}$ alkyl, C$_1$-C$_{20}$ alkenyl, C$_2$-C$_{20}$ alkynyl, C$_2$-C$_{20}$ cycloalkyl, C$_2$-C$_{20}$ cycloalkenyl, C$_2$-C$_{20}$ heterocycloalkyl, C$_6$-C$_{10}$ aryl, C$_2$-C$_9$ heteroaryl, a polyamide, and a polyether; and R$_3$, R$_5$, R$_6$, R$_7$, R$_8$, R$_9$, and R$_{10}$ are as defined for formula I.

In some embodiment of the composition, R$_y$ and R$_z$ are independently H, methyl, ethyl, propyl, isopropyl, butyl, isobutyl, sec-butyl, tert-butyl, pentyl, sec-isoamyl, tert-amyl, 2-methylbutyl, 3-methylbutyl, neopentyl, hexyl, 2-ethylhexyl, 2-butyloctyl, 2-ethoxyethyl, 3-methoxypropyl, a polyamide, or a polyether; and R$_{13}$, R$_{14}$, R$_{15}$, R$_{16}$, and R$_{17}$ are independently H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, amino, methylamino, dimethylamino, trimethylammonium, trifluoromethyl, or NO$_2$.

In another preferred embodiment, the one or more compound has the cis- and/or trans structure of formula VI or salt thereof:

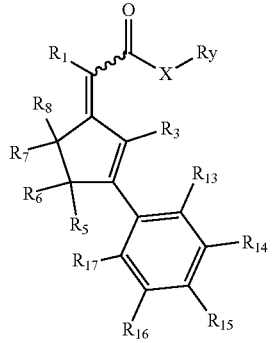

Formula VI

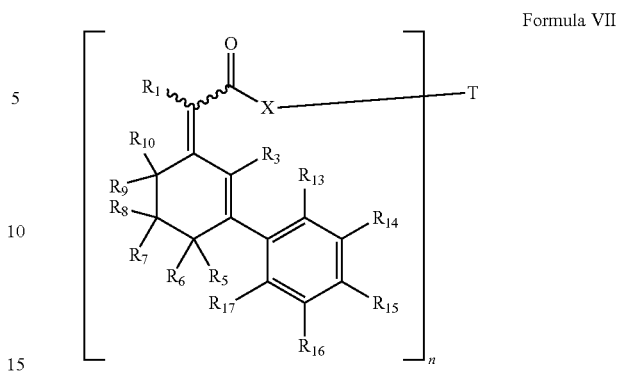

Formula VII wherein:

R$_1$ is H, CN, alkylisocyanate, alkylisothiocyanate, arylisocyanate, arylisothiocyanate, or C(O)—X—R$_z$;

X is O or NR' each R$_y$ and R$_z$ is independently selected from H, substituted or unsubstituted C$_1$-C$_{115}$ alkyl, C$_1$-C$_{15}$ hydroxyalkyl, C$_1$-C$_{15}$ alkoxyalkyl, polyamide, and polyether;

each R$_{13}$, R$_{14}$, R$_{15}$, R$_{16}$, and R$_{17}$ is independently selected from H, halogen, substituted or unsubstituted C$_1$-C$_{20}$ alkyl, C$_2$-C$_{20}$ alkenyl, C$_2$-C$_{20}$ alkynyl, C$_3$-C$_8$ cycloalkyl, C$_2$-C$_{20}$ cycloalkenyl, C$_2$-C$_7$ heterocycloalkyl, C$_6$-C$_{10}$ aryl, C$_2$-C$_9$ heteroaryl, OR', C(O)R', C(O)OR', C(O)NR'R'', R'R''NC=NR', R'C=NR'', NR'R'', CN, N=NR', cyanate, NO$_2$, OC(O)NR'R'', SR', S—SR', S(O)R', S(O)$_2$R', S(O)$_2$OR', S(O)$_2$NR', C(O)SR', C(S)SR', C(S)NR', B(OH)$_2$, B(OR')(OR''), PR'$_3$, PR'$_2$, P(OR')$_2$, OP(OR')$_2$, P(O)(OR')$_2$, OP(O)(OR')$_2$, a polyamide, and a polyether;

each R' and R'' is independently selected from H, substituted or unsubstituted C$_1$-C$_{20}$ alkyl, C$_1$-C$_{20}$ alkenyl, C$_2$-C$_{20}$ alkynyl, C$_2$-C$_{20}$ cycloalkyl, C$_2$-C$_{20}$ cycloalkenyl, C$_2$-C$_{20}$ heterocycloalkyl, C$_6$-C$_{10}$ aryl, C$_2$-C$_9$ heteroaryl, a polyamide, and a polyether; and R$_3$, R$_5$, R$_6$, R$_7$, and R$_8$ are as defined for formula II.

In some embodiment of the composition, R$_y$ and R$_z$ are independently H, methyl, ethyl, propyl, isopropyl, butyl, isobutyl, sec-butyl, tert-butyl, pentyl, sec-isoamyl, tert-amyl, 2-methylbutyl, 3-methylbutyl, neopentyl, hexyl, 2-ethylhexyl, 2-butyloctyl, 2-ethoxyethyl, 3-methoxypropyl, a polyamide, or a polyether; and R$_{13}$, R$_{14}$, R$_{15}$, R$_{16}$, and R$_{17}$ are independently H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, amino, methylamino, dimethylamino, trimethylammonium, trifluoromethyl, or NO$_2$.

In another preferred embodiment, the one or more compound has the cis- and/or trans structure of formula VII or salt thereof:

wherein:

each R$_1$ is independently selected from H, —CN, alkylisocyanate, alkylisothiocyanate, arylisocyanate, arylisothiocyanate, and C(O)—X—R$_z$;

X is O or NR';

T is a linking moiety selected from optionally substituted C$_1$-C$_{20}$ alkylene, optionally substituted C$_2$-C$_{20}$ alkenylene, optionally substituted C$_2$-C$_{20}$ alkynylene, optionally substituted C$_2$-C$_{20}$ alkoxyalkylene, optionally substituted C$_2$-C$_{20}$ cycloalkylene, optionally substituted C$_2$-C$_{20}$ cycloalkenylene, and optionally substituted C$_2$-C$_{20}$ heterocycloalkylene, wherein one or more carbon atoms of the backbone of the linking moiety T are optionally replaced by a divalent group each independently selected from oxygen (—O—), carbonyl (—CO—), optionally substituted alkylamino, optionally substituted cycloalkylene, optionally substituted heterocyclylene, optionally substituted heteroarylene, and optionally substituted arylene;

each R$_z$ is independently selected from H, optionally substituted C$_{1-15}$ alkyl, optionally substituted hydroxyalkyl, optionally substituted alkoxyalkyl, a polyamide, and a polyether;

each R$_3$, R$_5$, R$_6$, R$_7$, R$_8$, R$_9$, R$_{10}$, R$_{13}$, R$_{14}$, R$_{15}$, R$_{16}$, and R$_{17}$ is independently selected from H, halogen, optionally substituted C$_1$-C$_{20}$ alkyl, optionally substituted C$_2$-C$_{20}$ alkenyl, optionally substituted C$_2$-C$_{20}$ alkynyl, optionally substituted C$_3$-C$_8$ cycloalkyl, optionally substituted C$_2$-C$_{20}$ cycloalkenyl, optionally substituted C$_2$-C$_7$ heterocycloalkyl, optionally substituted C$_6$-C$_{10}$ aryl, optionally substituted C$_2$-C$_9$ heteroaryl, —OR', —C(O)R', —C(O)OR', —C(O)NR'R'', —C(=NR')NR'R'', —C(=NR'')R', —NR'R'', —CN, —N=NR', cyanate, —OCN, —CNO, —NO$_2$, —OC(O)NR'R'', —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR''), PR'$_3$, PR'$_2$, —P(OR')$_2$, —OP(OR')$_2$, —P(O)(OR')$_2$, —OP(O)(OR')$_2$, a polyamide, and a polyether;

each R' and R'' is independently selected from H, optionally substituted C$_1$-C$_{20}$ alkyl, optionally substituted C$_2$-C$_{20}$ alkenyl, optionally substituted C$_2$-C$_{20}$ alkynyl, optionally substituted C$_2$-C$_{20}$ cycloalkyl, optionally substituted C$_2$-C$_{20}$ cycloalkenyl, optionally substituted C$_2$-C$_{20}$ heterocycloalkyl, optionally substituted C$_6$-C$_{10}$ aryl, optionally substituted C$_2$-C$_9$ heteroaryl, a polyamide, and a polyether; and n is selected from 2, 3, 4, 5, and 6.

In some embodiment of the composition, T is ethylene, trimethylene, tetramethylene, pentamethylene, 3,3-dimethylpentamethylene, 2,2,3,3-tetramethyltetramethylene, 1,2,3-propanetriyl, phen-1,2-ylene, phen-1,3-ylene, phen-1,4-ylene, bis(ethylene), or 1,3,5-triazine-2,4,6-triyl; each $R_2$ is independently selected from H, methyl, ethyl, propyl, isopropyl, butyl, isobutyl, sec-butyl, tert-butyl, pentyl, sec-isoamyl, tert-amyl, 2-methylbutyl, 3-methylbutyl, neopentyl, hexyl, 2-ethylhexyl, 2-butyloctyl, 2-ethoxyethyl, 3-methoxypropyl, a polyamide, and a polyether; and each $R_{13}$, $R_{14}$, $R_{15}$, $R_{16}$, and $R_{17}$ is independently selected from H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, amino, methylamino, dimethylamino, trimethylammonium, trifluoromethyl, and $NO_2$.

In another preferred embodiment, the one or more compound has the cis- and/or trans structure of formula VIII or salt thereof:

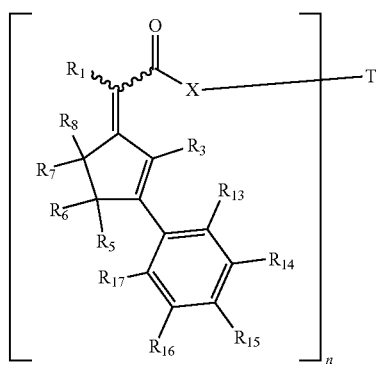

Formula VIII wherein:
each $R_1$ is independently selected from H, —CN, alkylisocyanate, alkylisothiocyanate, arylisocyanate, arylisothiocyanate, and C(O)—X—$R_z$;
X is O or NR';
T is a linking moiety selected from optionally substituted $C_1$-$C_{20}$ alkylene, optionally substituted $C_2$-$C_{20}$ alkenylene, optionally substituted $C_2$-$C_{20}$ alkynylene, optionally substituted $C_2$-$C_{20}$ alkoxyalkylene, optionally substituted $C_2$-$C_{20}$ cycloalkylene, optionally substituted $C_2$-$C_{20}$ cycloalkenylene, and optionally substituted $C_2$-$C_{20}$ heterocycloalkylene, wherein one or more carbon atoms of the backbone of the linking moiety T are optionally replaced by a divalent group each independently selected from oxygen (—O—), carbonyl (—CO—), optionally substituted alkylamino, optionally substituted cycloalkylene, optionally substituted heterocyclylene, optionally substituted heteroarylene, and optionally substituted arylene;
each $R_z$ is independently selected from H, optionally substituted $C_{1-15}$ alkyl, optionally substituted hydroxyalkyl, optionally substituted alkoxyalkyl, a polyamide, and a polyether;
each $R_3$, $R_5$, $R_6$, $R_7$, $R_8$, $R_{13}$, $R_{14}$, $R_{15}$, $R_{16}$, and $R_{17}$ is independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —CNO, —$NO_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR"), PR'$_3$, PR'$_2$, —P(OR')$_2$, —P(OR')$_2$, —P(O)(OR')$_2$, —OP(O)(OR')$_2$, a polyamide, and a polyether;
each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether; and
n is selected from 2, 3, 4, 5, and 6.

In some embodiment of the composition, T is ethylene, trimethylene, tetramethylene, pentamethylene, 3,3-dimethylpentamethylene, 2,2,3,3-tetramethyltetramethylene, 1,2,3-propanetriyl, phen-1,2-ylene, phen-1,3-ylene, phen-1,4-ylene, bis(ethylene), or 1,3,5-triazine-2,4,6-triyl; each $R_z$ is independently selected from H, methyl, ethyl, propyl, isopropyl, butyl, isobutyl, sec-butyl, tert-butyl, pentyl, sec-isoamyl, tert-amyl, 2-methylbutyl, 3-methylbutyl, neopentyl, hexyl, 2-ethylhexyl, 2-butyloctyl, 2-ethoxyethyl, 3-methoxypropyl, a polyamide, and polyether; and each $R_{13}$, $R_{14}$, $R_{15}$, $R_{16}$, and $R_{17}$ is independently selected from H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, amino, methylamino, dimethylamino, trimethylammonium, trifluoromethyl, and $NO_2$.

In yet another preferred embodiment, the one or more compound has the cis- and/or trans structure of formula IX or salt thereof:

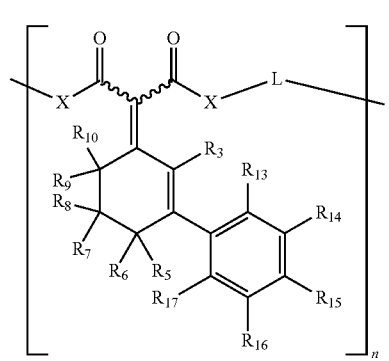

Formula IX wherein:
X is O or NR";
L is substituted or unsubstituted $C_1$-$C_{20}$ alkyl, alkenyl, alkyne, alkoxyalkyl, cycloalkyl, cycloalkenyl, heterocycloalkyl, aryl, heteroaryl, polyamide, or polyether;
each $R_{13}$, $R_{14}$, $R_{15}$, $R_{16}$, and $R_{17}$ is independently selected from H, halogen, substituted or unsubstituted $C_1$-$C_{20}$ alkyl, $C_2$-$C_{20}$ alkenyl, $C_2$-$C_{20}$ alkynyl, $C_3$-$C_8$ cycloalkyl, $C_2$-$C_{20}$ cycloalkenyl, $C_2$-$C_7$ heterocycloalkyl, $C_6$-$C_{10}$ aryl, $C_2$-$C_9$ heteroaryl, OR', C(O)R', C(O)OR', C(O)NR'R", R'R"NC=NR', R'C=NR", NR'R", CN, N=NR', cyanate, $NO_2$, OC(O)NR'R", SR', S—SR', S(O)R', S(O)$_2$R', S(O)$_2$OR', S(O)$_2$NR', C(O)SR', C(S)

SR', C(S)NR', B(OH)$_2$, B(OR')(OR"), PR'$_3$, PR'$_2$, P(OR')$_2$, OP(OR')$_2$, P(O)(OR')$_2$, OP(O)(OR')$_2$, a polyamide, and a polyether;

each R' and R" is independently selected from H, substituted or unsubstituted $C_1$-$C_{20}$ alkyl, $C_1$-$C_{20}$ alkenyl, $C_2$-$C_{20}$ alkynyl, $C_2$-$C_{20}$ cycloalkyl, $C_2$-$C_{20}$ cycloalkenyl, $C_2$-$C_{20}$ heterocycloalkyl, $C_6$-$C_{10}$ aryl, $C_2$-$C_9$ heteroaryl, a polyamide, and a polyether; and each $R_3$, $R_5$, $R_6$, $R_7$, $R_8$, $R_9$, and $R_{10}$ are as defined for formula I.

In some embodiment of the composition, each $R_{13}$, $R_{14}$, $R_{15}$, $R_{16}$, and $R_{17}$ is independently selected from H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, amino, methylamino, dimethylamino, trimethylammonium, trifluoromethyl, and $NO_2$.

In some embodiments, the composition is a sunscreen comprises one or more selected from humectant, emollient, preservative, buffer, chelating agent, fragrance, antioxidant, antimicrobial agent, thickening agent, dry feel modifier, and solvent.

In some embodiments, the sunscreen composition comprises the cis- and/or trans-compound of formula V, VI, VII, VIII, IX, and/or X in an amount in the range of 0.01 wt % to 50 wt %.

In preferred embodiments, the sunscreen composition is a solution, lotion, emulsion, cream, gel, aerosol, or spray.

In another preferred embodiment, the composition is a cosmetic composition formulated as a solution, emulsion, lotion, cream, emulsion, foam, gel, ointment, paste, suspension, stick, powder, wax, tablet, aerosol, or spray.

In a more preferred embodiment, the cosmetic composition is a hair product.

In another more preferred embodiment, the cosmetic composition is formulated for application on the lips.

In yet another more preferred embodiment, the cosmetic composition is formulated for hair removal.

Formulations

The UV-absorbing compounds or salts thereof described herein may be formulated alone or in any combination into the composition of the disclosure by well-known methods in the art. Also, the compound of this disclosure may be formulated with other known UV-absorbing compounds used in sunscreen compositions and other cosmetic products as well as other ingredients to produce a desired cosmetic composition. Examples of approved UV-absorbing compounds by the regulatory agencies in the U.S. and/or Europe for use in cosmetic composition including sunscreen sold over the counter are listed in Tables 1 and 2. Such cosmetic compositions include but not limited to sunscreen compositions with different Sun Protection Factors (SPF), sun tanning preparations, skin conditioners; haircare compositions including but not limited to hair tonics, styling preparations, pomades, shampoos, conditioner, hair rinses, treatment packs, hair treatments, hair-straightening preparations, hair setting preparations, face powder (loose or pressed), eyeshadow, eyeliner, eye creams, eye-fix creams, mascara; lip care products such as but not limited to lipstick, lip balm, lip gloss, lip contour pencils and the like, nailcare products including but not limited to nail varnish, nail varnish removers, nail hardeners, nail polish, or cuticle removers; foot creams, foot balsams, foot baths, foot powders, insect repellents, deodorants, antiperspirants, shaving products such as but not limited to soap, cream, foaming cream, foam, gels, aftershaves, aftershave lotions, fragrances and the like are well-known in different forms such as but not limited to spray, lotions, gel, emulsion, cream, foams, spray, solid, wax, and the like. For sunscreen and cosmetic compositions, see for example US publication 20040062729, 20040136932, 20050013782, 20080014155, 20080305057, 20090035234, 20100135939, 20110200543, 20120148647, 20130078204 and 20160256371; U.S. Pat. Nos. 2,104,492, 2,276,204, 2,327,899, 2,395,665, 2,853,423, 2,874,090, 2,974,089, 3,004,896, 3,175,950, 3,238,138, 3,244,708, 3,269,903, 3,275,520, 3,403,207, 3,479,428, 3,529,055, 3,697,642, 3,864,473, 3,895,104, 4,036,951, 4,069,309, 4,107,290, 4,401,649, 4,489,057, 4,559,225, 4,663, 155, 4,671,955, 4,686,099, 4,710,371, 4,710,373, 4,810,489, 4,826,978, 4,891,212, 4,940,574, 4,935,533, 5,152,983, 5,217,709, 5,372,805, 5,338,539, 5,429,820, 5,447,715, 5,516,506, 5,538,716, 5,573,753, 5,587,150, 5,605,680, 5,945,090, 5,945,091, 6,048,517, 6,103,221, 6,165,449, 6,197,281, 6,416,773, 6,419,907, 6,890,521, 6,899,866, 6,919,473, 6,962,692, 7,087,692, 7,166,273; 7,108,860, 7,235,587, 7,361,785, 7,446,230, 7,504,528, 7,550,134, 7,713,519, 7,611696, 7,893,292, 7,959,834, 8,039,532, 8,044,058, 8,158,678, 8,829,192, 8,236,287, 8,540,972, 8,557,227, 8,628,757, 8,697,035, 8,877,166, 8,992,895, 9,539,194, 9,539,195, 9,550,730, 10,632,096, 11,291,621; and CH350461A, DE202010006005U1, EP0376511A2, EP0950398A2, FR2526658A2, FR2768730A1, FR2818142B1, FR2852840A1, GB2081716A, WO1992019208A1, WO1994007460A1, WO1996041614 A1, WO2008811701 A1 and WO2010020668A1, each of which is incorporated herein by reference in its entirety. For haircare products such as but not limited to shampoo, haircoloring, and Conditioner compositions see for example U.S. Pat. Nos. 4,551,330, 5,553,630, 6,190,645, 8,044,058, and 8,829,192; and EP0165710A1 and DE10240863A1, each of which is incorporated herein by reference in its entirety.

Efficient UV protection requires the use of a combination of UV-A and/or UV-B absorbing compound to cover the entire Erythemal Action Spectrum (290-400 nm). Typically, a formulation will contain at least one effective UV absorbing compound per segment of the Erythemal Action Spectrum, such as UV-B (290-320 nm), UV-A II (320-340 nm), and UV-A I (340-400 nm). Some compounds absorb UV radiation in two or more segments of the Erythemal Action Spectrum allowing for a reduced concentration of sunscreen ingredients needed to produce effective UV absorbing formulation. The compounds of the disclosure or salts thereof described herein are disclosed to be used in formulating of cosmetic compositions including sunscreen in the range of 0.01-50 wt. %, preferably in the range of 0.03-40 wt. %, preferably in the range of 0.07-30 wt. %, preferably in the range of 0.10-25 wt. %, preferably in the range of 0.15-20 wt. %, more preferably in the range of 0.2-15 wt. %, even more preferably in the range of 0.3-12 wt. %, and most preferably in the range of 0.5-10 wt. % of the total weight of the composition. In some embodiment, the amount of the UV-absorbing compounds would be in the range of 1.0 wt. % to 7.5 wt. % of the total weight of the composition. In some instants, one or more of the disclosed compounds may be sufficient to produce the desired cosmetic composition. In some other instants, one or more compound or salt thereof may be combined with other known UV absorbing ingredients currently on the market to generate compositions that provide broad-spectrum UV protection. Some of the cosmetic composition of the disclosure may contain one or more SPF boosters, sunscreen solvents, and photostabilizers such as those but not limited to those listed in Table 3.

A sunscreen composition comprising only one or more compounds of the disclosure or salts thereof could achieve a SPF of 50, 45, 40, 35, 30, 25, 20, 15, or 10 using less than 24 wt. %, preferably less than 20 wt. %, preferably less than 18 wt. %, more preferably less than 15 wt. %, more preferably less than 14 wt. %, even more preferably less than 13 wt. %, even more preferably less than 12 wt. %, and most preferably less than 10 wt. % total UV absorbing ingredients of the total weight of the composition. In combination with other sunscreen ingredients, this could be reduced to less than 15 wt. %, preferably less than 12 wt. %, more preferably less than 10 wt. % or even less than 7 wt. % of the total weight of the composition.

TABLE 1

U. S. Food and Drug Administration (FDA) approved Over-the-Counter (OTC) sunscreen ingredients

| Common Name | Chemical Name | CAS Number |
| --- | --- | --- |
| Avobenzone (Butyl methoxydibenzoylmethane) | 1-(4-tert-Butylphenyl)-3-(4-methoxyphenyl)propane-1,3-dione | 70356-09-1 |
| Octisalate | Ethylhexyl salicylate | 118-60-5 |
| Octocrylene | 2-Ethylhexyl 2-cyano-3,3-diphenylprop-2-enoate | 6197-30-4 |
| Homosalate | 3,3,5-Trimethylcyclohexyl 2-hydroxybenzoate | 118-56-9 |
| Oxybenzone | (2-Hydroxy-4-methoxyphenyl)-phenylmethanone | 131-57-7 |
| Octinoxate | Ethylhexyl methoxycinnamate | 5466-77-3 |
| Titanium dioxide | Titanium dioxide | 13463-67-7 1317-70-0 1317-80-2 |
| Zinc oxide | Zinc oxide | 1314-13-2 |
| Ensulizole | 2-Phenyl-3H-benzimidazole-5-sulfonic acid | 27503-81-7 |
| Meradimate | Anthranilic acid p-menth-3-yl ester | 134-09-8 |
| Padimate O | 2-ethylhexyl 4-(dimethylamino)benzoate | 21245-02-3 |
| Sulisobenzone | 5-Benzoyl-4-hydroxy-2-methoxybenzene-1-sulfonic acid | 4065-45-6 |
| PABA | p-Aminobenzoic acid | 150-13-0 |
| Cinoxate | 2-Ethoxyethyl p-methoxycinnamate | 104-28-9 |
| Dioxybenzone | (2-Hydroxy-4-methoxyphenyl)(2-hydroxyphenyl)methanone | 131-53-3 |
| Trolamine Salicylate | 2-Hydroxy-N,N-bis(2-hydroxyethyl)-ethan-1-aminium 2-hydroxybenzoate | 2174-16-5 |

TABLE 2

European Union Approved Ingredients

| Common Name | Chemical Name CAS Number | CAS Number |
| --- | --- | --- |
| Camphor benzalkonium methosulfate | N,N,N-Trimethyl-4-(2-oxoborn-3-ylidenemethyl) anilinium methyl sulphate | 52793-97-2 |
| Homosalate | 3,3,5-Trimethylcyclohexyl 2-hydroxybenzoate | 118-56-9 |
| Oxybenzone (benzophenone-3) | (2-Hydroxy-4-methoxyphenyl)-phenylmethanone | 131-57-7 |
| Phenylbenzimidazole sulfonic acid | 2-Phenylbenzimidazole-5-sulphonic acid and its potassium, sodium and triethanolamine salts | 27503-81-7 |
| Ecamsule | Terephthalylidene Dicamphor Sulfonic Acid | 92761-26-7 90457-82-2 |
| Avobenzone (butyl methoxydibenzoylmethane) | 1-(4-tert-Butylphenyl)-3-(4-methoxyphenyl)propane-1,3-dione | 70356-09-1 |
| Benzylidene camphor sulfonic acid | alpha-(2-Oxoborn-3-ylidene)toluene-4-sulphonic acid and its salts | 56039-58-8 |
| Octocrylene | 2-Ethylhexyl 2-cyano-3,3-diphenylprop-2-enoate | 6197-30-4 |
| Polyacrylamidomethylbenzylidene camphor | Polymer of N-{(2 and 4)-[(2-oxoborn-3-ylidene)methyl]benzyl}acrylamide | 113783-61-2 |
| Octinoxate | Ethylhexyl methoxycinnamate | 5466-77-3 |
| PEG-25 p-aminobenzoic acid | Ethoxylated Ethyl-4-aminobenzoate | 116242-27-4 |

TABLE 2-continued

European Union Approved Ingredients

| Common Name | Chemical Name | CAS Number |
|---|---|---|
| Amiloxate | Isoamyl p-methoxycinnamate | 71617-10-2 |
| Ethylhexyl triazone | 4-[[4,6-bis[[4-(2-ethylhexoxy-oxomethyl)phenyl]amino]-1,3,5-triazin-2-yl]amino]benzoic acid 2-ethylhexyl ester | 88122-99-0 |
| Drometrizole trisiloxane | 2-(2H-Benzotriazol-2-yl)-4-methyl-6-[2-methyl-3-[1,3,3,3-tetramethyl-1-[(trimethylsilyl)oxy]-1-disiloxanyl]propyl]phenol | 155633-54-8 |
| Iscotizinol | Diethylhexyl butamido Triazone | 154702-15-5 |
| Enzacamene | 4-Methylbenzylidene Camphor | 36861-47-9<br>38102-62-4 |
| Octisalate | Ethylhexyl Salicylate | 118-60-5 |
| Padimate O | 2-Ethylhexyl 4-dimethylaminobenzoate | 21245-02-3 |
| Sulisobenzone (benzophenone-4) | 5-Benzoyl-4-hydroxy-2-methoxybenzene-1-sulfonic acid | 4065-45-6 |
| Sulisobenzone sodium (benzophenone-5) | Sodium 5-benzoyl-4-hydroxy-2-methoxybenzene-1-sulfonate | 6628-37-1 |
| Bisoctrizole | Methylene bis-benzotriazolyl tetramethylbutylphenol | 103597-45-1 |
| Nano-bisoctrizole | Nano methylene Bis-benzo-triazolyl tetramethylbutylphenol | 103597-45-1 |
| Bisdisulizole disodium | disodium phenyldibenzimidazole tetrasulfonate | 180898-37-7 |
| Bemotrizanol | Bis-ethylhexyloxyphenol methoxyphenyl triazine | 187393-00-6 |
| Polysilicone-15 | Dimethicodiethylbenzalmalonate | 207574-74-1 |
| Titanium dioxide | Titanium dioxide | 13463-67-7<br>1317-70-0<br>1317-80-2 |
| Nano titanium dioxide | Titanium dioxide | 13463-67-7<br>1317-70-0<br>1317-80-2 |
| DHHB | Diethylamino hydroxybenzoyl hexyl benzoate | 302776-68-7 |
| Tris-biphenyl triazine | 2,4,6-Tris(biphenyl-4-yl)-1,3,5-triazine | 31274-51-8 |
| Nano tris-Biphenyltriazine | 2,4,6-Tris(biphenyl-4-yl)-1,3,5-triazine | 31274-51-8 |
| Zinc oxide | Zinc oxide | 1314-13-2 |
| Nano zinc oxide | Zinc oxide | 1314-13-2 |
| Phenylene bis-diphenyltriazine | 3,3'-(1,4-Phenylene)bis(5,6-diphenyl-1,2,4-triazine) | 55514-22-2 |
| Methoxypropylamino-cyclohexenyl-idene ethoxyethylcyanoacetate | 2-ethoxyethyl 2-cyano-2-[3-(3-methoxypropylamino) cyclohex-2-en-1-ylidene]acetate (mixture of cis and trans isomers) | 1419401-88- |
| Bis-(diethylaminohydroxybenzoyl benzoyl) piperazine | 1,1'-(1,4-piperazinediyl)bis[1-[2-[4-(diethylamin o)-2-hydroxy-benzoyl]phenyl]-methanone | 919803-06-8 |
| Nano bis-(diethylamino-hydroxybenzoyl benzoyl) piperazine | 1,1'-(1,4-piperazinediyl)bis[1-2-[4-(diethylamin o)-2-hydroxy-benzoyl]phenyl]-methanone | 919803-06-8 |

TABLE 3

SPF Boosters/sunscreen solvents/photostabilizers that may be used.

| Common Name | Chemical Name | CAS Number |
|---|---|---|
| Butyloctyl salicylate | 2-Butyloctyl salicylate | 190085-41-7 |
| Bis(Cyanobutylacetate) Anthracenediylidene | Bis-(butyl cyanoacetate) bis-methylenedihydroanthracene | — |
| Trimethoxybenzylidene pentanedione | 3-[(3,4,5-Trimethoxyphenyl)-methylene]-2,4-pentanedione | 945558-97-4 |
| Diethylhexyl 2,6-naphthalate | Di(2-ethylhexyl) 2,6-naphthalenedicarboxylate | 127474-91-3 |

TABLE 3-continued

SPF Boosters/sunscreen solvents/photostabilizers that may be used.

| Common Name | Chemical Name | CAS Number |
|---|---|---|
| Ethylhexyl methoxycrylene | 2-Ethylhexyl 2-cyano-3-(p-methoxyphenyl)cinnamate | 947753-66-4 |
| Polyester-8 (polycrylene) | | 862993-96-2 |
| Diethylhexyl syringylidenemalonate | Di(2-ethylhexyl) [(4-hydroxy-3,5-dimethoxyphenyl)methylene]malonate | 444811-29-4 |
| Mycosporine-like amino acids | Various | Various |

In some embodiments, the cosmetic compositions of the disclosure may contain skin tanning and/or browning agent (self-tanning) such as but not limited to dihydroxyacetone (DHA).

Also, the compositions of the disclosure may comprise one or more cosmetic additives such as but not limited to fatty substances, plants oils, water, organic solvents, ionic or non-ionic thickeners, softeners, humectants, antioxidants, moisturizers, desquamating agents, free-radical scavengers, antipollution agents, antibacterial agents, anti-inflammatory agents, depigmenting agents, pro-pigmenting agents, opacifiers, stabilizers, emollients, silicones, antifoams, insect repellents, fragrances, preserving agents, anionic, cationic, nonionic, zwitterionic or amphoteric surfactants, fillers, pigments, polymers, propellants, acidifying or basifying agents, or any other ingredient usually used in cosmetics and/or dermatology.

The fatty substances may consist of an oil or a wax or mixtures thereof. The term "oil" means a compound that is liquid at room temperature. The term "wax" means a compound that is solid or substantially solid at room temperature, and whose melting point is generally above 35° C. Oils that may be mentioned include mineral oils such as paraffin, plant oils including but not limited to sweet almond oil, macadamia oil, blackcurrant seed oil or jojoba oil; synthetic oils such as perhydrosqualene, fatty alcohols, fatty acids or fatty acid esters (e.g. C12-C15 alcohol benzoate sold under the trademark FINSOLV TN™ by WITCO®), octyl palmitate, isopropyl lanolate, triglycerides, including capric/caprylic acid triglycerides, oxyethylenated or oxypropylenated fatty esters and ethers; silicone oils, e.g., cyclomethicone, polydimethylsiloxanes (PDMS); fluorinated oils, and polyalkylenes. Waxy compounds that may be mentioned include paraffin, carnauba wax, beeswax, and hydrogenated castor oil.

The cosmetic composition may contain one or more solvents selected from water or organic solvents such as but not limited to ethyl acetate, acetone, or low alcohols such as but not limited to ethanol, propanol, isopropanol, butanol, isobutanol, pentanol, isopentanol, hexanol, and isomers thereof and the like. Polyols such as but not limited to glycols including but not limited to ethylene glycol, propylene glycol, butylene glycol, dipropylene glycol (both isomers) or diethylene glycol; glycerol, reduced sugars, and derivatives thereof such as but not limited the methyl or ethyl ethers thereof.

Many suitable thickeners can be used to formulate the compositions of the disclosure such as but not limited to crosslinked acrylic polymers, such as but not limited to Carbomers, acrylate/C10-C30 alkylacrylate crosslinked polymers such as PEMULEN™ or polyacrylate-3 sold under the name VISCOPHOBE™ DB 1000 by AMERCOL® CO., poly-acrylamides such as the emulsion of polyacrylamide, C13-C14 isoparaffin and laureth-7 sold under the name SEPIGEL 305™ by SEPPIC®, AMPS homopolymers or copolymers such as HOSTACERIN® AMPS, sold by CLARIANT®, modified or unmodified guar gums and celluloses, such as hydroxy-propyl guar gum, methylhydroxyethylcellulose and hydroxypropylmethyl cellulose, xanthan gum, and nanometric silicas of the Aerosil type such as AEROSIL® 200.

The compositions of the disclosure may be prepared to include one or more compounds of the disclosure or salt thereof by techniques well-known to those skilled in the art, such as those intended for the preparation of emulsions of oil-in-water or water-in-oil type. In particular, the composition may be in the form of a simple or complex emulsion (O/W, W/O, O/W/O or W/O/W emulsion) such as a cream or a milk, in the form of a gel or a cream-gel, or in the form of a lotion, an oil, a powder, or a solid tube, and may optionally be packaged as an aerosol and may be in the form of a mousse or a spray. In some embodiments, the compositions are preferably in the form of an oil-in-water or water-in-oil emulsion. The aqueous phase of the emulsion may comprise a nonionic vesicular dispersion prepared according to known processes (see for example Bangham, Standish and Watkins, J. Mol. Biol. 13, 238 (1965), FR-2, 315,991 and FR-2,416,008, each of which is incorporated by reference in its entirety). For human skin care products, the composition may be in the form of a suspension or a dispersion in solvents or fatty substances, in the form of a nonionic vesicular dispersion or in the form of an emulsion, preferably of oil-in-water type, such as a cream or a milk, or in the form of an ointment, a gel, a cream-gel, a sunscreen oil, a solid tube, a powder, an aerosol mousse, or a spray.

In some embodiment, the composition is a haircare product. It may be in the form of a shampoo, a lotion, a gel, an emulsion, or a nonionic vesicular dispersion and may constitute, for example, a rinse-out composition, to be applied before or after shampooing, before or after dyeing or bleaching, or before, during or after permanent-waving or relaxing the hair, a styling or treating lotion or gel, a blow-drying or hair-setting lotion or gel, or a composition for permanent-waving, relaxing, dyeing or bleaching the hair.

In some other embodiments, the composition is a makeup composition such as but not limited to nail polish, eyelashes, eyebrows, or skin care products including an epidermal treatment cream, a foundation, a tube of lipstick, an eyeshadow, mascara, or an eyeliner, it may be in solid or pasty, anhydrous or aqueous form, such as oil-in-water or water-in-oil emulsions, nonionic vesicular dispersions, or suspensions.

A sunscreen formulations of the disclosure which is an oil-in-water emulsion type, the aqueous phase is in the range of 50 wt. % to 95 wt. %, preferably in the range of 60 wt. % to 90 wt. %, and more preferably in the range of 70 wt.

% to 90 wt %; oil phase is in the range of in the range of 5 wt. % to 50 wt. %, preferably in the range of 10 wt. % to 40 wt % and more preferably in the range of 15 wt. % to 30 wt. %, and the emulsifier(s) in the range 0.5 wt. % to 20 wt. %, preferably in the range of 2 wt. % to 10 wt. %, and more preferably in the range of 3 wt. % to 7 wt. % of the total weight of the composition.

A second aspect of the disclosure is directed to a method of using the cosmetic composition to protect a subject from UV-A and UV-B radiation. The method comprises applying the compositions of the disclosure in an effective amount to the skin or lips of a subject. The application can be carried out by spray, aerosol, spreading a cream lotion, a stick, or the like. The subject can be any animal, preferably a mammal, and most preferably human.

Compositions for Protecting Surfaces from UV Damage:

The UV-absorbing compounds and salts thereof described herein can be incorporated into any well-known compositions used to protect surfaces from environmental damage in the art including but not limited to coating, paint, resin, adhesives, polymers, shoe polish, varnish, floor detergents and polishes, wax, dye, household products such as but not limited to detergents, fabric softener, and the like, scouring agents; glass detergents; neutral cleaners (such as all-purpose cleaners); household cleaners for kitchen and bathroom; rinsing agents; dishwashing agents; kitchen cleaners; oven cleaners; metal, glass and ceramic cleaners; textile-care products; rug cleaners; carpet shampoos; rust removing composition, stains; furniture polishes; multipurpose polishes; leather and vinyl dressing composition; and the like. Also, they may be incorporated into materials such as polymers used in cars, airplanes, space vehicles, boats, and ships, for example see publication US 20050171253, and U.S. Pat. Nos. 3,004,896, 3,134,748, 3,201,366, 3,205,193, 3,211,696, 3,213,058, 3,214,436, 3,218,285, 3,230,194, 3,239,483, 3,253,921, 3,271,339, 3,282,886, 3,284,387, 3,301,816, 3,322,718, 3,368,916, 3,429,732, 3,467,482, 3,499,869, 3,900,442, 3,925,509, 3,936,418, 3,954,706, 4,323,633, 4,344,830, 4,381,360, 4,431,762, 4,749,643, 4,816,504, 4,839,405, 5,086,097, 5,204,390, 5,330,672, 5,380,774, 5,674,670, 6, 191, 199, 6,194,493, 6,268,415, 6,296,674, 6,401,724, 6,797,751, 6,916,867, 6,930,136, 7,153,588, 7,695,643, 8,906,987, 10,596,087, and 10,619,098, each of which is incorporated herein by reference in its entirety. Also, fabric care compositions such as but not limited to fabric softener and detergents are well-known in the art, see for example U.S. Pat. Nos. 4,153,744, 5,134,223, 5,330,672, 5,374,362, 5,474,691, 5,705,474, 5,723.435, 6,916,778, 7,087,692, each of which is incorporated herein by reference in its entirety.

The UV-absorbing compounds and salts thereof of the disclosure alone or in combination with other known UV-absorbing ingredients, such as but not limited to those listed in Table 4, may also be used as additives to or chemically modify organic materials, such as, but not limited to, natural or synthetic organic polymers, adhesives, paints, and the like. Examples include, but are not limited to polymers of mono-olefins and diolefins, mixtures of the polymers of mono-olefins and diolefins; copolymers of mono-olefins and diolefins with each other or with other vinyl monomers; hydrocarbon resins including hydrogenated modifications thereof (e.g. tackifiers) and mixtures of polyalkylenes and starch, polystyrene, poly(p-methylstyrene), poly(α-methylstyrene); aromatic homopolymers and copolymers derived from vinyl aromatic monomers, copolymers of vinyl aromatic monomers and comonomers such as but not limited to ethylene, propylene, dienes, nitriles, acids, maleic anhydrides, maleimides, vinyl acetate and vinyl chloride or acrylic derivatives and mixtures thereof, hydrogenated aromatic polymers derived from hydrogenation of aromatic homopolymers and copolymers derived from vinyl aromatic monomers, copolymers of vinyl aromatic monomers and comonomers selected from ethylene, propylene, dienes, nitriles, acids, maleic anhydrides, maleimides, vinyl acetate and vinyl chloride or acrylic derivatives and mixtures thereof; graft copolymers of vinyl aromatic monomers; halogen-containing polymers especially polymers of halogen-containing vinyl compounds, such as but not limited to poly vinyl chloride, polyvinylidene chloride, polyvinyl fluoride, polyvinylidene fluoride, as well as copolymers thereof such as but not limited to vinyl chloride/vinylidene chloride, vinyl chloride/vinyl acetate or vinylidene chloride/vinyl acetate copolymers; polymers derived from α,β-unsaturated acids and derivatives thereof; copolymers of α,β-unsaturated acids, and derivatives thereof, with each other or with other unsaturated monomers; polymers derived from unsaturated alcohols and amines or the acyl derivatives or acetals thereof, as well as their copolymers with polymers of mono-olefins and di-olefins; homopolymers and copolymers of cyclic ethers such as polyalkylene glycols, polyethylene oxide, polypropylene oxide or copolymers thereof with bisglycidyl ethers; polyacetals such as polyoxymethylene and those polyoxymethylenes which contain ethylene oxide as a comonomer, polyacetals modified with thermoplastic polyurethanes, acrylates, or MBS; polyphenylene oxides and sulfides, and mixtures of polyphenylene oxides with styrene polymers or polyamides; polyurethanes derived from hydroxyl-terminated polyethers, polyesters or polybutadienes on the one hand and aliphatic or aromatic polyisocyanates on the other, as well as precursors thereof; polyamides and copolyamides derived from diamines and dicarboxylic acids and/or from aminocarboxylic acids or the corresponding lactams; polyureas, polyimides, polyamide-imides, polyetherimides, polyesterimides, polyhydantoins, and polybenzimidazoles; polyesters derived from dicarboxylic acids and diols and/or from hydroxycarboxylic acids or the corresponding lactones or lactides, as well as copolyether esters derived from hydroxyl-terminated polyethers, and polyesters modified with polycarbonates, or MBS; polycarbonates and polyester carbonates; polyketones; polysulfones, polyether sulfones, and polyether ketones; crosslinked polymers derived from the polymerization of aldehydes with phenols, ureas and melamines, (such as but not limited to phenol/formaldehyde resins, urea/formaldehyde resins and melamine/formaldehyde resins); drying and non-drying alkyd resins; unsaturated polyester resins derived from copolyesters of saturated and unsaturated dicarboxylic acids with poly hydric alcohols and vinyl compounds as crosslinking agents, and also low-flammability halogen-containing modifications thereof; cross-linkable acrylic resins derived from substituted acrylates, for example epoxy acrylates, urethane acrylates or polyester acrylates; alkyd resins, polyester resins and acrylate resins cross linked with melamine resins, urea resins, isocyanates, isocyanurates, polyisocyanates. or epoxy resins; crosslinked epoxy resins derived from aliphatic, cycloaliphatic, heterocyclic or aromatic glycidyl compounds, (such as but not limited to products of diglycidyl ethers of bisphenol A and bisphenol F, which are crosslinked with customary hardeners such as anhydrides or amines, with or without accelerators); natural polymers such as cellulose, rubber, gelatin and chemically modified homologous derivatives thereof (such as but not limited to cellulose acetates, cellulose propionates and cellulose butyrates, or cellulose ethers such as methyl cellulose), rosins, and rosin derivatives; blends of the polymers (such as but not limited to PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC); naturally occurring and synthetic organic materials which are pure monomeric compounds or mixtures of such compounds; and aqueous emulsions of natural or synthetic rubber, (e.g. natural latex or latices of carboxylated styrene/butadiene copolymers). As indicated above, the UV-absorbing compound or salts thereof of the disclosure may be derivatized for copolymerization with ethylene oxide, propylene oxide, diisocynate derivatives, dithiocynate derivatives and the like. In some embodiments of the disclosure, an appropriate derivative of the compounds disclosed herein may be used a copolymer during the polymerization of the polymers mentioned herein.

In some embodiment, one or more compounds of disclosure may be added to photolabile compounds such as but not limited to those in Table 5 and compositions thereof.

The compounds of disclosure can photostabilize these photolabile compounds by quenching the unstable chemical's excited states and then dissipating the energy through non-radiative internal conversion processes. To achieve the photostabilization of the photolabile compound the concentration of the compound of the disclosure on a mole percentage basis relative to the photolabile compound must be in the range of 1 mol % to 400 mol %, preferably in the range of 25 mol % to 300 mol %, more preferably in the range of 50 mol % to 200 mol % and most preferably in the range of 70 mol % to 100 mol %.

TABLE 4

Examples of UV-Absorbing Additives for Paints, Plastics, Adhesives, and Coatings

| Ingredient Class | Example(s) |
| --- | --- |
| P-aminobenzoic acid derivatives | PABA; PEG-25 p-Aminobenzoic Acid |
| Salicylate derivatives | Octisalate; Butyloctyl Salicylate; Homosalate |
| Diphenylacrylates | Octocrylene, Methoxycrylene |
| 3-imidazol-4-acrylic acids and esters | 3-Imidazol-4-yl-acrylic acid |
| Benzofuran derivatives | 2-Ethylhexyl (E)-3-(1-benzofuran-2-yl)-2-cyanoacrylate |
| Metal oxides | Titanium Dioxide; Iron Oxide; Cerium Oxide; Aluminum Oxide; Zinc Oxide |
| Phenylbenzimidazole derivatives | 2-Phenyl-3H-benzimidazole-5-sulfonic acid |
| Phenolic benzotriazoles | Benzenepropanoic acid, 3-(2H-benzotriazol-2-yl)-5-(1,1-dimethylethyl)-4-hydroxy-, C7-9-branched and linear alkyl esters |
| Hydroxyphenyl-s-triazines | 2-[4-[(2-Hydroxy-3-dodecyloxypropyl)oxy]-2-hydroxyphenyl]-4,6-bis(2,4-dimethylphenyl)-1,3,5-triazine; 2-[4-[(2-Hydroxy-3-tridecyloxypropyl)oxy]-2-hydroxyphenyl]-4,6-bis(2,4-dimethylphenyl)-1,3,5-triazine |
| Hydroxybenzophenones | Oxybenzone, Sulisobenzone |
| Hindered Amine Light Stabilizers (HALS) | 1,2,2,6,6-Pentamethyl-4-piperidyl Methacrylate, $N^1,N^3$-Bis(2,2,6,6-tetramethylpiperidin-4-yl)isophthalamide; Bis(1,2,2,6,6-pentamethyl-4-piperidyl) Butyl(3,5-di-tert-butyl-4-hydroxybenzyl)malonate; Bis(1,2,2,6,6-pentamethyl-4-piperidyl) Sebacate |

TABLE 5

Photolabile ingredients that already exist on the market that can be stabilized by the compounds of the disclosure.

| Common Name | Chemical Name | CAS Number |
| --- | --- | --- |
| Avobenzone (Butyl methoxydibenzoylmethane | 1-(4-tert-Butylphenyl)-3-(4-methoxyphenyl)propane-1,3-dione | 70356-09-1 |
| Octinoxate | Ethylhexyl methoxycinnamate | 5466-77-3 |
| Cinoxate | 2-Ethoxyethyl p-methoxycinnamate | 104-28-9 |
| Amiloxate | Isoamyl p-methoxycinnamate | 71617-10-2 |

EXAMPLES

Example 1 Synthesis of UV-Absorbing Compounds

Figure 2:
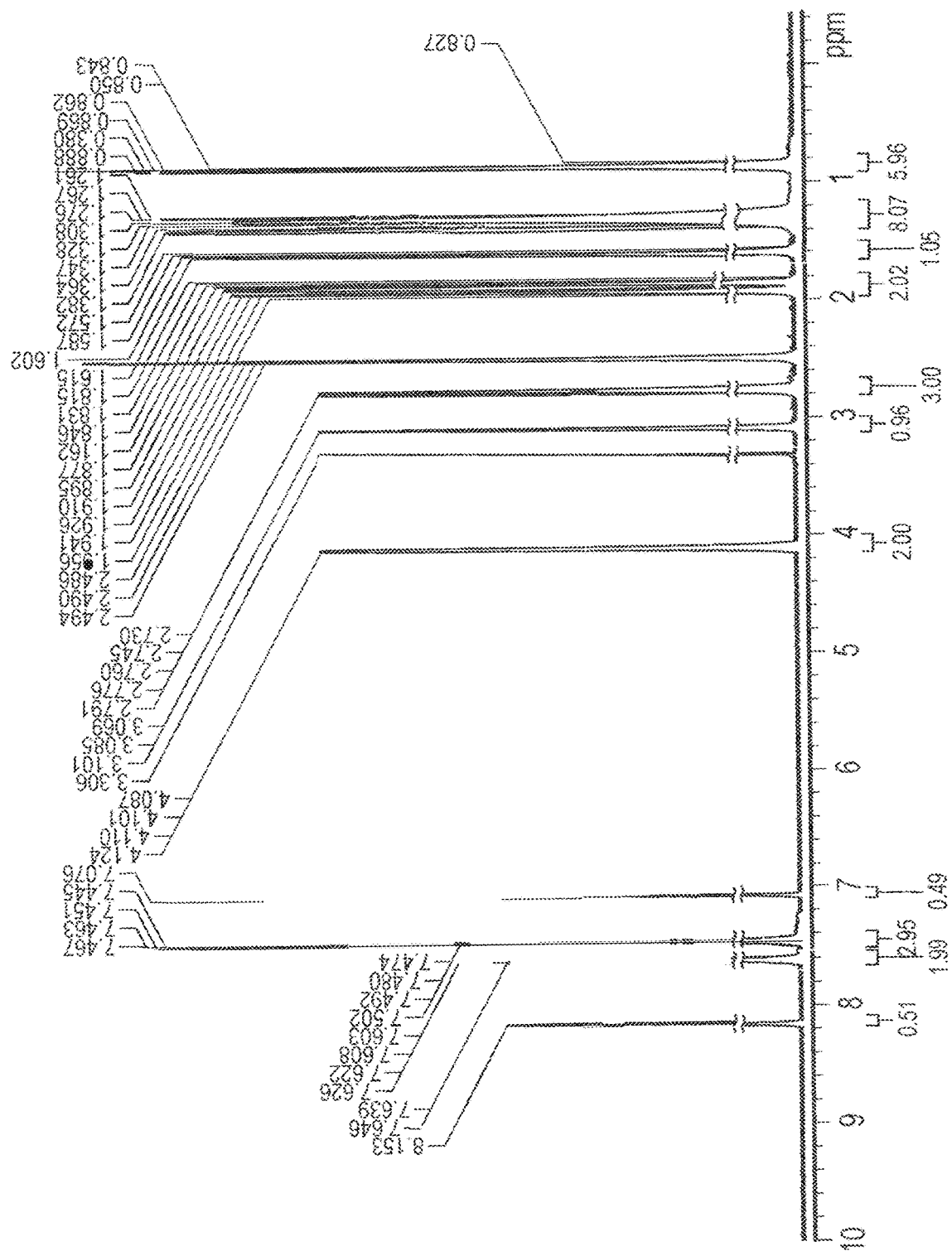
FIG. 2 shows the ¹H-NMR spectrum of a mixture of cis and trans isomers of 2-ethylhexyl (3-phenyl-2-cyclohexen-1-ylidene)cyanoacetate (E5) in DMSO-$d_6$ obtained using a 400 MHz NMR spectrometer.
Figure 3:
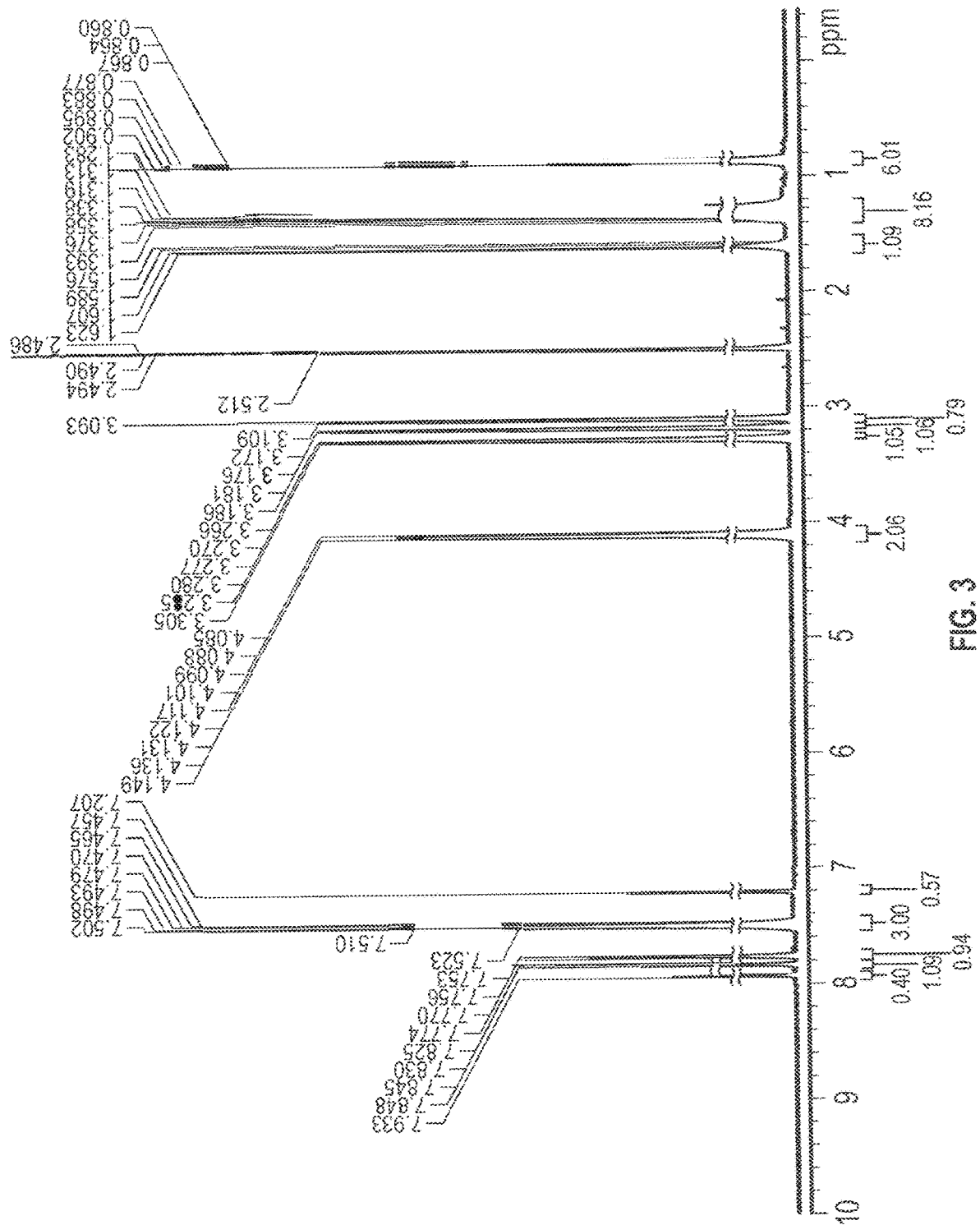
FIG. 3 shows the ¹H-NMR spectrum of a mixture of cis and trans isomers of 2-ethylhexyl (3-phenyl-2-cyclopenten-1-ylidene)cyanoacetate (E6) in DMSO-$d_6$ obtained using a 400 MHz NMR spectrometer.
Figure 4:
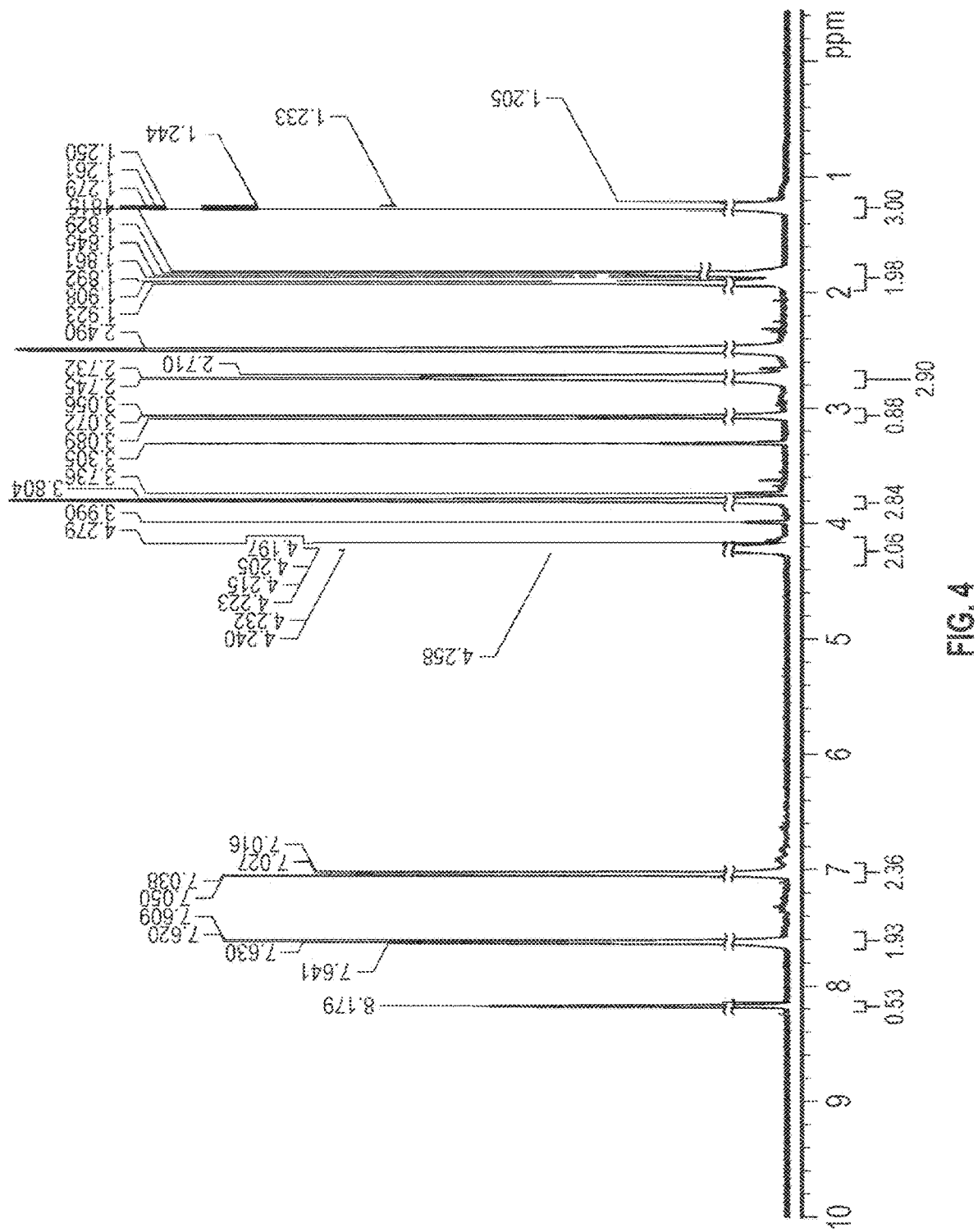
FIG. 4 shows the ¹H-NMR spectrum of a mixture of cis and trans isomers of ethyl [3-(p-methoxyphenyl)-2-cyclohexen-1-ylidene]cyanoacetate (E7) in DMSO-$d_6$ obtained using a 400 MHz NMR spectrometer.
Figure 5:
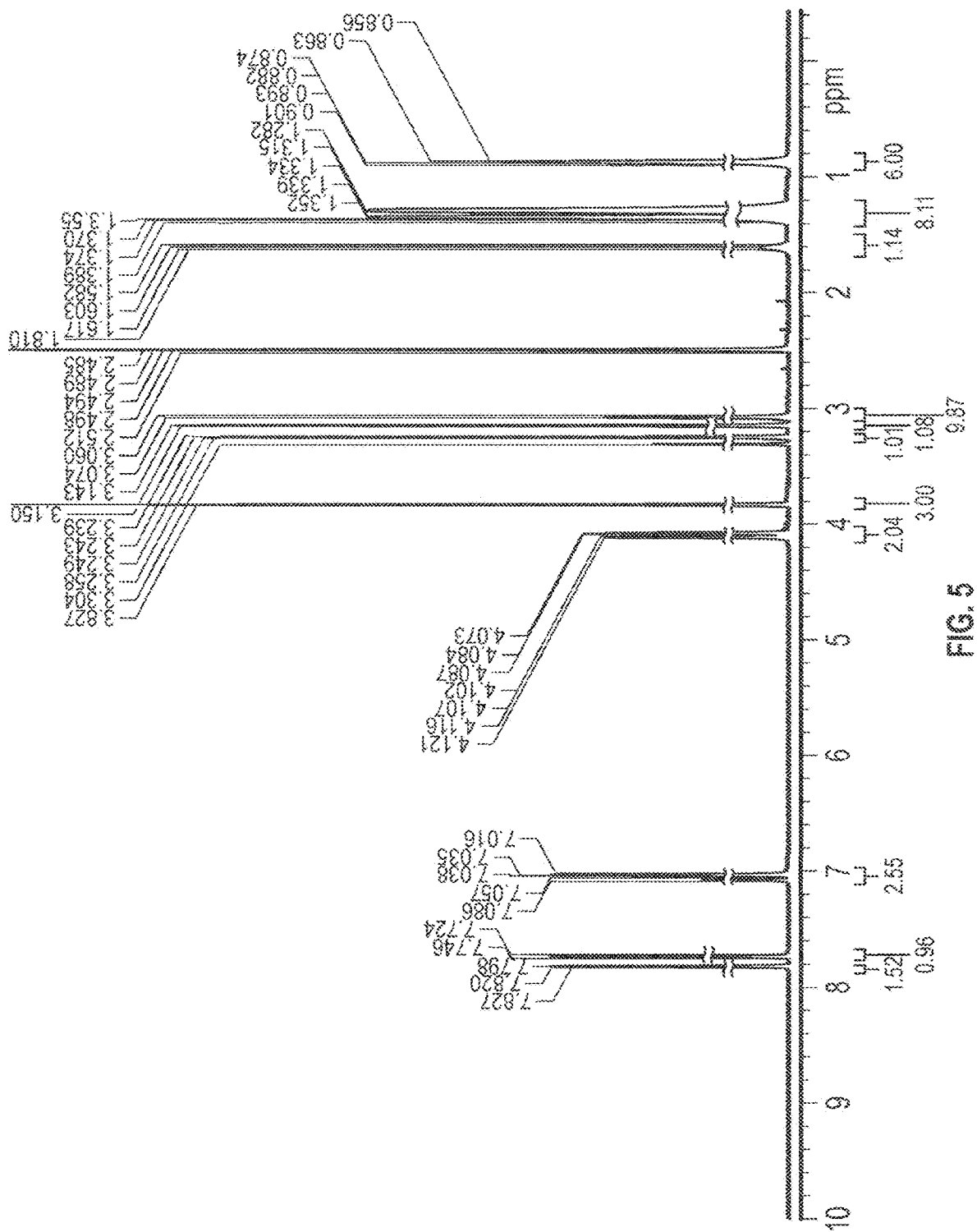
FIG. 5 shows the ¹H-NMR spectrum of a mixture of cis and trans isomers of 2-Ethylhexyl [3-(p-methoxyphenyl)-2-cyclopenten-1-ylidene]cyanoacetate (E8) in DMSO-$d_6$ obtained using a 400 MHz NMR spectrometer.

Compounds E1-E11 and E14-E39 are synthesized by the Knoevenagel condensation method. In a typical synthesis, a solution of a ketone X (1.0 equiv.), a compound Y selected from malononitrile, malonic acid ester, 2,2-dimethyl-1,3-dioxane-4,6-dione (Meldrum's acid), cyanoacetic acid ester, and the like (1.1 equiv.), and ammonium carboxylate such as ethylenediamine diacetate or ammonium acetate (0.2 equiv.) in a round bottom flask in a mixture of carboxylic acid (42%) such as acetic acid or propionic acid and hydrocarbon solvent such as cyclohexane or toluene was heated under reflux and the water product of the reaction was removed by a Dean Stark trap optionally containing molecular sieves. The reaction progress was monitored by TLC and/or changes in the UV-Vis spectra until completion. Then, the reaction mixture was concentrated in vacuo and the residue was dissolved in ethyl acetate. Then, the organic solution was subjected to a standard workup to produce a solid or an oily residue. The oily residue was adsorbed into celite and subjected to silica gel chromatography, using hexanes and ethyl acetate blends to elute the product. The appropriate fractions were collected and concentrated in vacuo to afford the product. All prepared compounds were characterized by spectroscopic methods including UV-Vis spectra which are obtained in a 1,4-dioxane solution of 0.01 g·L$^{-1}$. Table 6 lists the prepared compounds names, $\lambda_{max}$, $\varepsilon$, and $E_1$%. FIG. 1 shows the UV-absorption spectrum of (E5). FIG. 2 shows the $^1$H-NMR spectrum of (E5). FIG. 3 shows the $^1$H-NMR spectrum of (E6). FIG. 4 shows the $^1$H-NMR spectrum of (E7). FIG. 5 shows the $^1$H-NMR spectrum of (E8). Table 7 lists the structures of the compounds and the starting materials of compound X and Y used in the method described above.

Compounds E40-E44 may be synthesized by the method describe above using the starting materials listed in Table 7.

Example 2 Synthesis of UV-Absorbing Compounds

Compounds E45-E47 and E49 are synthesized by the Horner-Wadsworth-Emmons method. In a typical reaction, a solution of a ketone X (1.0 equiv.), a diethylphosphonoacetate ester Y (1.1 equiv.), lithium chloride (3.0 equiv.), and 1,8-diazabicyclo(5.4.0)undec-7-ene (3.0 equiv.) in acetonitrile (0.1 M) was heated and stirred under reflux in a nitrogen atmosphere for 16 hours. The reaction mixture was concentrated in vacuo and the residue was dissolved in ethyl acetate. Then, the organic solution was subjected to a standard workup to produce a solid or an oily residue. The solid or oily residue was adsorbed into celite and chromatographed to purify and characterize the products as described in Example 1. Table 6 include the prepared compounds names, $\lambda_{max}$, $\varepsilon$, and $E_{1\%}$. Table 7 lists the structures of the compounds and the starting materials of compound X and Y used in the method described above. Compounds E48, and E50-E64 may be synthesized by the method describe above using the starting materials listed in Table 7.

TABLE 6

List of the Example Compounds, their Absorbance Maxima ($\lambda_{max}$), Molar Absorption Coefficients ($\varepsilon$), and Mass Absorption Coefficients ($E_{1\%}$)

| Compound Number | Name | $\lambda_{max}$ (nm) | $\varepsilon$ (M$^{-1}$ cm$^{-1}$) | $E_{1\%}$ (dL · g$^{-1}$ · cm$^{-1}$) | FWHM ($\lambda$) |
|---|---|---|---|---|---|
| E1 | (3-Phenyl-2-cyclohexen-1-ylidene)propanedinitrile | 345 | 28,620 | 1299 | 59 |
| E2 | [3-(p-Methoxyphenyl)-2-cyclohexen-1-ylidene]-propanedinitrile | 375 | 33,218 | 1327 | 66 |
| E3 | (3-Phenyl-2-cyclopenten-1-ylidene)propanedinitrile | 349 | 28,789 | 1396 | 62 |
| E4 | [3-(p-Methoxyphenyl)-2-cyclopenten-1-ylidene]propane-dinitrile | 374 | 36,097 | 1528 | 64 |
| E5 | 2-Ethylhexyl (3-phenyl-2-cyclohexen-1-ylidene)cyanoacetate (mixture of cis and trans isomers) | 339 | 29,840 | 849 | 62 |
| E6 | 2-Ethylhexyl (3-phenyl-2-cyclopenten-1-ylidene)cyano-acetate (mixture of cis and trans isomers) | 345 | 33,690 | 999 | 63 |
| E7 | Ethyl [3-(p-methoxyphenyl)-2-cyclohexen-1-ylidene]cyanoacetate (mixture of cis and trans isomers) | 370 | 29,000 | 975 | 68 |
| E8 | 2-Ethylhexyl [3-(p-methoxyphenyl)-2-cyclopenten-1-ylidene]cyanoacetate (mixture of cis and trans isomers) | 370 | 38,000 | 1034 | 65 |
| E9 | Ethyl [5,5-dimethyl-3-(p-methoxyphenyl)-2-cyclohexen-1-ylidene]cyanoacetate (mixture of cis and trans isomers) | 370 | 29,530 | 908 | 68 |
| E10 | Ethyl [5,5-dimethyl-3-phenyl-2-cyclohexen-1-ylidene]cyanoacetate (mixture of cis and trans isomers) | 342 | 27,110 | 918 | 61 |
| E11 | 2,2-Dimethyl-5-(3-phenyl-2-cyclohexen-1-ylidene)-1,3-dioxane-4,6-dione | 355 | 26,253 | 882 | 64 |

TABLE 6-continued

List of the Example Compounds, their Absorbance Maxima ($\lambda_{max}$), Molar Absorption Coefficients ($\varepsilon$), and Mass Absorption Coefficients ($E_{1\%}$)

| Compound Number | Name | $\lambda_{max}$ (nm) | $\varepsilon$ ($M^{-1}$ $cm^{-1}$) | $E_{1\%}$ (dL · $g^{-1}$ · $cm^{-1}$) | FWHM ($\lambda$) |
|---|---|---|---|---|---|
| E12 | Dimethyl (3-phenyl-2-cyclohexen-1-ylidene)malonate | 317 | 24,337 | 846 | 56 |
| E13 | Polyethylene(3-phenyl-2-cyclohexen-1-ylidene)malonate | 317 | — | — | — |
| E14 | (4,4-Dimethyl-3-phenyl-2-cyclopenten-1-ylidene)propanedinitrile | 336 | 20,740 | 885 | 82 |
| E15 | 2-Ethylhexyl cyano(4,4-dimethyl-3-phenyl-2-cyclopenten-1-ylidene)acetate (mixture of cis and trans isomers) | 338 | 27,980 | 765 | 73 |
| E16 | (4-Methyl-3-phenyl-2-cyclopenten-1-ylidene)propanedinitrile | 345 | 21,920 | 995 | 82 |
| E17 | (2,4-Dimethyl-3-phenyl-2-cyclopenten-1-ylidene)propanedinitrile | 331 | 15,930 | 680 | 64 |
| E18 | 2-Ethylhexyl cyano(4-methyl-3-phenyl-2-cyclopenten-1-ylidene)acetate (mixture of cis and trans isomers) | 338 | 21,030 | 598 | 91 |
| E19 | 2-Ethylhexyl cyano(2,4-dimethyl-3-phenyl-2-cyclopenten-1-ylidene)acetate (mixture of cis and trans isomers) | 313 | 23,360 | 639 | 68 |
| E20 | (2-Methyl-3-phenyl-2-cyclopenten-1-ylidene)propanedinitrile | 335 | 29,935 | 1,359 | 64 |
| E21 | 2,3-Bis[(3-phenylcyclohex-2-en-1-ylidene)cyanoacetoxy]propyl (3-phenylcyclohex-2-en-1-ylidene)-cyanoacetate (mixture of cis and trans isomers) | 341 | 85,985 | 1138 | 64 |
| E22 | 2-[(3-phenylcyclohex-2-on-1-ylidene)cyanoacetoxy]ethyl (3-phenylcyclohex-2-en-1-ylidene)cyanoacetate (mixture of cis and trans isomers) | 340 | 56,880 | 1127 | 63 |
| E23 | Isopentyl (3-phenylcyclohex-2-en-1-ylidene)cyanoacetate (mixture of cis and trans isomers) | 339 | 28,780 | 930 | 62 |
| E24 | 2-Ethoxyethyl (3-phenyl-2-cyclohexen-1-ylidene)cyanoacetate (mixture of cis and trans isomers) | 340 | 29,570 | 950 | 62 |
| E25 | Isopentyl {3-[4-(trifluoromethyl)phenyl]cyclohex-2-en-1-ylidene}cyanoacetate (mixture of cis and trans isomers) | 331 | 28,422 | 753 | 62 |
| E26 | 2-Ethylhexyl {3-[4-(trifluoromethyl)phenyl]cyclohex-2-en-1-ylidene}cyanoacetate (mixture of cis and trans isomers) | 331 | 29,400 | 701 | 61 |
| E27 | Isopentyl {3-[3-(trifluoromethyl)phenyl]cyclohex-2-en-1-ylidene}cyanoacetate (mixture of cis and trans isomers) | 330 | 27,710 | 734 | 62 |
| E28 | 2-ethylhexyl {3-[3-(trifluoromethyl)phenyl]cyclohex-2-en-1-ylidene}cyanoacetate (mixture of cis and trans isomers) | 330 | 28,000 | 668 | 60 |
| E29 | Isopentyl {3-[3,5-bis(trifluoromethyl)phenyl]-cyclohex-2-en-1-ylidene}cyanoacetate (mixture of cis and trans Isomers) | 324 | 26,007 | 584 | 61 |
| E30 | 2-Ethylhexyl {3-[3,5-bis(trifluoromethyl)phenyl]-cyclohex-2-en-1-ylidene}cyanoacetate (mixture of cis and trans isomers) | 323 | 29,290 | 601 | 52 |
| E31 | Isopentyl [3-(3,5-difluorophenyl)cyclohex-2-en-1-ylidene]cyanoacetate (mixture of cis and trans isomers) | 330 | 27,150 | 786 | 61 |

TABLE 6-continued

List of the Example Compounds, their Absorbance Maxima ($\lambda_{max}$), Molar Absorption Coefficients ($\varepsilon$), and Mass Absorption Coefficients ($E_{1\%}$)

| Compound Number | Name | $\lambda_{max}$ (nm) | $\varepsilon$ (M$^{-1}$ cm$^{-1}$) | $E_{1\%}$ (dL · g$^{-1}$ · cm$^{-1}$) | FWHM ($\lambda$) |
|---|---|---|---|---|---|
| E32 | 2-ethylhexyl [3-(3,5-difluorophenyl)cyclohex-2-en-1-ylidene]cyanoacetate (mixture of cis and trans isomers) | 330 | 28,560 | 737 | 63 |
| E33 | Isopentyl (2-methyl-3-phenylcyclohex-2-en-1-ylidene)-cyanoacetate (mixture of cis and trans isomers) | 308 | 16,720 | 517 | 61 |
| E34 | 2-(3-phenylcyclopent-2-en-1-ylidene)-3-{4-[2-(3-phenylcyclopent-2-en-1-ylidene)-2-cyanoacetyl]piperazin-1-yl}-3-oxopropiononitrile (mixture of cis and trans isomers) | 339 | 59,260 | 1184 | 66 |
| E35 | N-3-methoxypropyl-(3-phenylcyclohex-2-en-1-ylidene)-cyanoacetamide (mixture of cis and trans isomers) | 331 | 26,514 | 854 | 64 |
| E36 | 2-(3-Phenyl-2-cyclohexen-1-ylidene)-3-{4-[2-(3-phenyl-2-cyclohexen-1-ylidene)-2-cyanoacetyl]-1-piperazinyl}-3-oxopropiononitrile (mixture of cis and trans isomers) | 320 | 39,990 | 757 | 59 |
| E37 | 2-{3-[p-(tert-Butyl)phenyl]-2-cyclohexen-1-ylidene]-3-{4-[2-{3-[p-(tert-butyl)phenyl]-2-cyclohexen-1-ylidene}-2-cyanoacetyl]-1-piperazinyl}-3-oxopropiononitrile (mixture of cis and trans isomers) | 327 | 45,160 | 705 | 62 |
| E38 | Isopentyl {3-[4-(tert-butyl)phenyl]cyclohex-2-en-1-ylidene}cyanoacetate (mixture of cis and trans isomers) | 351 | 30,660 | 839 | 66 |
| E39 | 2-Ethylhexyl cyano(2-methyl-3-phenyl-2-cyclopenten-1-ylidene)acetate (Mixture of cis and trans isomers) | 331 | 27,050 | 770 | 61 |
| E40 | 3-[(3-Phenyl-2-cyclohexen-1-ylidene)cyanoacetoxy]propyl (3-phenyl-2-cyclohexen-1-ylidene)cyanoacetate (Mixture of cis and trans isomers) | 340 | — | — | — |
| E41 | 4-[(3-Phenyl-2-cyclohexen-1-ylidene)cyanoacetoxy]butyl (3-phenyl-2-cyclohexen-1-ylidene)cyanoacetate (Mixture of cis and trans isomers) | 340 | — | — | — |
| E42 | 5-[(3-Phenyl-2-cyclohexen-1-ylidene)cyanoacetoxy]pentyl (3-phenyl-2-cyclohexen-1-ylidene)cyanoacetate (Mixture of cis and trans isomers) | 340 | — | — | — |
| E43 | 6-[(3-Phenyl-2-cyclohexen-1-ylidene)cyanoacetoxy]hexyl (3-phenyl-2-cyclohexen-1-ylidene)cyanoacetate (Mixture of cis and trans isomers) | 340 | — | — | — |
| E44 | 3-[(3-Phenyl-2-cyclohexen-1-ylidene)cyanoacetoxy]propyl (3-phenyl-2-cyclohexen-1-ylidene)cyanoacetate (Mixture of cis and trans isomers) | 340 | — | — | — |
| E45 | Ethyl (3-phenyl-2-cyclohexen-1-ylidene)acetate (Mixture of cis and trans isomers) | 308 | 29,479 | 1150 | 52 |
| E46 | Ethyl [3-(p-methoxyphenyl)-2-cyclohexen-1-ylidene]acetate (Mixture of cis and trans isomers) | 324 | 28,596 | 1050 | 59 |

TABLE 6-continued

List of the Example Compounds, their Absorbance Maxima ($\lambda_{max}$), Molar Absorption Coefficients ($\varepsilon$), and Mass Absorption Coefficients ($E_{1\%}$)

| Compound Number | Name | $\lambda_{max}$ (nm) | $\varepsilon$ ($M^{-1}$ $cm^{-1}$) | $E_{1\%}$ (dL · $g^{-1}$ · $cm^{-1}$) | FWHM ($\lambda$) |
|---|---|---|---|---|---|
| E47 | Isopentyl (3-phenyl-2-cyclohexen-1-ylidene)acetate (Mixture of cis and trans isomers) | 308 | 24,741 | 870 | 51 |
| E48 | Isopentyl [3-(p-methoxyphenyl)-2-cyclohexen-1-ylidene]acetate (Mixture of cis and trans isomers) | 324 | — | — | — |
| E49 | 2-Ethylhexyl (3-phenyl-2-cyclohexen-1-ylidene)acetate (Mixture of cis and trans isomers) | 308 | 26,444 | 810 | 51 |
| E50 | 2-Ethylhexyl [3-(p-methoxyphenyl)-2-cyclohexen-1-ylidene]acetate (Mixture of cis and trans isomers) | 324 | — | — | — |
| E51 | 2-Butyloctyl (3-phenyl-2-cyclohexen-1-ylidene)acetate (Mixture of cis and trans isomers) | 308 | — | — | — |
| E52 | 2-Butyloctyl [3-(p-methoxyphenyl)-2-cyclohexen-1-ylidene]acetate (Mixture of cis and trans isomers) | 324 | — | — | — |
| E53 | 2-[(3-Phenyl-2-cyclohexen-1-ylidene)acetoxy]ethyl (3-phenyl-2-cyclohexen-1-ylidene)acetate (Mixture of cis and trans isomers) | 308 | — | — | — |
| E54 | 2-{[3-(p-Methoxyphenyl)-2-cyclohexen-1-ylidene]acetoxy}ethyl-[3-(p-methoxyphenyl)-2-cyclohexen-1-ylidene]acetate (Mixture of cis and trans isomers) | 324 | — | — | — |
| E55 | 3-[(3-Phenyl-2-cyclohexen-1-ylidene)acetoxy]propyl (3-phenyl-2-cyclohexen-1-ylidene)acetate (Mixture of cis and trans isomers) | 308 | — | — | — |
| E56 | 3-{([3-(p-Methoxyphenyl)-2-cyclohexen-1-ylidene]acetoxy}propyl [3-(p-methoxyphenyl)-2-cyclohexen-1-ylidene]acetate (Mixture of cis and trans isomers) | 324 | — | — | — |
| E57 | 4-[(3-Phenyl-2-cyclohexen-1-ylidene)acetoxy]butyl (3-phenyl-2-cyclohexen-1-ylidene)acetate (Mixture of cis and trans isomers) | 308 | — | — | — |
| E58 | 4-{[3-(p-Methoxyphenyl)-2-cyclohexen-1-ylidene]acetoxy}butyl [3-(p-methoxyphenyl)-2-cyclohexen-1-ylidene]acetate (Mixture of cis and trans isomers) | 324 | — | — | — |
| E59 | 5-[(3-Phenyl-2-cyclohexen-1-ylidene)acetoxy]pentyl (3-phenyl-2-cyclohexen-1-ylidene)acetate (Mixture of cis and trans isomers) | 308 | — | — | — |
| E60 | 5-{[3-(p-Methoxyphenyl)-2-cyclohexen-1-ylidene]acetoxy}pentyl [3-(p-methoxyphenyl)-2-cyclohexen-1-ylidene]acetate (Mixture of cis and trans isomers) | 324 | — | — | — |
| E61 | 6-[(3-Phenyl-2-cyclohexen-1-ylidene)acetoxy]hexyl (3-phenyl-2-cyclohexen-1-ylidene)acetate (Mixture of cis and trans isomers) | 308 | — | — | — |
| E62 | 6-{[3-(p-Methoxyphenyl)-2-cyclohexen-1-ylidene]acetoxy}hexyl [3-(p-methoxyphenyl)-2-cyclohexen-1-ylidene]acetate (Mixture of cis and trans isomers) | 324 | — | — | — |

TABLE 6-continued

List of the Example Compounds, their Absorbance Maxima ($\lambda_{max}$), Molar Absorption Coefficients ($\varepsilon$), and Mass Absorption Coefficients ($E_{1\%}$)

| Compound Number | Name | $\lambda_{max}$ (nm) | $\varepsilon$ ($M^{-1}$ $cm^{-1}$) | $E_{1\%}$ (dL · $g^{-1}$ · $cm^{-1}$) | FWHM ($\lambda$) |
|---|---|---|---|---|---|
| E63 | 3-[(3-Phenyl-2-cyclohexen-1-ylidene)acetoxy]-2,2-dimethylpropyl (3-phenyl-2-cyclohexen-1-ylidene)acetate (Mixture of cis and trans isomers) | 308 | — | — | — |
| E64 | 3-{[3-(p-Methoxyphenyl)-2-cyclohexen-1-ylidene}acetoxy}-2,2-dimethylpropyl [3-(p-methoxyphenyl)-2-cyclohexen-1-ylidene]acetate (Mixture of cis and trans isomers) | 324 | — | — | — |

TABLE 7

List of the Example Compounds and the Starting Materials Used to Prepare Them

| Compound Number | Compound Structure | Starting Materials X and Y |
|---|---|---|
| E1 | (structure) | 3-phenyl-2-cyclohexen-1-one and malononitrile |
| E2 | (structure) | 3-(p-methoxyphenyl)-2-cyclohexen-1-one and malononitrile |
| E3 | (structure) | 3-phenyl-2-cyclopenten-1-one and malononitrile |
| E4 | (structure) | 3-(p-methoxyphenyl)-2-cyclopenten-1-one and malononitrile |

TABLE 7-continued

List of the Example Compounds and the Starting Materials Used to Prepare Them

| Compound Number | Compound Structure | Starting Materials X and Y |
|---|---|---|
| E5 | (structure) | 3-phenyl-2-cyclohexen-1-one and 2-ethylhexyl cyanoacetate |
| E6 | (structure) | 3-phenyl-2-cyclopenten-1-one and 2-ethylhexyl cyanoacetate |
| E7 | (structure) | 3-(p-methoxyphenyl)-2-cyclohexen-1-one and ethyl cyanoacetate |
| E8 | (structure) | 3-(p-methoxyphenyl)-2-cyclopenten-1-one and 2-ethylhexyl cyanoacetate |
| E9 | (structure) | 3-(p-methoxyphenyl)-5,5-dimethyl-2-cyclohexen-1-one and ethyl cyanoacetate |

TABLE 7-continued

List of the Example Compounds and the Starting Materials Used to Prepare Them

| Compound Number | Compound Structure | Starting Materials X and Y |
|---|---|---|
| E10 | | 3-phenyl-5,5-di-methyl-2-cyclo-hexen-1-one and ethyl cyanoacetate |
| E11 | | 3-Phenyl-2-cyclo-hexen-1-one and 2,2-dimethyl-1,3-dioxane-4,6-dione |
| E14 | | 4,4-Dimethyl-3-phenyl-2-cyclo-penten-1-one and malononitrile |
| E15 | | 4,4-Dimethyl-3-phenyl-2-cyclo-penten-1-one and 2-ethylhexyl cyanoacetate |
| E16 | | 4-Methyl-3-phenyl-2-cyclopenten-1-one and malononitrile |

TABLE 7-continued

List of the Example Compounds and the Starting Materials Used to Prepare Them

| Compound Number | Compound Structure | Starting Materials X and Y |
|---|---|---|
| E17 | | 2,4-Dimethyl-3-phenyl-2-cyclopenten-1-one and malononitrile |
| E18 | | 4-Methyl-3-phenyl-2-cyclopenten-1-one and 2-ethylhexyl cyanoacetate |
| E19 | | 2,4-Dimethyl-3-phenyl-2-cyclopenten-1-one and 2-ethylhexyl cyanoacetate |
| E20 | | 2-methyl-3-phenyl-2-cyclopenten-1-one and malononitrile |

TABLE 7-continued

List of the Example Compounds and the Starting Materials Used to Prepare Them

| Compound Number | Compound Structure | Starting Materials X and Y |
|---|---|---|
| E21[a] | | 3-phenyl-2-cyclohexen-1-one and 2,3-bis(cyanoacetoxy)-propyl cyanoacetate |
| E22[b] | | 3-phenyl-2-cyclohexen-1-one and 2-(cyano-acetoxy)ethyl cyanoacetate |
| E23 | | 3-phenyl-2-cyclohexen-1-one and isopentyl cyanoacetate |
| E24 | | 3-phenyl-2-cyclohexen-1-one and 2-ethoxyethyl cyanoacetate |

TABLE 7-continued

List of the Example Compounds and the Starting Materials Used to Prepare Them

| Compound Number | Compound Structure | Starting Materials X and Y |
|---|---|---|
| E25 | | 3-[4-(trifluoromethyl)-phenyl]cyclohex-2-en-1-one and isopentyl cyanoacetate |
| E26 | | 3-[4-(trifluoromethyl)-phenyl]cyclohex-2-en-1-one and 2-ethylhexyl cyanoacetate |
| E27 | | 3-[3-(trifluoromethyl)-phenyl]cyclohex-2-en-1-one and isopentyl cyanoacetate |
| E28 | | 3-[3-(trifluoromethyl)phenyl]cyclohex-2-en-1-one and 2-ethylhexyl-cyanoacetate |
| E29 | | 3-[3,5-bis(trifluoromethyl)phenyl]cyclohex-2-en-1-one and isopentyl cyanoacetate |

TABLE 7-continued

List of the Example Compounds and the Starting Materials Used to Prepare Them

| Compound Number | Compound Structure | Starting Materials X and Y |
|---|---|---|
| E30 | 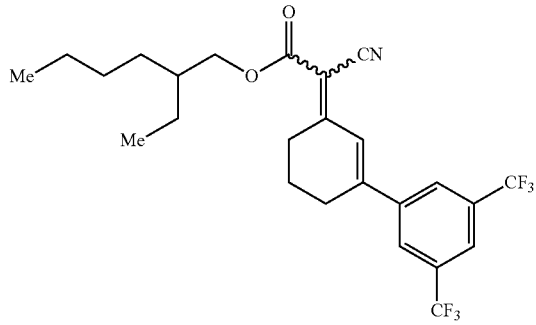 | 3-[3,5-bis(trifluoromethyl)-phenyl]cyclohex-2-en-1-one and 2-ethylhexyl cyanoacetate |
| E31 | 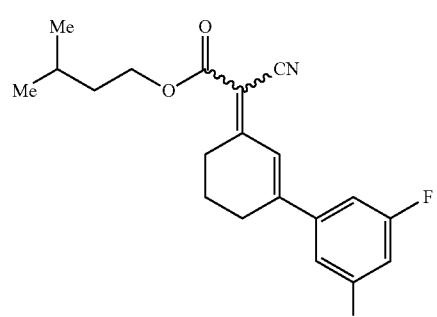 | 3-(3,5-difluorophenyl)cyclo-hex-2-en-1-one and isopentyl cyano-acetate |
| E32 | 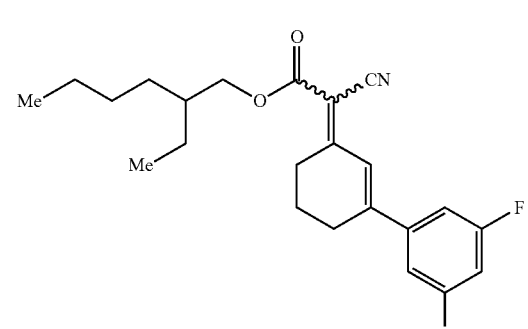 | 3-(3,5-difluorophenyl)cyclo-hex-2-en-1-one and 2-ethylhexyl cyano-acetate |
| E33 | 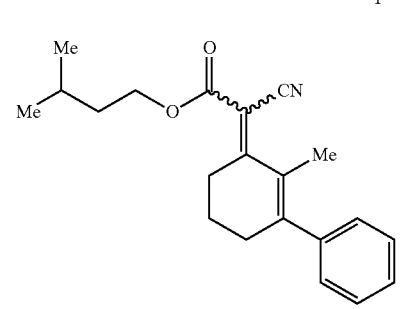 | 3-(2-methylphenyl)-cyclohex-2-en-1-one and isopentyl cyanoacetate |
| E34[b] | 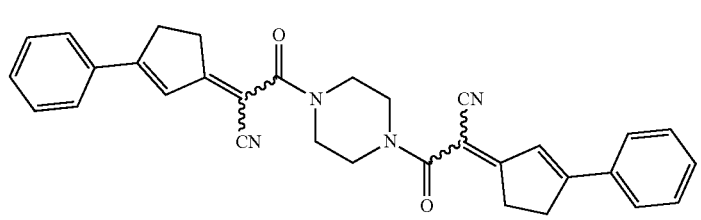 | 3-phenylcyclopent-2-en-1-one and 3-[4-(2-cyanoacetyl)-piperazin-1-yl]-3-oxopropiononitrile |

TABLE 7-continued

List of the Example Compounds and the Starting Materials Used to Prepare Them

| Compound Number | Compound Structure | Starting Materials X and Y |
|---|---|---|
| E35 | | 3-phenylcyclohex-2-en-1-one and N-3-methoxypropyl-cyanoacetamide |
| E36[b] | | 3-phenylcyclohex-2-en-1-one and 3-[4-(2-Cyanoacetyl)-1-piperazinyl]-3-oxopropiononitrile |
| E37[b] | | 3-[p-(tert-butyl)phenyl]-2-cyclohexen-1-one and 3-[4-(2-cyano-acetyl)-1-piperazinyl]-3-oxo-propiononitrile |
| E38 | | 3-[p-(tert-butyl)-phenyl]-2-cyclo-hexen-1-one and isopentyl cyano-acetate |

TABLE 7-continued
List of the Example Compounds and the Starting Materials Used to Prepare Them
| Compound Number | Compound Structure | Starting Materials X and Y |
|---|---|---|
| E39 | 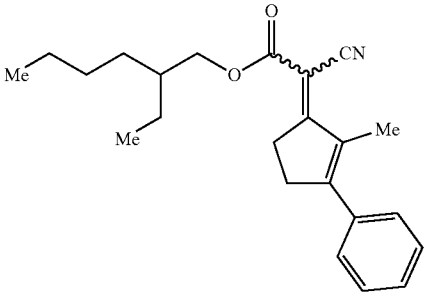 | 2-methyl-3-phenyl-2-cyclopenten-1-one and 2-ethylhexyl cyanoacetate |
| E40[b] | 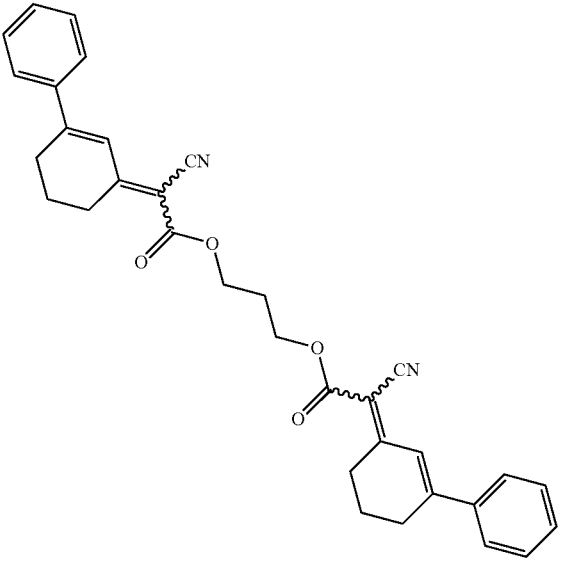 | 3-phenylcyclohex-2-en-1-one and 3-(cyanoacetoxy)propyl cyanoacetate |
| E41[b] | 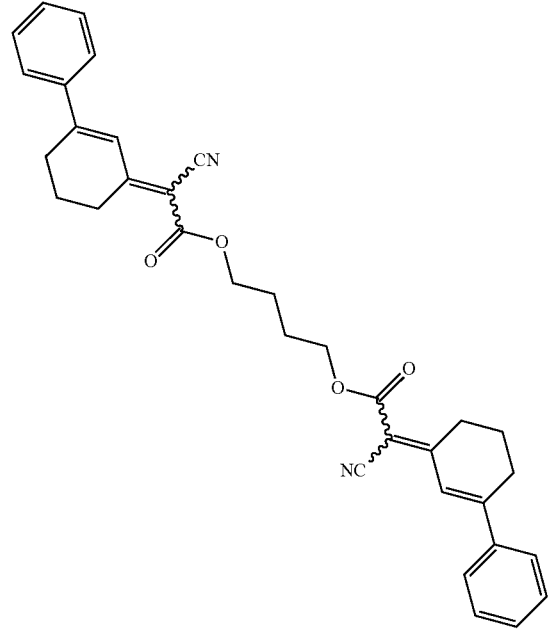 | 3-phenylcyclohex-2-en-1-one and 4-(cyanoacetoxy)butyl cyanoacetate |

TABLE 7-continued

List of the Example Compounds and the Starting Materials Used to Prepare Them

| Compound Number | Compound Structure | Starting Materials X and Y |
|---|---|---|
| E42[b] | | 3-phenylcyclohex-2-en-1-one and 5-(cyanoacetoxy)pentyl cyanoacetate |
| E43[b] | | 3-phenylcyclohex-2-en-1-one and 6-(cyanoacetoxy)hexyl cyanoacetate |

TABLE 7-continued

List of the Example Compounds and the Starting Materials Used to Prepare Them

| Compound Number | Compound Structure | Starting Materials X and Y |
|---|---|---|
| E44[b] | | 3-phenylcyclohex-2-en-1-one and 3-(cyanoacetoxy)-2,2-dimethylpropyl cyanoacetate |
| E45 | | 3-phenylcyclohex-2-en-1-one and ethyl (diethoxyphosphoryl) acetate |
| E46 | | 3-(p-methoxyphenyl)-2-cyclohexen-1-one and ethyl (diethoxyphosphoryl) acetate |
| E47 | | 3-phenylcyclohex-2-en-1-one and isopentyl (diethoxyphosphoryl) acetate |

TABLE 7-continued

List of the Example Compounds and the Starting Materials Used to Prepare Them

| Compound Number | Compound Structure | Starting Materials X and Y |
|---|---|---|
| E48 | | 3-(p-methoxyphenyl)-2-cyclohexen-1-one and isopentyl (diethoxyphosphoryl)acetate |
| E49 | | 3-phenylcyclohex-2-en-1-one and 2-ethylhexyl (diethoxyphosphoryl)acetate |
| E50 | | 3-(p-methoxyphenyl)-2-cyclohexen-1-one and 2-ethylhexyl (diethoxyphosphoryl)acetate |
| E51 | | 3-phenylcyclohex-2-en-1-one and 2-butyloctyl (diethoxyphosphoryl)acetate |
| E52 | | 3-(p-methoxyphenyl)-2-cyclohexen-1-one and 2-butyloctyl (diethoxyphosphoryl)acetate |

TABLE 7-continued

List of the Example Compounds and the Starting Materials Used to Prepare Them

| Compound Number | Compound Structure | Starting Materials X and Y |
|---|---|---|
| E53[b] | 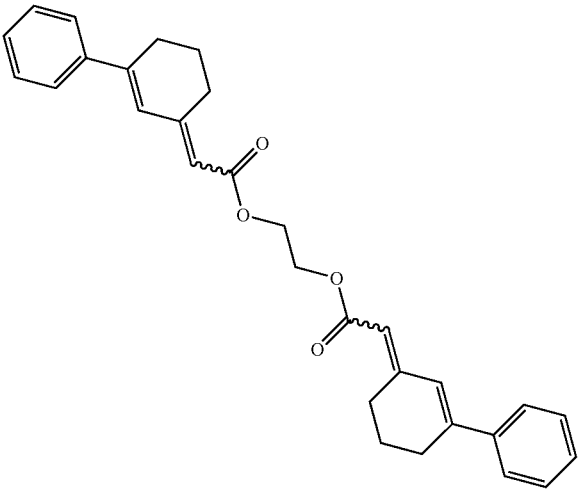 [SMILES: O=C(C=C1C=C(c2ccccc2)CCC1)OCCOC(=O)C=C1C=C(c2ccccc2)CCC1] | 3-phenylcyclohex-2-en-1-one and 2-[(Diethoxyphosphoryl)acetoxy]ethyl (diethoxyphosphoryl) acetate |
| E54[b] | 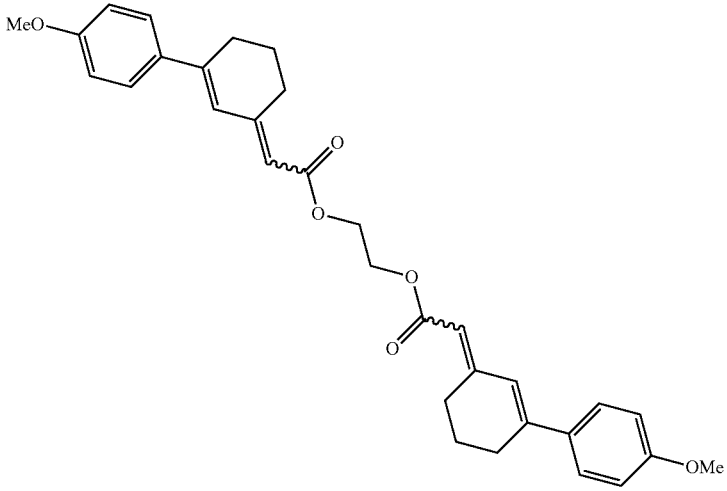 [SMILES: COc1ccc(C2=CC(=CC(=O)OCCOC(=O)C=C3C=C(c4ccc(OC)cc4)CCC3)CCC2)cc1] | 3-(p-methoxy-phenyl)-2-cyclo-hexen-1-one and 2-[(Diethoxyphosphoryl)acetoxy]ethyl (diethoxyphosphoryl) acetate |
| E55[b] | 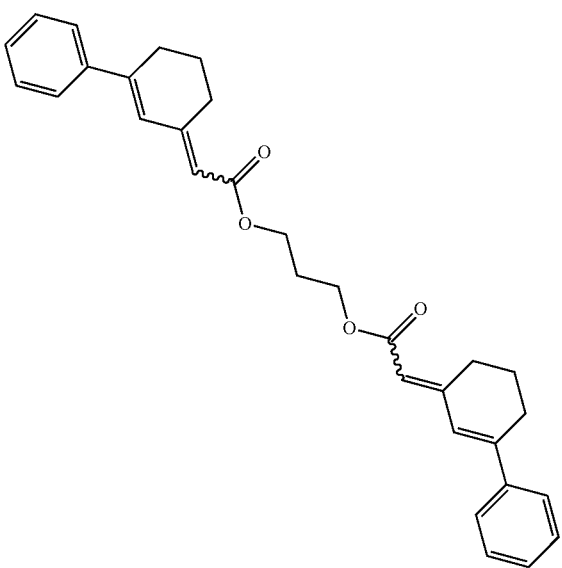 [SMILES: O=C(C=C1C=C(c2ccccc2)CCC1)OCCCOC(=O)C=C1C=C(c2ccccc2)CCC1] | 3-phenylcyclohex-2-en-1-one and 3-[(Diethoxyphosphoryl)acetoxy]propyl (diethoxyphosphoryl) acetate |

TABLE 7-continued
List of the Example Compounds and the Starting Materials Used to Prepare Them
| Compound Number | Compound Structure | Starting Materials X and Y |
|---|---|---|
| E56[b] | 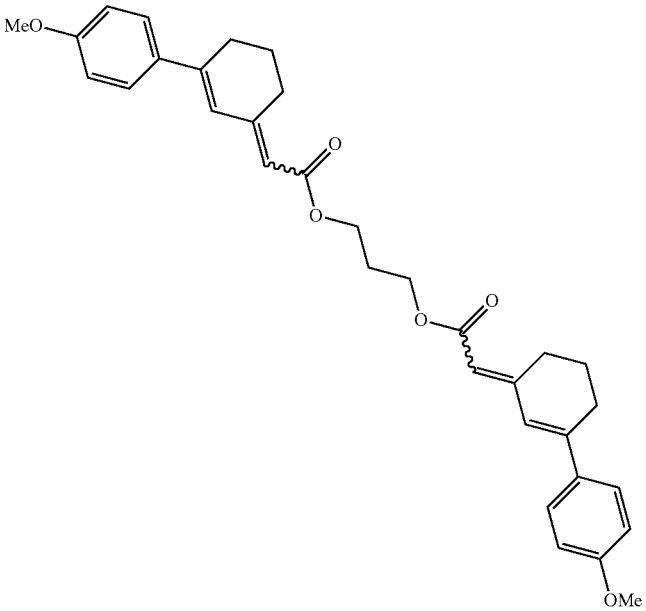 [SMILES: COc1ccc(C2=CC(=CC(=O)OCCCOC(=O)C=C3C=C(c4ccc(OC)cc4)CCC3)CCC2)cc1] | 3-(p-methoxy-phenyl)-2-cyclo-hexen-1-one and 3-[(Diethoxyphosphoryl)acetoxy]propyl (diethoxyphosphoryl)acetate |
| E57[b] | 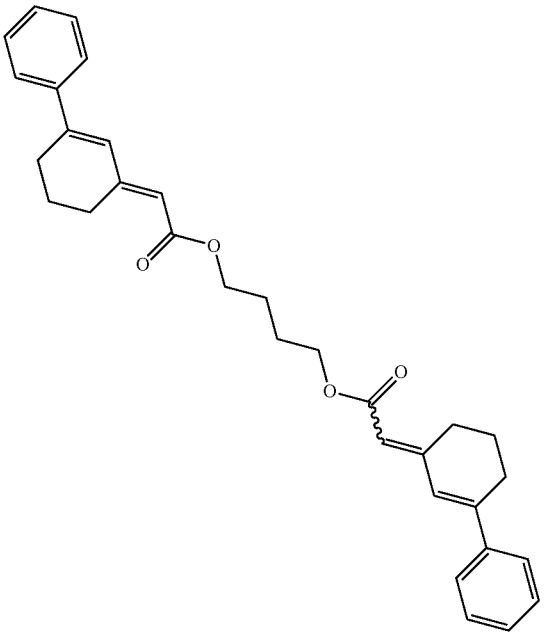 [SMILES: O=C(C=C1C=C(c2ccccc2)CCC1)OCCCCOC(=O)/C=C1/C=C(c2ccccc2)CCC1] | 3-phenylcyclohex-2-en-1-one and 4-[(Diethoxyphosphoryl)acetoxy]butyl (diethoxyphosphoryl)acetate |

TABLE 7-continued
List of the Example Compounds and the Starting Materials Used to Prepare Them
| Compound Number | Compound Structure | Starting Materials X and Y |
|---|---|---|
| E58[b] | 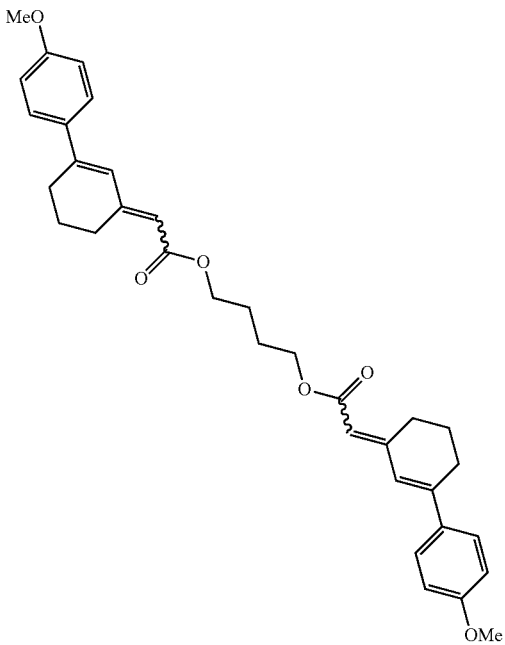 [SMILES: COc1ccc(C2=CC(=CC(=O)OCCCCOC(=O)C=C3C=C(c4ccc(OC)cc4)CCC3)CCC2)cc1] | 3-(p-methoxy-phenyl)-2-cyclo-hexen-1-one and 4-[(Diethoxyphosphoryl)acetoxy]butyl (diethoxyphosphoryl) acetate |
| E59[b] | 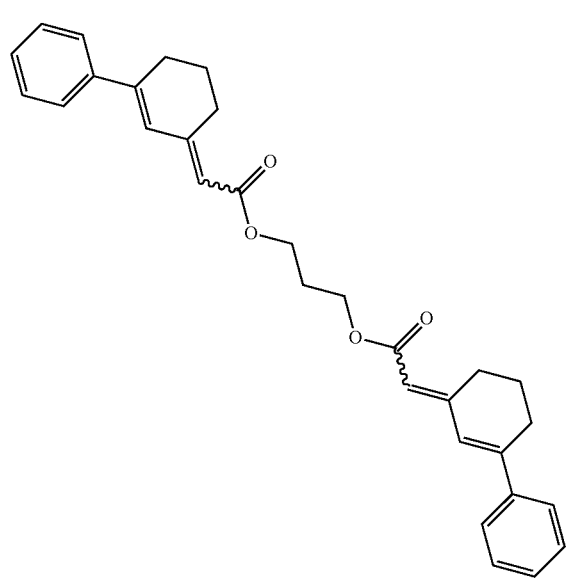 [SMILES: O=C(C=C1C=C(c2ccccc2)CCC1)OCCCOC(=O)C=C1C=C(c2ccccc2)CCC1] | 3-phenylcyclohex-2-en-1-one and 5-[(Diethoxyphosphoryl)acetoxy]pentyl (diethoxyphosphoryl) acetate |

TABLE 7-continued
List of the Example Compounds and the Starting Materials Used to Prepare Them
| Compound Number | Compound Structure | Starting Materials X and Y |
|---|---|---|
| E60[b] | 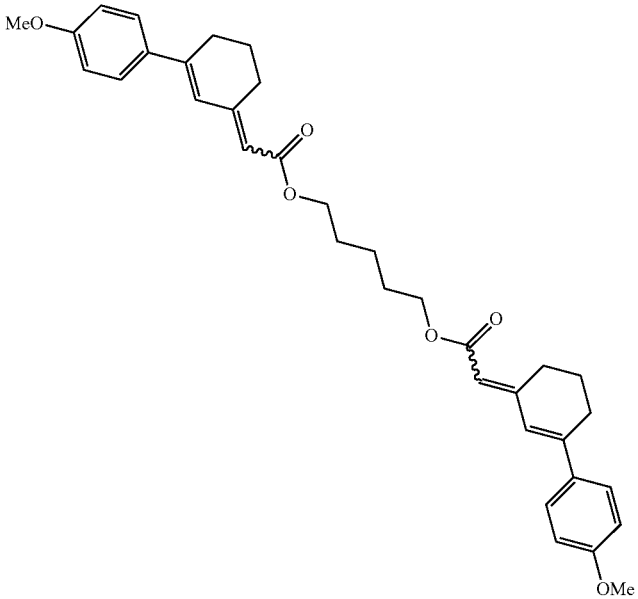 [SMILES: COc1ccc(C2=CC(=CC(=O)OCCCCCOC(=O)C=C3C=C(c4ccc(OC)cc4)CCC3)CCC2)cc1] | 3-(p-methoxy-phenyl)-2-cyclo-hexen-1-one and 5-[(Diethoxyphosphoryl)acetoxy]pentyl (diethoxyphosphoryl) acetate |
| E61[b] | 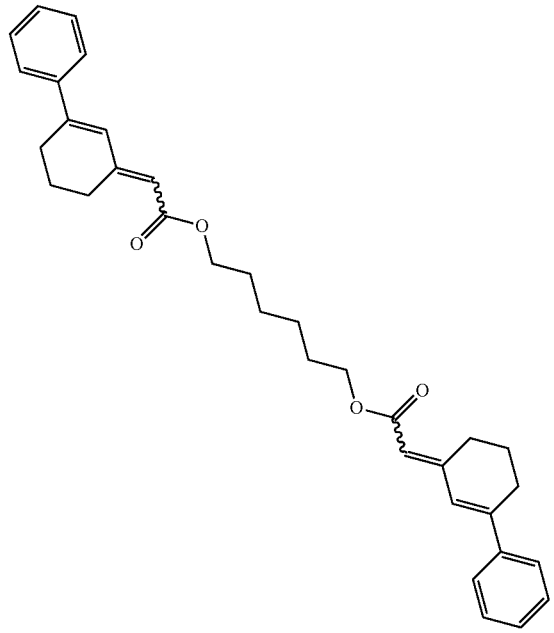 [SMILES: O=C(C=C1C=C(c2ccccc2)CCC1)OCCCCCCOC(=O)C=C1C=C(c2ccccc2)CCC1] | 3-phenylcyclohex-2-en-1-one and 6-[(Diethoxyphosphoryl)acetoxy]hexyl (diethoxyphosphoryl) acetate |

TABLE 7-continued

List of the Example Compounds and the Starting Materials Used to Prepare Them

| Compound Number | Compound Structure | Starting Materials X and Y |
|---|---|---|
| E62[b] | 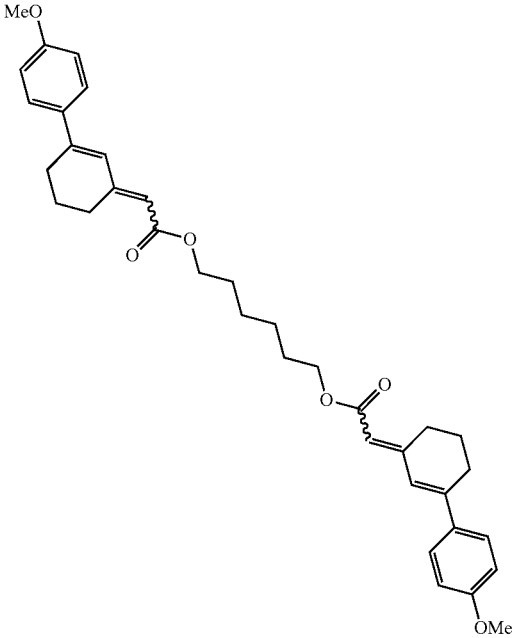 [SMILES: COc1ccc(C2=CC(=CC(=O)OCCCCCCOC(=O)C=C3C=C(c4ccc(OC)cc4)CCC3)CCC2)cc1] | 3-(p-methoxy-phenyl)-2-cyclo-hexen-1-one and 6-[(Diethoxyphosphoryl)acetoxy]hexyl (diethoxyphosphoryl) acetate |
| E63[b] | 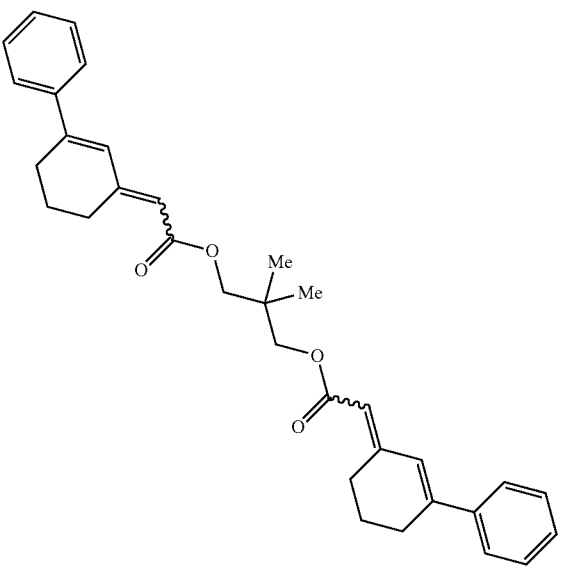 [SMILES: CC(C)(COC(=O)C=C1C=C(c2ccccc2)CCC1)COC(=O)C=C1C=C(c2ccccc2)CCC1] | 3-phenylcyclohex-2-en-1-one and 3-[(Diethoxyphosphoryl)acetoxy]-2,2-dimethylpropyl (diethoxyphosphoryl) acetate |

TABLE 7-continued

List of the Example Compounds and the Starting Materials Used to Prepare Them

| Compound Number | Compound Structure | Starting Materials X and Y |
|---|---|---|
| E64[b] | 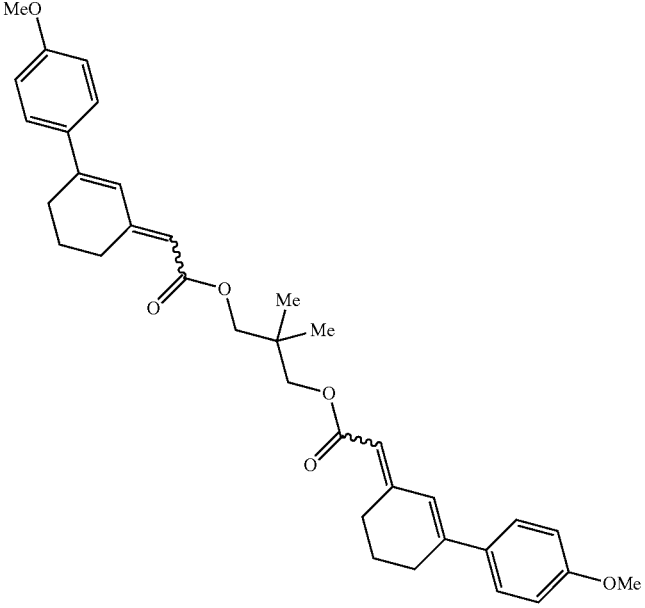 [SMILES: COc1ccc(C2=CC(=CC(=O)OCC(C)(C)COC(=O)C=C3C=C(c4ccc(OC)cc4)CCC3)CCC2)cc1] | 3-(p-methoxyphenyl)-2-cyclohexen-1-one and 3-[(Diethoxyphosphoryl)acetoxy]-2,2-dimethylpropyl (diethoxyphosphoryl)acetate |

[a]Three equivalents of ketone X and one equivalent of compound Y.
[b]Two equivalents of ketone X and one equivalent of compound Y.

TABLE 8

List of Compounds with their Appearances and Thin Layer Chromatography (TLC) Retention Factors ($R_F$)

| Compound Number | Name | Appearance | TLC Conditions (v/v %) | $R_F1$ | $R_F2$ |
|---|---|---|---|---|---|
| E1 | (3-Phenyl-2-cyclohexen-1-ylidene)propanedinitrile | Yellow Powder | 90% Hexanes 10% Ethyl Acetate | 0.19 | N/A |
| E2 | [3-(p-Methoxyphenyl)-2-cyclohexen-1-ylidene]-propanedinitrile | Yellow Powder | 75% Hexanes 25% Ethyl Acetate | 0.39 | N/A |
| E3 | (3-Phenyl-2-cyclopenten-1-ylidene)propanedinitrile | Brown Powder | 75% Hexanes 25% Ethyl Acetate | 0.39 | N/A |
| E4 | [3-(p-Methoxyphenyl)-2-cyclopenten-1-ylidene]propanedinitrile | Orange Powder | 75% Hexanes 25% Ethyl Acetate | 0.31 | N/A |
| E5 | 2-Ethylhexyl (3-phenyl-2-cyclohexen-1-ylidene)cyanoacetate (mixture of cis and trans isomers) | Yellow Oil | 90% Hexanes 10% Ethyl Acetate | 0.48 | 0.42 |
| E6 | 2-Ethylhexyl (3-phenyl-2-cyclopenten-1-ylidene)cyanoacetate (mixture of cis and trans isomers) | Yellow Waxy Solid | 90% Hexanes 10% Ethyl Acetate | 0.41 | 0.32 |
| E7 | Ethyl [3-(p-methoxyphenyl)-2-cyclohexen-1-ylidene]-cyanoacetate (mixture of cis and trans isomers) | Yellow Powder | 75% Hexanes 25% Ethyl Acetate | 0.39 | N/A |
| E8 | 2-Ethylhexyl [3-(p-methoxyphenyl)-2-cyclopenten-1-ylidene]cyanoacetate (mixture of cis and trans isomers) | Red Solid | 75% Hexanes 25% Ethyl Acetate | 0.39 | 0.55 |
| E9 | Ethyl [5,5-dimethyl-3-(p-methoxyphenyl)-2-cyclohexen-1-ylidene]cyanoacetate (mixture of cis and trans isomers) | Yellow Oil | 90% Hexanes 10% Ethyl Acetate | 0.21 | N/A |

TABLE 8-continued

List of Compounds with their Appearances and Thin
Layer Chromatography (TLC) Retention Factors ($R_F$)

| Compound Number | Name | Appearance | TLC Conditions (v/v %) | $R_F1$ | $R_F2$ |
|---|---|---|---|---|---|
| E10 | Ethyl [5,5-dimethyl-3-phenyl-2-cyclohexen-1-ylidene]-cyanoacetate (mixture of cis and trans isomers) | Yellow Oil | 90% Hexanes 10% Ethyl Acetate | 0.38 | N/A |
| E11 | 2,2-Dimethyl-5-(3-phenyl-2-cyclohexen-1-ylidene)-1,3-dioxane-4,6-dione | Yellow Oily Solid | 75% Hexanes 25% Ethyl Acetate | 0.39 | N/A |
| E12 | Dimethyl (3-phenyl-2-cyclohexen-1-ylidene)malonate | Clear Oil | 90% Hexanes 10% Ethyl Acetate | 0.29 | N/A |
| E13 | Polyethylene(3-phenyl-2-cyclohexen-1-ylidene)malonate | — | — | — | — |
| E14 | (4,4-Dimethyl-3-phenyl-2-cyclopenten-1-ylidene)propane-dinitrile | Yellow Solid | 90% Hexanes 10% Ethyl Acetate | 0.32 | N/A |
| E15 | 2-Ethylhexyl cyano(4,4-dimethyl-3-phenyl-2-cyclopenten-1-ylidene)acetate (mixture of cis and trans isomers) | Yellow Oil | 90% Hexanes 10% Ethyl Acetate | 0.50 | N/A |
| E16 | (4-Methyl-3-phenyl-2-cyclopenten-1-ylidene)propanedi-nitrile | Orange Solid | 90% Hexanes 10% Ethyl Acetate | 0.22 | N/A |
| E17 | (2,4-Dimethyl-3-phenyl-2-cyclopenten-1-ylidene)propanedi-nitrile | Brown Solid | 90% Hexanes 10% Ethyl Acetate | 0.24 | N/A |
| E18 | 2-Ethylhexyl cyano(4-methyl-3-phenyl-2-cyclopenten-1-ylidene)acetate (mixture of cis and trans isomers) | Orange Oil | 90% Hexanes 10% Ethyl Acetate | 0.41 | N/A |
| E19 | 2-Ethylhexyl cyano(2,4-dimethyl-3-phenyl-2-cyclopenten-1-ylidene)acetate (mixture of cis and trans isomers) | Yellow Oil | 90% Hexanes 10% Ethyl Acetate | 0.45 | N/A |
| E20 | (2-Methyl-3-phenyl-2-cyclopenten-1-ylidene)propane-dinitrile | Yellow Powder | 90% Hexanes 10% Ethyl Acetate | 0.21 | N/A |
| E21 | 2,3-Bis[(3-phenylcyclohex-2-en-1-ylidene)cyanoacetoxy]propyl (3-phenylcyclohex-2-en-1-ylidene)cyanoacetate (mixture of cis and trans isomers) | Yellow Powder | 100% Methylene Chloride | 0.35 | N/A |
| E22 | 2-[(3-phenylcyclohex-2-en-1-ylidene)cyanoacetoxy]ethyl (3-phenylcyclohex-2-en-1-ylidene)cyanoacetate (mixture of cis and trans isomers) | Yellow Powder | 100% Methylene Chloride | 0.58 | N/A |
| E23 | Isopentyl (3-phenylcyclohex-2-en-1-ylidene)cyanoacetate (mixture of cis and trans isomers) | Yellow Solid | 90% Hexanes 10% Ethyl Acetate | 0.36 | 0.33 |
| E24 | 2-Ethoxyethyl (3-phenyl-2-cyclohexen-1-ylidene)cyanoacetate (mixture of cis and trans isomers) | Yellow Oil | 75% Hexanes 25% Ethyl Acetate | 0.56 | 0.47 |
| E25 | Isopentyl {3-[4-(trifluoromethyl)phenyl]-cyclohex-2-en-1-ylidene}cyanoacetate (mixture of cis and trans isomers) | Yellow Powder | 90% Hexanes 10% Ethyl Acetate | 0.32 | 0.26 |
| E26 | 2-Ethylhexyl {3-14-(trifluoromethyl)phenyl]-cyclohex-2-en-1-ylidene}cyanoacetate (mixture of cis and trans isomers) | Yellow Oil | 90% Hexanes 10% Ethyl Acetate | 0.42 | 0.33 |
| E27 | Isopentyl {3-[3-(trifluoromethyl)phenyl]-cyclohex-2-en-1-ylidene] cyanoacetate (mixture of cis and trans isomers) | Orange Oil | 90% Hexanes 10% Ethyl Acetate | 0.27 | 0.21 |
| E28 | 2-ethylhexyl {3-[3-(trifluoromethyl)phenyl]-cyclohex-2-en-1-ylidene}cyanoacetate (mixture of cis and trans isomers) | Yellow Oil | 90% Hexanes 10% Ethyl Acetate | 0.42 | 0.30 |

TABLE 8-continued

List of Compounds with their Appearances and Thin Layer Chromatography (TLC) Retention Factors ($R_F$)

| Compound Number | Name | Appearance | TLC Conditions (v/v %) | $R_F1$ | $R_F2$ |
|---|---|---|---|---|---|
| E29 | Isopentyl {3-[3,5-bis(trifluoromethyl)phenyl]-cyclohex-2-en-1-ylidene}cyanoacetate (mixture of cis and trans Isomers) | Off-white Solid | 90% Hexanes 10% Ethyl Acetate | 0.38 | 0.31 |
| E30 | 2-Ethylhexyl {3-[3,5-bis(trifluoromethyl)phenyl]-cyclohex-2-en-1-ylidene}cyanoacetate (mixture of cis and trans isomers) | Orange Oil | 90% Hexanes 10% Ethyl Acetate | 0.38 | 0.31 |
| E31 | Isopentyl [3-(3,5-difluorophenyl)cyclohex-2-en-1-ylidene]cyanoacetate (mixture of cis and trans isomers) | Yellow Solid | 90% Hexanes 10% Ethyl Acetate | 0.33 | 0.30 |
| E32 | 2-ethylhexyl [3-(3,5-difluorophenyl)cyclohex-2-en-1-ylidene]cyanoacetate (mixture of cis and trans isomers) | Yellow Oil | 90% Hexanes 10% Ethyl Acetate | 0.50 | 0.44 |
| E33 | Isopentyl (2-methyl-3-phenylcyclohex-2-en-1-ylidene)-cyanoacetate (mixture of cis and trans isomers) | Orange Oil | 90% Hexanes 10% Ethyl Acetate | 0.41 | 0.35 |
| E34 | 2-(3-phenylcyclopent-2-en-1-ylidene)-3-{4-[2-(3-phenylcyclopent-2-en-1-ylidene)-2-cyanoacetyl]piperazin-1-yl}-3-oxopropiononitrile (mixture of cis and trans isomers) | Brown Solid | 75% Methylene Chloride 25% Ethyl Acetate | 0.53 | 0.39 |
| E35 | N-3-methoxypropyl-(3-phenylcyclohex-2-en-1-ylidene)-cyanoacetamide (mixture of cis and trans isomers) | Yellow Powder | 75% Hexanes 25% Ethyl Acetate | 0.29 | 0.15 |
| E36 | 2-(3-Phenyl-2-cyclohexen-1-ylidene)-3-{4-[2-(3-phenyl-2-cyclohexen-1-ylidene)-2-cyanoacetyl]-1-piperazinyl}-3-oxopropiononitrile (mixture of cis and trans isomers) | Yellow Solid | 75% Methylene Chloride 25% Ethyl Acetate | 0.41 | 0.25 |
| E37 | 2-{3-[p-(tert-Butyl)phenyl]-2-cyclohexen-1-ylidene}-3-{4-[2-{3-[p-(tert-butyl)phenyl]-2-cyclohexen-1-ylidene}-2-cyanoacetyl]-1-piperazinyl}-3-oxopropiononitrile (mixture of cis and trans isomers) | Yellow Powder | 75% Methylene Chloride 25% Ethyl Acetate | 0.47 | 0.25 |
| E38 | Isopentyl {3-[4-(tert-butyl)phenyl]cyclohex-2-en-1-ylidene] cyanoacetate (mixture of cis and trans isomers) | Yellow Solid | 90% Hexanes 10% Ethyl Acetate | 0.49 | 0.43 |
| E39 | 2-Ethylhexyl cyano(2-methyl-3-phenyl-2-cyclopenten-1-ylidene)acetate (Mixture of cis and trans isomers) | Yellow Oil | 90% Hexanes 10% Ethyl Acetate | 0.49 | 0.43 |
| E40 | 3-[(3-Phenyl-2-cyclohexen-1-ylidene)cyanoacetoxy]propyl (3-phenyl-2-cyclohexen-1-ylidene)cyanoacetate (Mixture of cis and trans isomers) | — | — | — | — |
| E41 | 4-[(3-Phenyl-2-cyclohexen-1-ylidene)cyanoacetoxy]butyl (3-phenyl-2-cyclohexen-1-ylidene)cyanoacetate (Mixture of cis and trans isomers) | — | — | — | — |
| E42 | 5-[(3-Phenyl-2-cyclohexen-1-ylidene)cyanoacetoxy]pentyl (3-phenyl-2-cyclohexen-1-ylidene)cyanoacetate (Mixture of cis and trans isomers) | — | — | — | — |
| E43 | 6-[(3-Phenyl-2-cyclohexen-1-ylidene)cyanoacetoxy]hexyl (3-phenyl-2-cyclohexen-1-ylidene)cyanoacetate (Mixture of cis and trans isomers) | — | — | — | — |

TABLE 8-continued

List of Compounds with their Appearances and Thin
Layer Chromatography (TLC) Retention Factors ($R_F$)

| Compound Number | Name | Appearance | TLC Conditions (v/v %) | $R_F$1 | $R_F$2 |
|---|---|---|---|---|---|
| E44 | 3-[(3-Phenyl-2-cyclohexen-1-ylidene)cyanoacetoxy]propyl (3-phenyl-2-cyclohexen-1-ylidene)cyanoacetate (Mixture of cis and trans isomers) | — | — | — | — |
| E45 | Ethyl (3-phenyl-2-cyclohexen-1-ylidene)acetate (Mixture of cis and trans isomers) | Yellow Oil | 95% Hexanes 5% Ethyl Acetate | 0.41 | 0.35 |
| E46 | Ethyl [3-(p-methoxyphenyl)-2-cyclohexen-1-ylidene]acetate (Mixture of cis and trans isomers) | Off-white Solid | 95% Hexanes 5% Ethyl Acetate | 0.24 | N/A |
| E47 | Isopentyl (3-phenyl-2-cyclohexen-1-ylidene)acetate (Mixture of cis and trans isomers) | Yellow Oil | 95% Hexanes 5% Ethyl Acetate | 0.42 | 0.37 |
| E48 | Isopentyl [3-(p-methoxyphenyl)-2-cyclohexen-1-ylidene]acetate (Mixture of cis and trans isomers) | — | — | — | — |
| E49 | 2-Ethylhexyl (3-phenyl-2-cyclohexen-1-ylidene)acetate (Mixture of cis and trans isomers) | Clear Oil | 95% Hexanes 5% Ethyl Acetate | 0.50 | 0.44 |
| E50 | 2-Ethylhexyl [3-(p-methoxyphenyl)-2-cyclohexen-1-ylidene]acetate (Mixture of cis and trans isomers) | — | — | — | — |
| E51 | 2-Butyloctyl (3-phenyl-2-cyclohexen-1-ylidene)acetate (Mixture of cis and trans isomers) | — | — | — | — |
| E52 | 2-Butyloctyl [3-(p-methoxyphenyl)-2-cyclohexen-1-ylidene]acetate (Mixture of cis and trans isomers) | — | — | — | — |
| E53 | 2-[(3-Phenyl-2-cyclohexen-1-ylidene)acetoxy]ethyl (3-phenyl-2-cyclohexen-1-ylidene)acetate (Mixture of cis and trans isomers) | — | — | — | — |
| E54 | 2-{[3-(p-Methoxyphenyl)-2-cyclohexen-1-ylidene]acetoxy}ethyl-[3-(p-methoxyphenyl)-2-cyclohexen-1-ylidene]acetate (Mixture of cis and trans isomers) | — | — | — | — |
| E55 | 3-[(3-Phenyl-2-cyclohexen-1-ylidene)acetoxy]propyl (3-phenyl-2-cyclohexen-1-ylidene)acetate (Mixture of cis and trans isomers) | — | — | — | — |
| E56 | 3-{([3-(p-Methoxyphenyl)-2-cyclohexen-1-ylidene]acetoxy}propyl [3-(p-methoxyphenyl)-2-cyclohexen-1-ylidene]acetate (Mixture of cis and trans isomers) | — | — | — | — |
| E57 | 4-[(3-Phenyl-2-cyclohexen-1-ylidene)acetoxy]butyl (3-phenyl-2-cyclohexen-1-ylidene)acetate (Mixture of cis and trans isomers) | — | — | — | — |
| E58 | 4-{[3-(p-Methoxyphenyl)-2-cyclohexen-1-ylidene]acetoxy}butyl [3-(p-methoxyphenyl)-2-cyclohexen-1-ylidene]acetate (Mixture of cis and trans isomers) | — | — | — | — |

TABLE 8-continued

List of Compounds with their Appearances and Thin Layer Chromatography (TLC) Retention Factors ($R_F$)

| Compound Number | Name | Appearance | TLC Conditions (v/v %) | $R_F1$ | $R_F2$ |
|---|---|---|---|---|---|
| E59 | 5-[(3-Phenyl-2-cyclohexen-1-ylidene)acetoxy]pentyl (3-phenyl-2-cyclohexen-1-ylidene)acetate (Mixture of cis and trans isomers) | — | — | — | — |
| E60 | 5-{[3-(p-Methoxyphenyl)-2-cyclohexen-1-ylidene]acetoxy}pentyl [3-(p-methoxyphenyl)-2-cyclohexen-1-ylidene]acetate (Mixture of cis and trans isomers) | — | — | — | — |
| E61 | 6-[(3-Phenyl-2-cyclohexen-1-ylidene)acetoxy]hexyl (3-phenyl-2-cyclohexen-1-ylidene)acetate (Mixture of cis and trans isomers) | — | — | — | — |
| E62 | 6-{[3-(p-Methoxyphenyl)-2-cyclohexen-1-ylidene]acetoxy}hexyl [3-(p-methoxyphenyl)-2-cyclohexen-1-ylidene]acetate (Mixture of cis and trans isomers) | — | — | — | — |
| E63 | 3-[(3-Phenyl-2-cyclohexen-1-ylidene)acetoxy]-2,2-dimethylpropyl (3-phenyl-2-cyclohexen-1-ylidene)acetate (Mixture of cis and trans isomers) | — | — | — | — |
| E64 | 3-{[3-(p-Methoxyphenyl)-2-cyclohexen-1-ylidene]acetoxy}-2,2-dimethylpropyl [3-(p-methoxyphenyl)-2-cyclohexen-1-ylidene]acetate (Mixture of cis and trans isomers) | — | — | — | — |

Example 3

Compounds E12 and E13 were prepared from compound E11 which is described above by trans esterification reactions.

(a) Dimethyl (3-phenyl-2-cyclohexen-1-ylidene) malonate (E12):

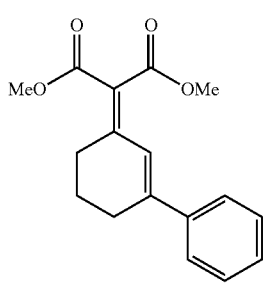 [SMILES: COC(=O)C(C(=O)OC)=C1C=C(c2ccccc2)CCC1]

Compound 12 was obtained by dissolving 2,2-Dimethyl-5-(3-phenyl-2-cyclohexen-1-ylidene)-1,3-dioxane-4,6-dione (E11, 812.7 mg, 2.724 mmol) and p-toluenesulfonic acid monohydrate (110.4 mg, 0.5803 mmol) in 30 mL methanol and heating the solution under reflux. The reaction was monitored by thin layer chromatography or UV-Vis spectroscopy. Upon completion, the reaction was cooled to room temperature. The methanol was evaporated in vacuo. The resulting oil was subjected to the standard work up to produce a yellow oil (0.2019 g, 26%).

(b) Synthesis of polyethylene (3-phenyl-2-cyclohexen-1-ylidene) malonate (E13):

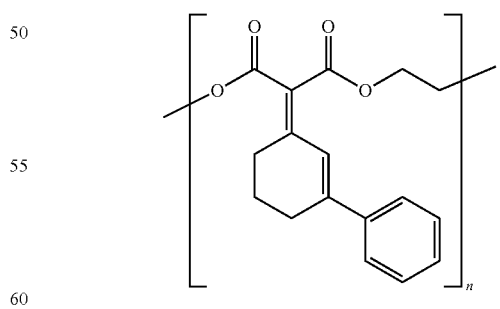

Compound 13 may be obtained by heating a mixture of 2,2-Dimethyl-5-(3-phenyl-2-cyclohexen-1-ylidene)-1,3-dioxane-4,6-dione (E11, 305.1 mg, 1.023 mmol), ethylene glycol (0.15 mL, 2.68 mmol), zinc acetate (0.9 mg, 0.005 mmol), pentaerythritol tetrakis(3,5-di-tert-butyl-4-hydroxyhydrocinnamate) (0.8 mg, 0.0007 mmol), and triphenyl phosphite (0.5 mg, 0.002 mmol) in a nitrogen atmosphere to 140° C. with stirring. The reaction may be monitored by UV/Vis spectroscopy and the acetone and acetal biproducts should be removed by distillation. Then, the polycondensation catalyst, antimony trioxide (1.0 mg, 0.0034 mmol), could be added to the reaction mixture as a suspension in the diol under a positive nitrogen pressure followed by heating to 190° C. and distillation of the diol over the course of 30 min under 50 m Torr pressure to drive the polycondensation reaction. The reaction can be completed in 12 hours and cooled to room temperature (~23° C.) and dissolved in a minimum of chloroform. The resulting solution can be added dropwise to a stirred solution of isopropanol to precipitate the product polymer (E13), which can be collected by filtration.

Example 4

Sunscreen Compositions:

Weigh and combine the ingredients of phases A, B, C, D, and E separately. After mixing phases A and B and heating to 80° C., phases C and D are added sequentially while homogenizing the mixture and heating the mixture to 75° C. Then, phase E is added slowly, and the mixture is fully homogenized for 3 minutes. The homogenized mixture is cooled to <50° C., and the component of phase F are added sequentially with continuous mixing to homogeneity. Finally, the mixture is cooled to room temperature.

(a) SPF 15 Sunscreen:

| Phase | Name | wt % (Final Formulation) |
|---|---|---|
| A | Octisalate | 5.00 |
| A | 2-Ethylhexyl (3-phenyl-2-cyclopenten-1-ylidene)cyanoacetate (E6) | 2.00 |
| B | Butyl Methoxydibenzoylmethane (Avobenzone) | 3.00 |
| C | VP/Eicosene Copolymer | 1.70 |
| C | Glyceryl Searate | 1.60 |
| C | PEG-100 Stearate | 1.50 |
| C | Polyglyceryl-3-Methylglucose Distearate | 1.80 |
| D | Styrene/Acrylates Copolymer | 2.50 |
| E | Water | Balance |
| E | Glycerin | 3.00 |
| E | Disodium EDTA | 0.05 |
| E | Xanthan Gum | 0.30 |
| F | Caprylyl Glycol, Phenoxyethanol, Hexylene Glycol | 0.50 |
| F | Cyclopentasiloxane, Cyclohexasiloxane | 2.00 |
| F | Acrylamide/Sodium Acryloyldimethyltaurate Copolymer, Isohexadecane, Polysorbate 80 | 1.00 |
| F | Silica (spherical, 12 μm) | 2.00 |

(b) SPF 15 Sunscreen:

| Phase | Name | wt % (Final Formulation) |
|---|---|---|
| A | Homosalate | 10.00 |
| A | Octisalate | 5.00 |
| A | (3-Phenyl-2-cyclohexen-1-ylidene)propanedinitrile (E1) | 2.00 |
| A | Dimethyl (3-phenyl-2-cyclohexen-1-ylidene)malonate (E12) | 1.00 |
| B | Butyl Methoxydibenzoylmethane (Avobenzone) | 3.00 |
| C | VP/Eicosene Copolymer | 1.70 |
| C | Glyceryl Searate | 1.60 |
| C | PEG-100 Stearate | 1.50 |
| C | Polyglyceryl-3-Methylglucose Distearate | 1.80 |
| D | Styrene/Acrylates Copolymer | 2.50 |
| E | Water | Balance |
| E | Glycerin | 3.00 |
| E | Disodium EDTA | 0.05 |
| E | Xanthan Gum | 0.30 |
| F | Caprylyl Glycol, Phenoxyethanol, Hexylene Glycol | 0.50 |
| F | Cyclopentasiloxane, Cyclohexasiloxane | 2.00 |
| F | Acrylamide/Sodium Acryloyldimethyltaurate Copolymer, Isohexadecane, Polysorbate 80 | 1.00 |
| F | Silica (spherical, 12 μm) | 2.00 |

(c) SPF 30 Sunscreen:

The ingredient of phase A are mixed and heated to 80° C. followed by adding the mixtures of phases B and C sequentially. In a separate container, combine the ingredients of phase D with mixing and heating to 75° C. before adding the mixture of ABC to phase D. The mixture ABCD is homogenize for 3 minutes and cooled to <50° C., and the ingredients of phase E are added sequentially with mixing. Finally, the mixture is cooled to room temperature.

| Phase | Name | wt % (Final Formulation) |
| --- | --- | --- |
| A | Ethyl [3-(p-methoxyphenyl)-2-cyclohexen-1-ylidene]cyanoacetate (E7) | 3.00 |
| A | 2-Ethylhexyl (3-phenyl-2-cyclopenten-1-ylidene)cyanoacetate (E6) | 3.00 |
| A | Dimethyl (3-phenyl-2-cyclohexen-1-ylidene)malonate (E12) | 5.00 |
| B | VP/Eicosene Copolymer | 0.80 |
| B | Glyceryl Searate | 1.60 |
| B | PEG-100 Stearate | 1.50 |
| B | Polyglyceryl-3-Methylglucose Distearate | 1.80 |
| C | Styrene/Acrylates Copolymer | 1.20 |
| D | Water | Balance |
| D | Glycerin | 3.00 |
| D | Disodium EDTA | 0.05 |
| D | Xanthan Gum | 0.30 |
| E | Caprylyl Glycol, Phenoxyethanol, Hexylene Glycol | 0.50 |
| E | Cyclopentasiloxane, Cyclohexasiloxane | 2.00 |
| E | Acrylamide/Sodium Acryloyldimethyltaurate Copolymer, Isohexadecane, Polysorbate 80 | 1.00 |
| E | Silica (spherical, 12 μm) | 2.00 |

Example 5

Hair Conditioner with Sunscreen:

After mixing the ingredients of phase A and B well separately with heating to 71° C., the two phases are mixed and homogenized. Then, the mixture is cooled to 40° C. and the ingredients of phase C are added sequentially and stirring. The pH of the mixture is adjusted between 4 and 5.5 using citric acid.

| Phase | Name | wt % (Final Formulation) |
| --- | --- | --- |
| A | Distilled water | Balance |
| A | Guar hydroxypropyltrimonium chloride | 0.50 |
| A | Glycerin | 2.00 |
| B | Cetyl alcohol | 6.50 |
| B | Behentirmonium methosulfate | 1.50 |
| B | Meadowfoam seed oil | 3.00 |
| B | Sunflower oil | 1.00 |
| B | Dimethyl (3-phenyl-2-cyclohexen-1-ylidene)malonate (E12) | 1.00 |
| B | (3-Phenyl-2-cyclohexen-1-ylidene)propanedinitrile (E1) | 1.00 |
| B | [3-(p-Methoxyphenyl)-2-cyclohexen-1-ylidene]propanedinitrile (E2) | 1.00 |
| C | Cyclo-dimethicone | 1.00 |
| C | Vitamin E acetate | 0.50 |
| C | d-Panthenol | 0.38 |
| C | Phenoxyethanol | 0.80 |
| C | Caprylyl glycol | 0.60 |
| C | Sorbic acid | 0.10 |
| C | Citric acid | 0.10 |

EQUIVALENTS AND INCORPORATION BY REFERENCE

While aspects of the present disclosure have been particularly shown and described with reference to certain embodiments and various alternate embodiments, it will be understood by persons skilled in the relevant art that various changes in form and details can be made therein without departing from the spirit and scope of the present disclosure. All references, issued patents, and patent applications cited within the body of the instant specification are hereby incorporated by reference in their entirety, for all purposes.

What is claimed is:

1. A compound of Formula V:

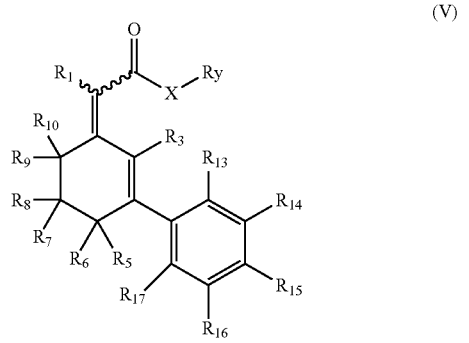

or a salt thereof, wherein:
$R_1$ is —CN;
X is O;
$R_y$ is selected from optionally substituted $C_1$-$C_{15}$ alkyl, optionally substituted $C_1$-$C_{15}$ alkoxyalkyl, and a polyether;
$R_3$, $R_5$, $R_6$, $R_7$, $R_8$, $R_9$, and $R_{10}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —CNO, —NO₂, —OC(O)NR'R", —SR', —S—SR', —S(O)R', —S(O)₂R', —S(O)₂OR', —S(O)₂NR', —C(O)SR', —C(S)SR', —C(S)NR', —B(OH)₂, —B(OR')(OR"), PR'₃, PR'₂, —P(OR')₂, —OP(OR')₂, —P(O)(OR')₂, —OP(O)(OR')₂, a polyamide, and a polyether;
$R_{13}$, $R_{14}$, $R_{15}$, $R_{16}$, and $R_{17}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —NO₂, —OC(O)NR'R", —SR', —S—SR', —S(O)R', —S(O)₂R', —S(O)₂OR', —S(O)₂NR', —C(O)SR', —C(S)SR', —C(S)NR', —B(OH)₂, —B(OR')(OR"), —PR'₂, —P(OR')₂, —OP(OR')₂, —P(O)(OR')₂, —OP(O)(OR')₂, polyamide, and polyether; and each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether.

2. The compound of claim 1, wherein the compound is of the formula:

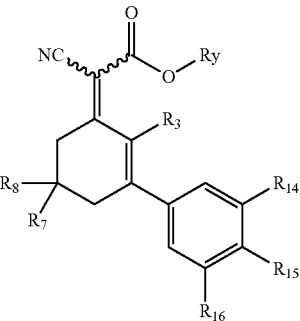

wherein:
$R_y$ is optionally substituted $C_1$-$C_{15}$ alkyl or optionally substituted $C_1$-$C_{15}$ alkoxyalkyl;
$R_3$ is selected from H, optionally substituted $C_1$-$C_{20}$ alkyl, and —OR';
$R_7$ and $R_8$ are independently selected from H, optionally substituted $C_1$-$C_{20}$ alkyl, and —OR'; and
$R_{14}$, $R_{15}$, and $R_{16}$ are independently selected from H, halogen, optionally substituted $C_1$-$C_{20}$ alkyl, and —OR';
wherein each R' is independently H or optionally substituted $C_1$-$C_{20}$ alkyl.

3. The compound of claim 2, wherein $R_y$ is selected from methyl, ethyl, propyl, isopropyl, butyl, isobutyl, sec-butyl, tert-butyl, pentyl, sec-isoamyl, sec-amyl, tert-amyl, 2-methylbutyl, 3-methylbutyl, neopentyl, 2-methylpentyl, 3-methylpentyl, 4-methylpentyl, hexyl, 2-ethylhexyl, 2-butyloctyl, 2-hydroxyethyl, 3-hydroxypropyl, 2-ethoxyethyl, and 3-methoxypropyl.

4. The compound of claim 2, wherein $R_y$ is selected from:

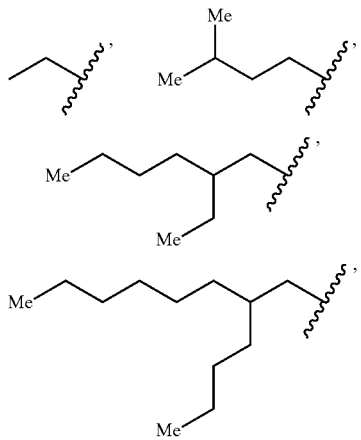

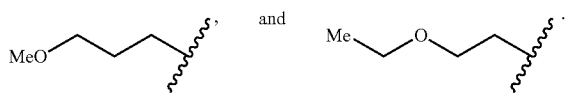

5. The compound of claim 2, wherein $R_3$, $R_7$, and $R_8$ are independently selected from H, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, and trifluoromethyl.

6. The compound of claim 5, wherein $R_3$ is methyl or methoxy.

7. The compound of claim 5, wherein $R_3$ is H.

8. The compound of claim 7, wherein $R_7$ and $R_8$ are methyl.

9. The compound of claim 7, wherein $R_7$ and $R_8$ are H.

10. The compound of claim 2, wherein $R_{14}$, $R_{15}$, and $R_{16}$ are independently selected from H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, and trifluoromethyl.

11. The compound of claim 10, wherein:

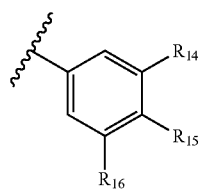

is selected from:

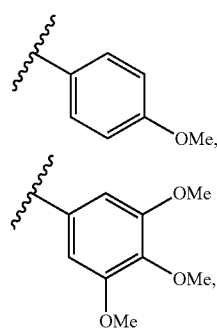
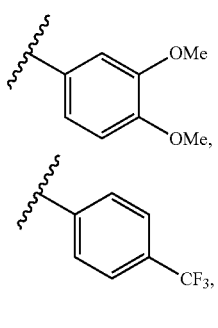

12. The compound of claim 11, wherein $R_{14}$ and $R_{16}$ are H, and $R_{15}$ is methoxy.

13. The compound of claim 11, wherein $R_{14}$, $R_{15}$, and $R_{16}$ are H.

14. The compound of claim 1, wherein compound is selected from:

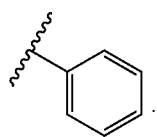

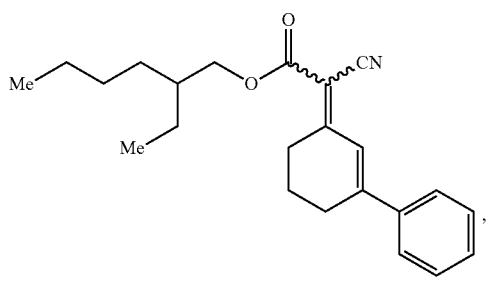

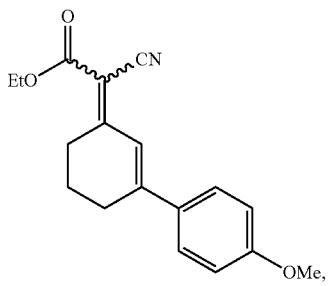

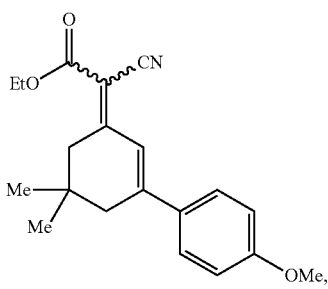

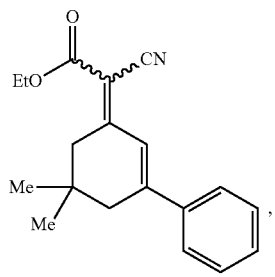

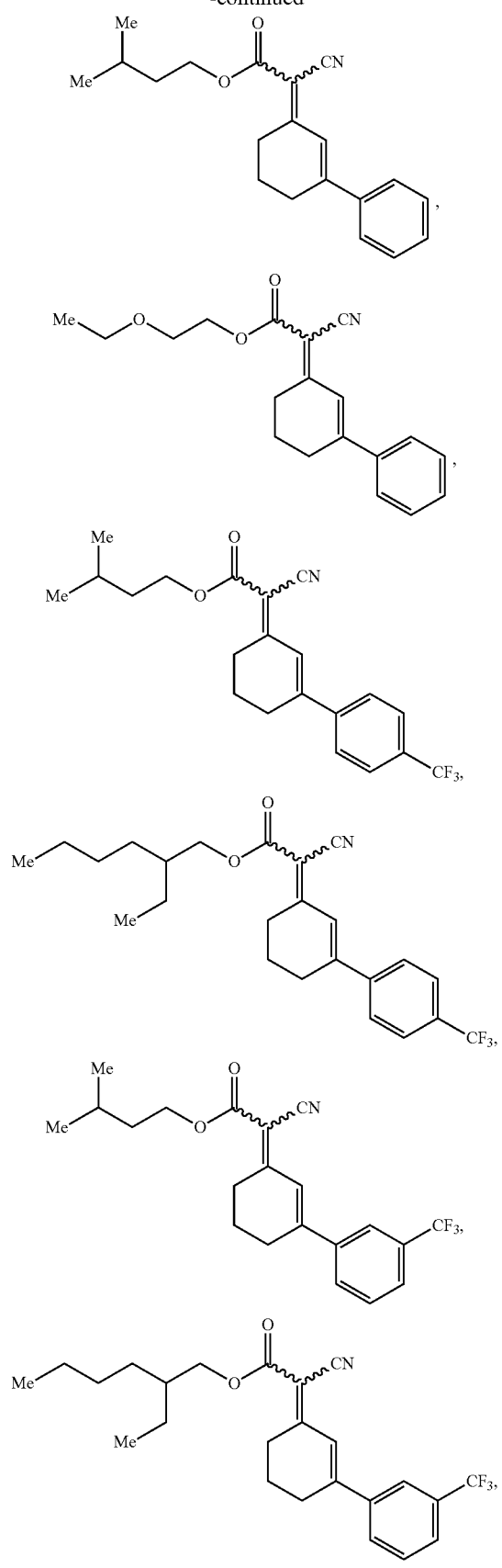
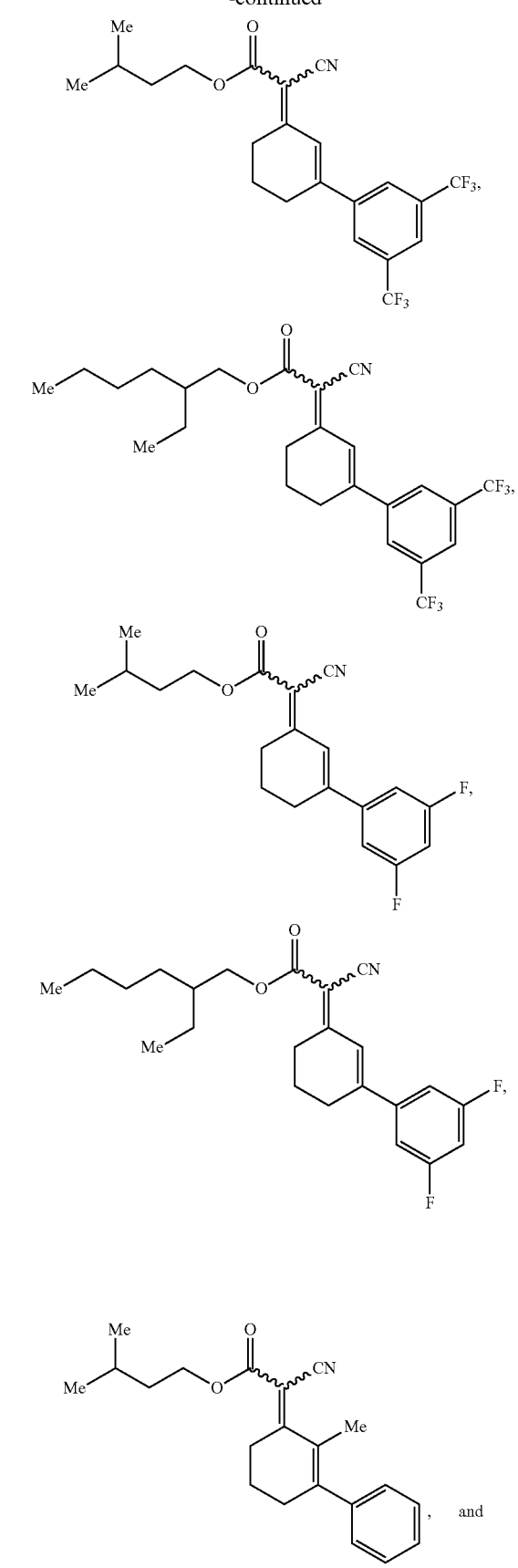

-continued

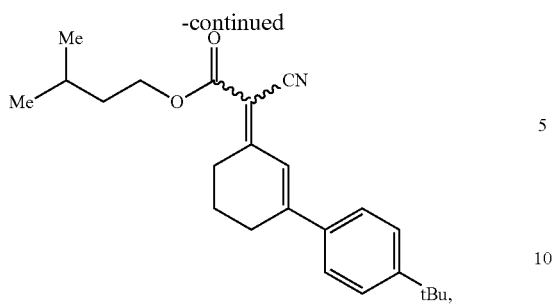

or a salt thereof.

15. The compound of claim 1, wherein the compound is

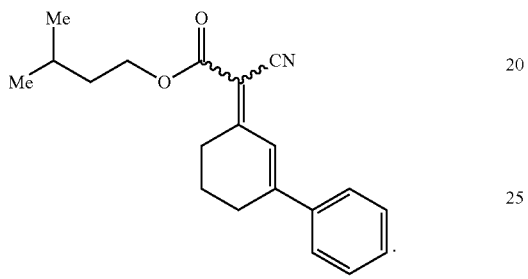

16. The compound of claim 1, wherein the compound is

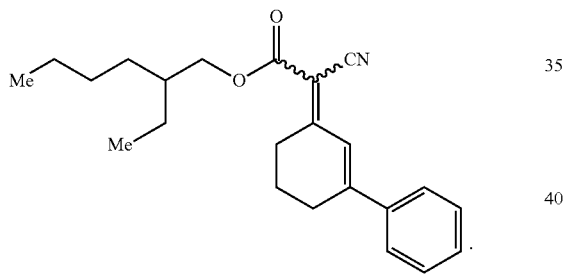

17. A topical composition comprising one or more compounds of Formula I:

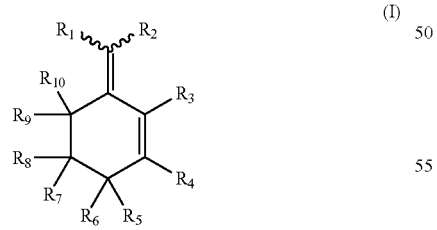

or a salt thereof, wherein:

$R_1$ and $R_2$ are independently selected from H, optionally substituted alkyl, optionally substituted alkynyl, optionally substituted aminoalkyl, optionally substituted hydroxyalkyl, optionally substituted alkoxyalkyl, —CN, —C(O)$R^A$, —C(O)O$R^A$, —C(O)N$R^A R^B$, —C(O)S$R^A$, —C(S)N$R^A R^B$, —NCO, —C(O)—X—$R_y$, C(O)—X—$R_z$, and —NO$_2$; or $R_1$ and $R_2$ together with the carbon atom to which they are attached form a cyclic moiety of Formula III or Formula IV:

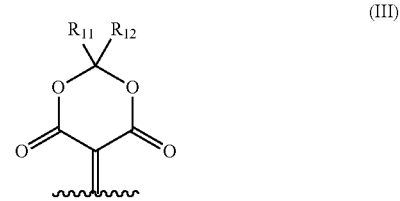

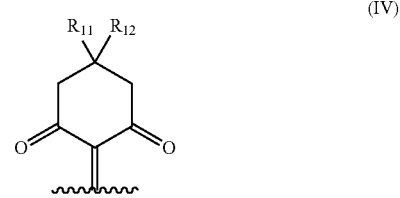

wherein:

X is O or N$R^A$, $R_{11}$ and $R_{12}$ are independently H or optionally substituted alkyl;

$R_y$ and $R_z$ are independently selected from H, optionally substituted $C_1$-$C_{15}$ alkyl, optionally substituted hydroxyalkyl, optionally substituted alkoxyalkyl, a polyamide, and a polyether;

$R_4$ is optionally substituted $C_6$-$C_{10}$ aryl, or optionally substituted $C_2$-$C_9$ heteroaryl comprising 0-4 heteroatoms selected from O, N, and S;

$R_3$, $R_5$, $R_6$, $R_7$, $R_8$, $R_9$, and $R_{10}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —CNO, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR"), PR'$_3$, PR'$_2$, —P(OR')$_2$, —OP(OR')$_2$, —P(O)(OR')$_2$, —OP(O)(OR')$_2$, a polyamide, and a polyether;

$R^A$ and $R^B$ are independently selected from H, optionally substituted $C_1$-$C_{15}$ alkyl, optionally substituted hydroxyalkyl, optionally substituted alkoxyalkyl, a polyamide, a polyether, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, and optionally substituted $C_2$-$C_9$ heteroaryl; and each R' and R" is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether.

18. The topical composition of claim 17, wherein the composition is a sunscreen, cosmetic, hair tonic, shampoo, or conditioner composition.

19. The topical composition of claim 17, wherein the compound is a compound of claim 1.

20. The topical composition of claim 17, wherein the compound is of the formula:

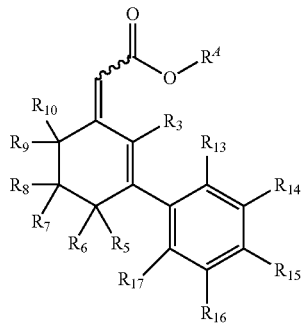

or a salt thereof, wherein:

$R^A$ is selected from optionally substituted $C_1$-$C_{20}$ alkyl, optionally substituted $C_1$-$C_{15}$ alkoxyalkyl, and a polyether; and $R_{13}$, $R_{14}$, $R_{15}$, $R_{16}$, and $R_{17}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R'', —C(=NR')NR'R''', —C(=NR'')R', —NR'R'', —CN, —N=NR', cyanate, —OCN, —NO$_2$, —OC(O)NR'R'', —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR''), —PR'$_2$, —P(OR')$_2$, —OP(OR')$_2$, —P(O)(OR')$_2$, —OP(O)(OR')$_2$, polyamide, and polyether.

21. The topical composition of claim 20, wherein the compound is of the formula:

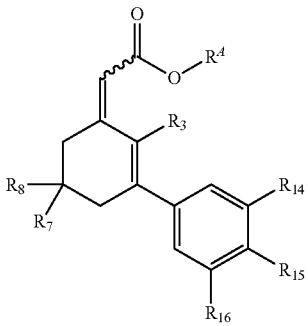

or a salt thereof, wherein:

$R_3$ is selected from H, optionally substituted $C_1$-$C_{20}$ alkyl, and —OR';

$R_7$, and $R_8$ are independently selected from H, optionally substituted $C_1$-$C_{20}$ alkyl, and —OR'; and $R_{14}$, $R_{15}$, and $R_{16}$ are independently selected from H, halogen, optionally substituted $C_1$-$C_{20}$ alkyl, and —OR';

wherein each R' is independently H or optionally substituted $C_1$-$C_{20}$ alkyl.

22. The topical composition of claim 21, wherein $R^A$ is optionally substituted $C_1$-$C_{20}$ alkyl or optionally substituted $C_1$-$C_{15}$ alkoxyalkyl.

23. The topical composition of claim 22, wherein $R^A$ is independently selected from methyl, ethyl, propyl, isopropyl, butyl, isobutyl, sec-butyl, tert-butyl, pentyl, sec-isoamyl, sec-amyl, tert-amyl, 2-methylbutyl, 3-methylbutyl, neopentyl, 2-methylpentyl, 3-methylpentyl, 4-methylpentyl, hexyl, 2-ethylhexyl, 2-butyloctyl, 2-hydroxyethyl, 3-hydroxypropyl, 2-ethoxyethyl, and 3-methoxypropyl.

24. The topical composition of claim 23, wherein $R^A$ is selected from:

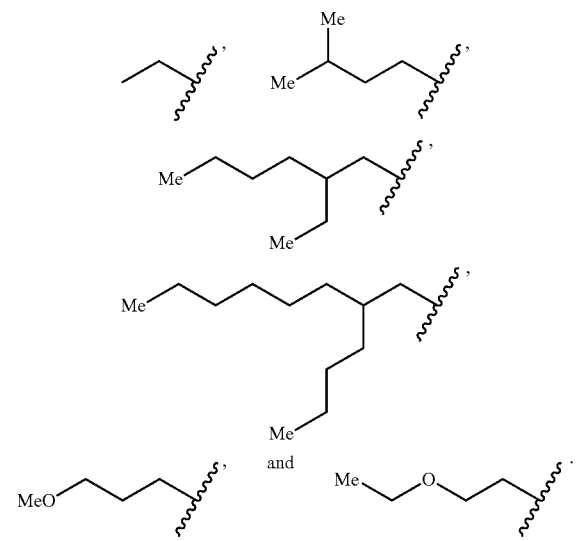

25. The topical composition of claim 21, wherein $R_{14}$, $R_{15}$, and $R_{16}$ are independently selected from H, halogen, methyl, ethyl, propyl, isopropyl, butyl, isobutyl, sec-butyl, tert-butyl, pentyl, sec-amyl, tert-amyl, 2-methylbutyl, 3-methylbutyl, neopentyl, hexyl, 2-ethylhexyl, 2-butyloctyl, hydroxy, methoxy, ethoxy, 2-ethoxyethyl, 3-methoxypropyl, and trifluoromethyl.

26. The topical composition of claim 25, wherein $R_{14}$ and $R_{16}$ are H.

27. The topical composition of claim 26, wherein $R_{15}$ is H or methoxy.

28. The topical composition of claim 21, wherein the composition comprises one or more compounds selected from:

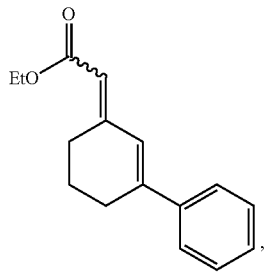

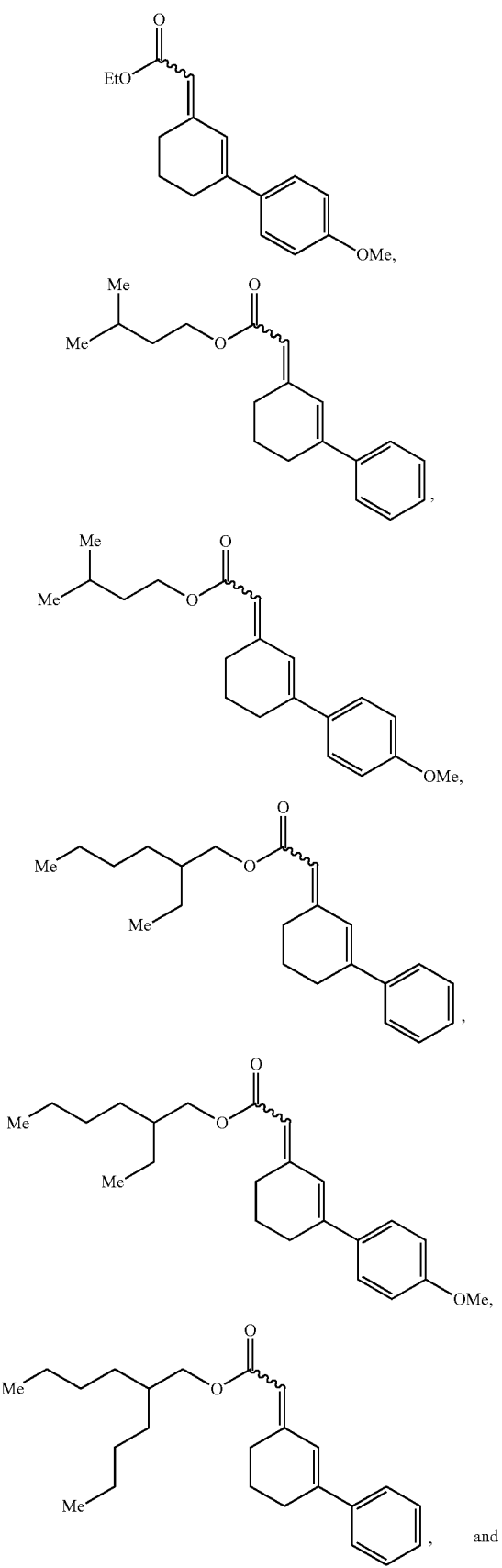

,  and

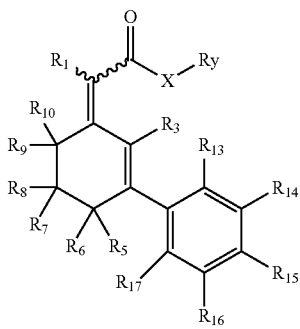

or a salt thereof.

29. A topical composition, wherein the composition comprises:
a compound of Formula V:

$$\text{(V)}$$

or a salt thereof, wherein:
$R_1$ is —CN;
X is O;
$R_y$ is selected from optionally substituted $C_1$-$C_{15}$ alkyl, optionally substituted $C_1$-$C_{15}$ alkoxyalkyl, and a polyether;
$R_3$, $R_5$, $R_6$, $R_7$, $R_8$, $R_9$, and $R_{10}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —CNO, —NO$_2$, —OC(O)NR'R", —SR', —S—SR', ~S(O)R', —S(O)$_2$R', —S(O)$_2$OR', —S(O)$_2$NR', —C(O)SR', —C(S)SR', —C(S)NR', —B(OH)$_2$, —B(OR')(OR"), PR'$_3$, PR'$_2$, —P(OR')$_2$, —OP(OR')$_2$, —P(O)(OR')$_2$, —OP(O)(OR')$_2$, a polyamide, and a polyether;
$R_{13}$, $R_{14}$, $R_{15}$, $R_{16}$, and $R_{17}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R", —C(=NR')NR'R", —C(=NR")R', —NR'R", —CN, —N=NR', cyanate, —OCN, —NO$_2$, —OC(O)NR'R", —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR''), —PR'$_2$, —P(OR')$_2$, —OP(OR')$_2$, —P(O)(OR')$_2$, —OP(O)(OR')$_2$, polyamide, and polyether; and each R' and R'' is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether; and a compound of the formula:

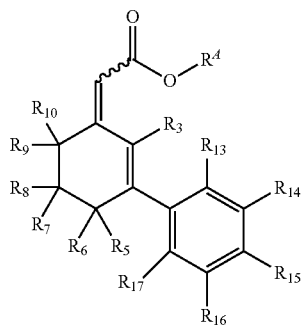

or a salt thereof, wherein:

$R^A$ is selected from optionally substituted $C_1$-$C_{20}$ alkyl, optionally substituted $C_1$-$C_{15}$ alkoxyalkyl, and a polyether;

$R_3$, $R_5$, $R_6$, $R_7$, $R_8$, $R_9$, and $R_{10}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R'', —C(=NR')NR'R'', —C(=NR'')R', —NR'R'', —CN, —N=NR', cyanate, —OCN, —CNO, —NO$_2$, —OC(O)NR'R'', —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR''), PR'$_3$, PR'$_2$, —P(OR')$_2$, —OP(OR')$_2$, —P(O)(OR')$_2$, —OP(O)(OR')$_2$, a polyamide, and a polyether;

$R_{13}$, $R_{14}$, $R_{15}$, $R_{16}$, and $R_{17}$ are independently selected from H, halogen, optionally substituted $C_1$-$C_{20}$ alkyl, optionally substituted $C_2$-$C_{20}$ alkenyl, optionally substituted $C_2$-$C_{20}$ alkynyl, optionally substituted $C_3$-$C_8$ cycloalkyl, optionally substituted $C_2$-$C_{20}$ cycloalkenyl, optionally substituted $C_2$-$C_7$ heterocycloalkyl, optionally substituted $C_6$-$C_{10}$ aryl, optionally substituted $C_2$-$C_9$ heteroaryl, —OR', —C(O)R', —C(O)OR', —C(O)NR'R'', —C(=NR')NR'R'', —C(=NR'')R', —NR'R'', —CN, —N=NR', cyanate, —OCN, —NO$_2$, —OC(O)NR'R'', —SR', —S—SR', —S(O)R', —S(O)$_2$R', —S(O)$_2$OR', —S(O)$_2$NR', —C(O)SR', —C(S)SR', —C(S)NR', —B(OH)$_2$, —B(OR')(OR''), —PR'$_2$, —P(OR')$_2$, —OP(OR')$_2$, —P(O)(OR')$_2$, —OP(O)(OR')$_2$, polyamide, and polyether; and each R' and R'' is independently selected from H, optionally substituted $C_1$-$C_{20}$ alkyl, optionally substituted $C_2$-$C_{20}$ alkenyl, optionally substituted $C_2$-$C_{20}$ alkynyl, optionally substituted $C_2$-$C_{20}$ cycloalkyl, optionally substituted $C_2$-$C_{20}$ cycloalkenyl, optionally substituted $C_2$-$C_{20}$ heterocycloalkyl, optionally substituted $C_6$-$C_{10}$ aryl, optionally substituted $C_2$-$C_9$ heteroaryl, a polyamide, and a polyether.

30. A method of providing UV light protection to the skin of a subject, the method comprising applying to the skin or hair of a subject in need thereof, a topical composition of claim 17.

* * * * *